(12) United States Patent
Yasuda et al.

(10) Patent No.: US 6,488,076 B1
(45) Date of Patent: Dec. 3, 2002

(54) HEATING APPARATUS AND HEATING METHOD FOR SUPPLY OF GASEOUS FLUID

(75) Inventors: Tsutomu Yasuda, Tokyo (JP); Kunio Yoshikawa, Sagamihara (JP)

(73) Assignee: Nippon Furnace Kogyo Kaisha, Ltd. (JP)

( * ) Notice: Subject to any disclaimer, the term of this patent is extended or adjusted under 35 U.S.C. 154(b) by 0 days.

(21) Appl. No.: 09/348,629

(22) Filed: Jul. 6, 1999

Related U.S. Application Data

(63) Continuation of application No. PCT/JP98/00001, filed on Jan. 5, 1998.

(30) Foreign Application Priority Data

Jan. 6, 1997 (JP) .................................................. 9-95
Jan. 6, 1997 (JP) ................................................ 9-117

(51) Int. Cl.[7] .............................................. F23L 15/02
(52) U.S. Cl. ........................... 165/4; 165/10; 431/215; 431/11; 432/181; 432/180
(58) Field of Search ........................ 165/4, 10, 909, 165/53, 54, 901, 6, 8, 9.1–9.4; 431/89, 11, 215; 432/180, 181, 182

(56) References Cited

U.S. PATENT DOCUMENTS

| | | | | |
|---|---|---|---|---|
| 4,291,834 A | * | 9/1981 | Palazzetti et al. | 165/902 X |
| 4,756,688 A | * | 7/1988 | Hammond et al. | 165/4 X |
| 5,018,281 A | * | 5/1991 | Bulluck, Jr. | 165/909 X |
| 5,279,356 A | * | 1/1994 | Bruhn | 165/901 X |
| 5,628,629 A | * | 5/1997 | Mitani et al. | 165/4 X |
| 5,695,002 A | * | 12/1997 | Tanaka et al. | 165/4 X |
| 5,944,504 A | * | 8/1999 | Tanaka et al. | 165/4 X |

FOREIGN PATENT DOCUMENTS

| | | | | |
|---|---|---|---|---|
| WO | WO9402784 | * | 2/1994 | 165/4 |

* cited by examiner

*Primary Examiner*—Christopher Atkinson
(74) *Attorney, Agent, or Firm*—Griffin & Szipl, P.C.

(57) ABSTRACT

A heating apparatus for heating supply of gaseous fluid 1 heats a relatively low temperature gaseous fluid and feeds a heated supply flow to a high temperature gaseous fluid introduction equipment. The heating apparatus has heat exchangers 11, 12 provided with fluid passages through which the low temperature fluid flow passes, a splitting area 15 for dividing a heated supply flow H of gaseous fluid, which is heated by the heat exchanger, into first and second heated gaseous streams H1, H2, and combustion areas 13, 14 in which a combustion reaction of combustible matter takes place in the existence of the first heated gaseous stream. The heated supply flow or the first stream is introduced into the combustion area and the combustible matter is fed thereto, and the combustion area causes the combustion reaction of combustible matter in the existence of the heated supply flow or the first stream. Hot gas produced by the combustion reaction is exhausted through the heat exchanger. The heat exchanger has a regenerator which accumulates heat in its heat-transferable contact with the hot gas and emits the heat in its heat-transferable contact with the low temperature gaseous fluid. The heating apparatus heats or preheats the low temperature gaseous fluid to a high temperature and feeds the second heated gaseous stream to the equipment.

18 Claims, 37 Drawing Sheets

(A)

(B)

(A)

(B)

(A)

(B)

(A)

(B)

(A)

(B)

(A)

(B)

(A)

(B)

(A)

(B)

(A)

(B)

(A)

(B)

(A)

(B)

| MODE (process) | CA | L1 | L2 | L3 | L4 | L5 | L6 | HA | EA | FA1 | FA2 |
|---|---|---|---|---|---|---|---|---|---|---|---|
| 1st Heat | 1.0 | 1.0 | 1.0 | 1.0 | 1.0 | 1.0 | 0.5 | 0.5 | 1.0 | 0 | 0.5 |
| 1st Transit step | 1.0 | 1.0 | 0.5 | 1.0 | 0.5 | 1.0 | 0.5 | 0.5 | 0.5 | 0 | 0 |
| 2nd Transit step | 1.0 | 0.25 | 0.25 | 0.25 | 0.25 | 0.25 | 0.25 | 0.5 | 0.5 | 0 | 0 |
| 3rd Transit step | 1.0 | 0.5 | 1.0 | 0.5 | 1.0 | 0.5 | 1.0 | 0.5 | 0.5 | 0 | 0 |
| 2nd Heat | 1.0 | 1.0 | 1.0 | 1.0 | 1.0 | 0.5 | 1.0 | 0.5 | 1.0 | 0.5 | 0 |

Flow Ratio

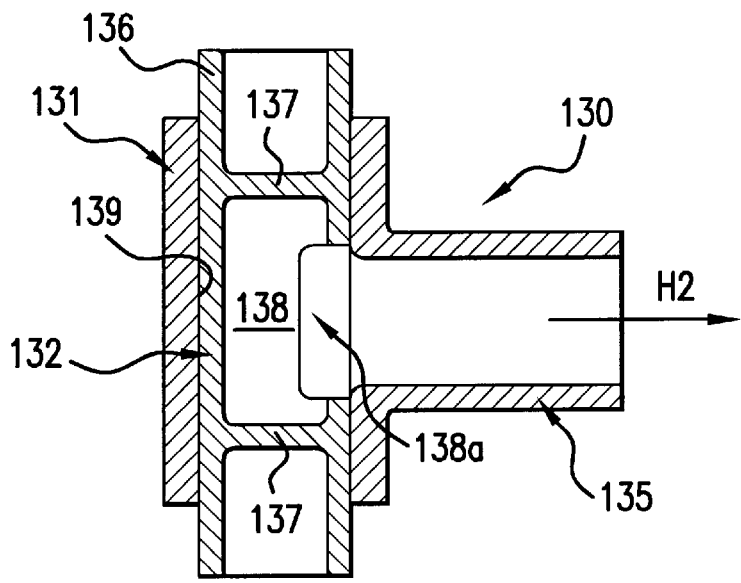
FIG. 24A
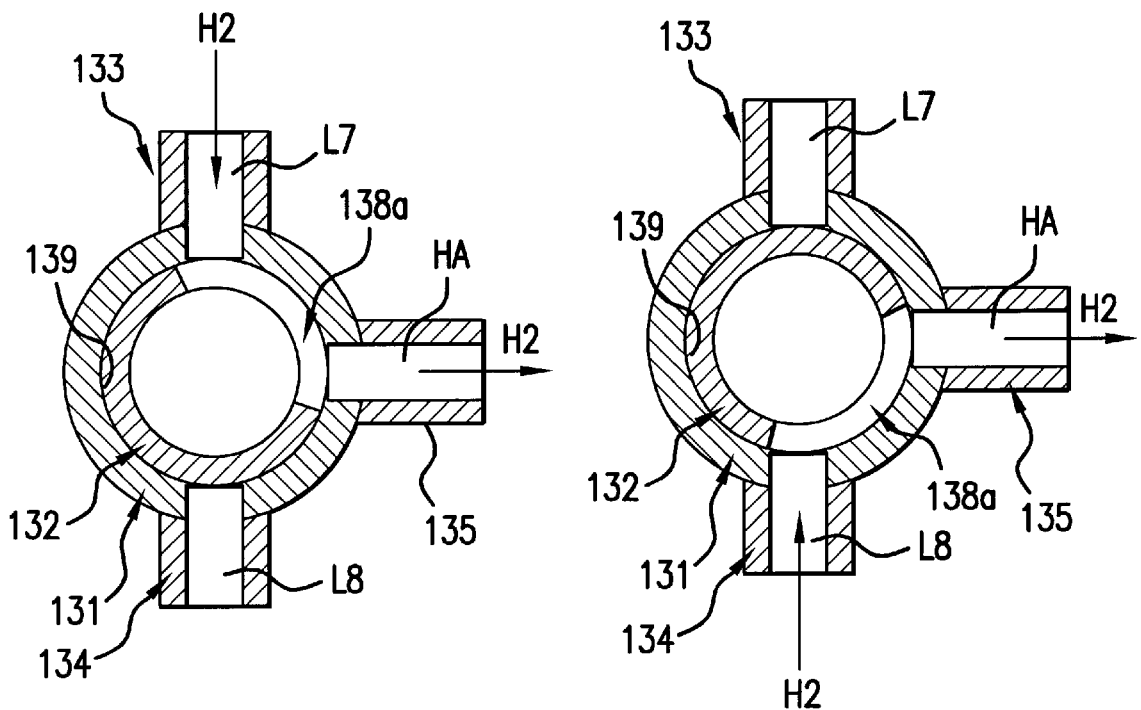
FIG. 24B
FIG. 24C (A)

(B)

(A)

(B)

(A)

(B)

HEATING APPARATUS AND HEATING METHOD FOR SUPPLY OF GASEOUS FLUID

This application is a Continuation of International Application No. PCT/JP98/00001, filed Jan. 5, 1998, which claims priority based on Japanese Patent Application Nos. 9-95 and 9-117, both filed Jan. 6, 1997. The entire disclosures of the above applications are hereby incorporated herein by reference.

TECHNICAL FIELD OF THE INVENTION

The present invention relates to heating apparatus and heating method for supply of gaseous fluid, and more particularly, to such apparatus and method in which a relatively low temperature gaseous fluid is heated to a high temperature and a heated supply flow at a high temperature is fed to an equipment, such as a combustion furnace or a combustion equipment to be supplied with high temperature gaseous fluid.

BACKGROUND OF THE INVENTION

A variety of combustion furnaces or combustion equipments, such as waste incinerator, waste gasification melting furnace, boiler, waste heat recovery boiler, heating furnace, and coal gasification furnace, are practically used in any kind of facilities, e.g., public facility, power generation plant, chemical plant or the like. In general, such a combustion furnace or combustion equipment is provided with a gaseous fluid feeding device for feeding combustion air to a combustion area of the furnace, and the feeding device includes heating means, such as a heat exchanger utilizing the waste heat of the combustion exhaust gas, preheating apparatus or pre-combustor for preheating or causing pre-combustion of combustion air. The heating means heats or preheats intake air or combustion air and feed a high temperature air flow or preheated air flow to a combustion means or firing means such as a burner.

FIG. 34 is a schematic flow diagram generally illustrating an arrangement of a waste gasfication melting furnace provided with such heating means.

A furnace 6 constituting a waste gasfication melting furnace is connected to an intake system with a forced draft fan 102 and a heating device 101, and an exhaust system 7 including a cooling device 71, a flue gas treatment system 72 and a stack 73. The system 7 is, in general, equipped with a series of exhaust gas treatment means, such as a dust collector and a exhaust gas denitration device. In the furnace 6, a melting furnace region 60 with a molten waste fluidized zone 61 in its bottom part, and an upper secondary combustion region 62 above the region 60.

The furnace 6 has a waste inlet opening 63 for charging waste into the region 60 and a secondary material inlet opening 64 for supplying supplementary materials and fuel thereto, the opening 63 being connected to conveying means 66 through a shute 65 and a feeder (not shown) and the opening 64 being connected to a supplementary material feeder (not shown) by a conveyor 67.

In the region 60, a plurality of burner throats 50, 51, 52 are provided below the openings 63 and the conveyor 67. The primary throat 50 in the zone 61 is joined to a heating device 101 through the preheated air supply line HA. Pre-combustion or primary combustion of intake air induced through an inlet 103 and the fan 102 is carried out in the device 101, which feeds high temperature preheated combustion air to the throat 50 through the line HA.

Combustion apparatus provided with such kinds of air heating apparatus permits the oxygen density or excess air ratio of the preheated air to decrease, owing to the pre-combustion or primary combustion. In order to compensate for the reduction of the oxygen density and to ensure a desired combustion reaction in the furnace, the heating device 101 is provided with an oxygen supply line 104 joined to the line HA. The line 104 is connected to an oxygen source 105 having oxygen cylinders, which adds a predetermined flow rate of oxygen ($O_2$) to the preheated air flow through the line HA.

Provision of an oxygen feeder, however, results in an increase of initial construction costs for the furnace or combustion equipment, as well as complication of maintenance of the system. Further, such an expensive oxygen cylinder or the like has to be periodically supplied to the oxygen feeder. Thus, since routine maintenance is necessitated for the oxygen feeder, costs for running and maintaining the system is increased. This is undesirable for practical use in long years.

Research and development as regards a variety of coal firing apparatus, Such as coal fired power generation boiler, pulverized coal firing boiler and coal gasification system, and various types of coal fired combined cycle power generation systems, such as AFBC, PFBC or pressurized CPC, are widely conducted in recent years in response to political or social requirements. In general, these kinds of coal fired systems or equipments are provided with heating devices, such as a heat exchanger using waste heat of combustion exhaust gas, which heat or preheat combustion air of ambient atmosphere to an appropriate temperature and feed the preheated air to combustion means such as a burner for pulverized coal.

Various types of coal fired devices are known, e.g., stoker combustion type, pulverized coal fired type, fluidized bed type and so forth. In general, the pulverized coal fired type of boiler is preferably adopted as a coal fired boiler in with a large capacity, such as a boiler of power generation station, since such type of boiler presents relatively good response and controllability as to variation of load and effects a desirable combustion efficiency.

In such a pulverized coal fired boiler, coal particles are carried with primary air into a combustion area and rapidly heated by a burner for pulverized coal. As combustion exhaust gas of the boiler contains a relatively large amount of fuel NOx, thermal NOx, sulfur and smoke dust (dust, fly ash), an exhaust system is generally equipped with a series of desulfurizer, denitration device, and electrostatic precipitator (ESP) and so forth.

FIG. 35 is a schematic flow diagram illustrating such a coal fired system.

A coal fired power generation boiler plant comprises a burner for pulverized coal 120 and a pulverized coal fired boiler 110, and the burner 120 is connected with a pulverized coal feeding line CS and a secondary air feeding line CA. The line CA is connected to a forced draft fan 121 through a heating section 181 of a rotary air-preheater APH for heating the secondary air to an order of 300° C. The fan 121 feeds intake air from an air intake port 122 and an air intake line OA to the preheater APH and the air preheated thereby is fed to the burner 120 through the line CA. The pulverized coal and air mixed in the burner 120 fires in a combustion area 150 of the boiler 110 to heat superheater 151, reheater 152 and economizer 153 in the area 150, and combustion gas is exhausted through an exhaust gas line E11. The exhaust system including lines E11 to E20 is equipped with exhaust treatment devices wherein electrostatic precipitator (ESP) 171, ammonia injector 172 connected to an ammonia source (not shown), selective catalytic reduction device 173 with catalyst units, heat accumulating section 174 of a rotary air preheater APH for heat recovery, forced induce fan 175, heat accumulating section 176 of a gas-gas heater GGH, booster fan 177, desulfurizer 178, heat emission section 179 of the gas-gas heater GGH, and stack 180 arranged in series.

A high-cycle regenerative combustion system which is capable of preheating such a supply flow of air to the combustion equipment is disclosed in Japanese patent application No. 5-6911 (Japanese patent laid-open publication No. 6-213585) of the present applicant. This system developed by the present applicant includes a regenerator of honeycomb structure with a number of narrow channels or fluid passages which exhibits a high temperature effectiveness and a high volumetric efficiency. High temperature combustion exhaust gas and low temperature supply fluid flow alternately passes through the regenerator, so that the supply flow is heated to a high temperature above 800° C. by heat exchange with the exhaust gas through the regenerator.

However, in this kind of system, high temperature combustion exhaust gas effluent immediately after a combustion step has to be introduced into the regenerator, since the high temperature gas possessing sensible heat enough to be efficiently transferable to the low temperature supply flow. Therefore, it would be difficult to apply the conventional regenerative heat exchange system to the aforementioned waste gasification melting furnace or the like, in which the high temperature exhaust gas cannot be readily used.

Further, the fluid passages of the honeycomb regenerator of the above regenerative system is apt to be relatively easily blocked by dust, smoke dust, ash, fly ash or the like, and therefore, relatively clean combustion exhaust gas at a high temperature, which does not contain dust or other foreign matters, should be introduced into the honeycomb regenerator. Therefore, it would be difficult to effectively use such a regenerator in a combustion system which may produce combustion exhaust gas containing dust, ash or other foreign matters.

For instance, high temperature exhaust gas of coal fired combustion equipment includes a substantial quantity of smoke dust, and therefore, the narrow channels of the regenerator are apt to be blocked in a relatively early stage. Therefore, it would be difficult to apply the aforementioned regenerative system to an exhaust system of a coal fired equipment. Thus, it is necessary to develop a heat exchange system applicable to such kinds of combustion equipments.

It is therefore an object of the present invention to provide a heating apparatus and a heating method for heating supply of gaseous fluid which heats a relatively low temperature gaseous fluid and feeds a heated supply flow to a high temperature gaseous fluid introduction equipment, wherein the supply flow can be heated to a high temperature without substantially changing the property of the supply flow, such as its oxygen density.

Another object of the present invention is to provide such an apparatus and method which enable the supply of gaseous fluid for combustion to be heated to a high temperature range above 800° C., preferably, above 1,000° C.

Still another object of the present invention is to provide such apparatus and method which is capable of producing water gas and which can continuously feed a water gas flow to an equipment consuming the water gas, such as a coal gasification system or a gas turbine plant.

DISCLOSURE OF THE INVENTION

To this end, the present invention provides a heating apparatus for supply of gaseous fluid which heats a relatively low temperature gaseous fluid and feeds a heated supply flow to a high temperature gaseous fluid introduction equipment, which comprises a heat exchanger provided with a fluid passage through which the low temperature gaseous fluid flow passes and adapted to heat the low temperature gaseous fluid, a splitting area for dividing a heated supply flow of the gaseous fluid into first and second gaseous streams, the supply flow having a temperature raised as a result of its passing through said heat exchanger, and a combustion area into which combustible matter is introduced so that a combustion reaction of the combustible matter takes place therein. The heat exchanger, combustion area and splitting area are in communication with each other, so that the second stream is fed to the above equipment, and the hot gas produced by said combustion reaction in the combustion area is exhausted through the heat exchanger. The heat exchanger accumulates heat in its heat-transferable contact with the hot gas and emits the heat in its heat-transferable contact with said low temperature gaseous fluid.

According to the arrangement of the present invention, the hot gas produced in the combustion area passes through the fluid passage of the regenerative heat exchanger to heat it. The hot gas is cooled by the heat accumulating action of the heat exchanger in which the sensible heat of the hot gas is heat-transferred or transmitted to the regenerator and stored therein, whilst the low temperature fluid is heated to raise its temperature with the heat emitting action of the heat exchanger in which the sensible heat stored in the regenerator is transferred to the low temperature fluid to heat it. Thus, the heat exchange between the low temperature flow and the hot gas effected by means of the regenerator allows the low temperature flow to be heated or preheated to a high temperature.

The present invention also provides a heating method for heating supply of gaseous fluid in which a relatively low temperature gaseous fluid is heated and a heated supply flow is fed to a high temperature fluid introduction equipment, comprising first and second heating processes. The first heating process includes steps of introducing the low temperature gaseous fluid through a first heat exchanger at a high temperature so as to heat the low temperature gaseous fluid tip to a high temperature with a heat exchange action in its heat transferable contact with the first heat exchanger, splitting the heated supply flow into first and second gaseous streams, feeding the second stream to the equipment, generating a combustion reaction of the heated supply flow and/or the first stream in a combustion area, introducing hot gas produced by the combustion reaction into a second heat exchanger, and exhausting the hot gas therethrough so that sensible heat of the hot gas is accumulated in a regenerator of the second heat exchanger with a heat exchange action in a heat transferable contact between the hot gas and the second heat exchanger. The second heating process includes steps of introducing the low temperature gaseous fluid through the second heat exchanger at a high temperature so as to heat the low temperature gaseous fluid up to a high temperature with a heat exchange action in its heat transferable contact with the second heat exchanger, splitting the heated supply flow into the first and second gaseous streams, feeding the second stream to the equipment, generating a combustion reaction of the heated supply flow and/or the first stream in the combustion area, introducing hot gas produced by the combustion reaction into the first heat exchanger, and exhausting the hot gas therethrough so that sensible heat of the hot gas is accumulated in a regenerator of the first heat exchanger with a heat exchange action in a heat transferable contact between the hot gas and the first heat exchanger, The first and second heating processes are alternately changed over in a predetermined time interval so that the low temperature flow is continuously heated to the high temperature.

From another aspect of the present invention, this invention provides a heating system for heating a supply of gaseous fluid comprising a plurality of the above heating apparatus arranged in parallel.

From still another aspect of the present invention, a preheating apparatus for preheating combustion air for a combustion furnace, a deodorization apparatus for exhaust gas, a repowering apparatus for exhaust gas of a turbine, a water gas generator, or an inert gas heating apparatus are provided, each having the above described apparatus for heating the supply flow of gaseous fluid.

In a preferred embodiment of the present invention, the first stream is introduced into the combustion area, and the combustible matter generates the combustion reaction in the existence of the first stream and maintains the combustion. The low temperature fluid can be substantially heated to a high temperature range equal to or higher than 800~1,000° C. by the substantially direct heat transmission of the regenerator, with the properties of the fluid, such as its initial oxygen density being kept.

In accordance with another preferred embodiment of the present invention, the heated supply flow is introduced into the combustion area, and the combustible matter generates and maintains the combustion reaction in the existence of the heated supply flow. Thus, the low temperature fluid can be heated to a high temperature range equal to or higher than 800~1,000° C. by the substantially direct heat transmission through the regenerator and the heated flow can take the combustion reaction in the combustion area.

According to a preferred embodiment of the present invention, the apparatus may be provided with a fluid flow introduction passage for receiving the low temperature gaseous fluid flow, a combustion exhaust gas passage for exhausting the hot gas effluent, a heated supply flow delivery passage for delivering the second gaseous stream to the gaseous fluid introduction equipment, changeover means connected to the introduction passage and the combustion exhaust gas passage, first and second fluid flow passages connected to the changeover means, first and second heating devices connected to the first and second fluid flow passages, and the splitting area which is in communication with the first and second heating devices and in communication with delivery passage. The first heating device may have the first heat exchanger connected to the first fluid flow passage and the first combustion area arranged in series with the first heat exchanger, wherein the first fluid flow passage, the first heat exchanger and the first combustion area are in communication with each other so as to direct the heated supply flow to the splitting area. Similarly, the second heating device may have the second heat exchanger connected to the second fluid flow passage and the second combustion area arranged in series with the second heat exchanger, wherein the second fluid flow passage, the second heat exchanger and the second combustion area are in communication with each other so as to direct the heated supply flow to the splitting area. The splitting area is preferably provided with splitting means for splitting the heated supply flow into the first and second gaseous fluid streams and directing the first stream to the first or second combustion area. Further, each of the first and second combustion areas are preferably provided with combustion means for generating the combustion reaction of the combustible matter and maintaining the combustion reaction in a predetermined period of time.

In such a preferred embodiment, the combustion exhaust gas in the combustion area passes through the fluid passages of the regenerator of the first or second heat exchanger so as to heat the regenerator. Tile switching control with respect to the changeover means is conducted in a predetermined time interval, so that the heat accumulation action and the heat emission action are alternately repeated in a short term of time, whereby the sensible heat processed by the combustion exhaust gas in the combustion area is transferred and transmitted to the regenerator and accumulated therein during the heat accumulation action, and the sensible heat stored in the regenerator is dissipated to the low temperature fluid to be heated during the heat emission. As the result, the heat exchange action between the low temperature fluid and the combustion exhaust gas is successively carried out by the regenerator, so that the low temperature fluid can be heated to a high temperature equal to or higher than 800~1, 000° C. by the substantially direct heat exchange therebetween through the regenerator.

Preferably, the changeover means takes a first position in which the introduction passage is in communication with the first fluid flow passage and the combustion exhaust gas passage is in communication with the second fluid flow passage, and a second position in which the introduction passage is in communication with the second fluid flow passage and the combustion exhaust gas passage is in communication with the first fluid flow passage. The changeover means is adapted to be alternately switched to either of the first and second positions in a predetermined time interval. The combustion exhaust gas is delivered through the regenerator of the first heat exchanger to the first fluid flow passage, while the combustion means of the first combustion area is in a combustion operation in the second position of the changeover means. On the other hand, the combustion exhaust gas is delivered through the regenerator of the second heat exchanger to the second fluid flow passage while the combustion means of the second combustion area is in a combustion operation in the first position of the changeover means. More preferably, the changeover means is alternately switched to either of first and second positions in a predetermined time interval set to be no longer than 60 seconds, preferably no longer than 30 seconds, so that each of the regenerators of the first and second heat exchangers repeatedly perform heat accumulation and heat emission in correspondence with the time interval to heat the low temperature fluid and cool the combustion exhaust gas.

The splitting may divide the heated flow into the first and second streams by control of fluid pressure (control of static pressure and/or dynamic pressure). The splitting means defined by an orifice or restriction can effect a function to control fluid pressure balance of the heating devices and a function to control direction of the first and second streams. In a preferred embodiment, the splitting area is provided with a fluid passage inclined to the center axis of the heating device, and regulation and resistance means positioned in the inclined passage for regulating the direction of the flow and increasing pressure loss of fluid flow. This means may be a honeycomb structure which is substantially the same as the structure of the regenerator.

In a preferred embodiment, the heating apparatus comprises a fuel feed line for introducing a fuel into the combustion area and fuel control means for controlling the fuel feed line. The fuel may be combustible exhaust gas of a combustion furnace. The hydrocarbon fuel or the combustible exhaust gas is alternately introduced into the combustion areas to cause the combustion reaction therein.

The heating apparatus may be provided with first and second exhaust gas introduction passages for introducing combustion exhaust gas, which is produced in a combustion furnace or combustion equipment, into the combustion area, and control valve means for controlling the flow of the introduction passages.

Preferably, the first and second heating devices are arranged in parallel and in communication with each other through a communication passage defining said splitting area. The communication passage is provided with a constriction functioning as an orifice regulating a fluid pressure of said heated supply flow and act as a deflector directing the fluid in an inlet opening of the heated supply flow passage.

In one preferred embodiment of the invention, odorous exhaust gas of painting process or the like, in which odorous components or odorous matters are contained, is alternately introduced into the first and second combustion areas through odorous exhaust gas introduction means so as to take a thermal decomposition reaction therein for deodorizing the odorous gas.

In another preferred embodiment of the invention, the low temperature fluid essentially consists of ambient atmospheric air or inert gas, and the second stream heated to a high temperature of at least 800° C., preferably a temperature equal to or higher than 1000° C., is delivered to a combustion furnace or a combustion equipment as being a combustion air flow or an inert gas flow at a high temperature.

In still another preferred embodiment of the invention, exhaust gas of a turbine is alternately introduced into the first and second combustion areas and the second stream is directed to a waste heat recovery boiler defining the high temperature gaseous fluid introduction equipment.

According to a preferred embodiment of the invention, the regenerator is a ceramic honeycomb structure having a number of fluid passages or channels through which the low temperature fluid and the exhaust gas of the combustion area alternately pass. The regenerator may have channels defined by cell holes of a square or triangular cross-section, and the thickness and of the cell wall are pitch preferably corresponds to the dimensions ensuring the maximum value of the volumetric efficiency and the temperature effectiveness ranging from 0.7 to 1.0. More preferably, the thickness of the cell wall is no greater than 1.6 mm and the pitch thereof is no greater than 5.0 mm.

In a preferred embodiment of the invention, combustion assist air is additionally introduced into the combustion areas through assist air feeding means so as to supplement or compensate the combustion air required for the combustion reaction in the combustion area. The assist air promotes the combustion reaction so that substantially complete combustion can be achieved in the combustion area and the heat sufficient for the heat exchange with the low temperature fluid can be obtained.

In a preferable embodiment of the invention for production of water gas, the heating apparatus comprises a superheated steam introduction passage for feeding superheated steam as the low temperature gaseous fluid, an exhaust gas passage for exhausting the hot gas produced in the combustion area, changeover means connected to the introduction passage and the exhaust gas passages, first and second fluid flow passages connected to the changeover means, first and second heating devices connected to the first and second fluid flow passages, and a water gas delivery passage to be in communication with the first and second heating devices. The first heating device is provided with the first heat exchanger connected to the first fluid flow passage and the first combustion area arranged in series with the first heat exchanger, and the second heating device is provided with the second heat exchanger connected to the second fluid passage and the second combustion area arranged in series with the second heat exchanger. The first and second combustion areas are provided with combustion means for feeding oxidizer and hydrocarbon fuel to the superheated steam heated by heat exchanges. The first and second heat exchangers heat the superheated steam to a high temperature so that the water gas reaction of the high temperature steam takes place in the heat exchangers and the combustion areas. Tile water gas thus produced is split into the first and second stream in the splitting gas, and the second stream is fed to a water gas consuming device such as a coal gasification device or a power generation system. The first stream is directed into the other combustion area to take a combustion reaction in the existence of the oxidizer and fuel to produce a high temperature gas, which is discharged through the heat exchanger. Tile sensible heat of the gas is accumulated in the regenerator.

In a preferable embodiment of the invention for coal fired gasification process, a low temperature combustion air fed to a coal fired combustion device or a pulverized coal fired boiler is introduced into the heating apparatus, in which the combustion air is heated by the heat exchanger at a high temperature. The apparatus feeds a second stream at a high temperature to the coal fired device. Combustion exhaust gas of the coal combustion device containing combustible matters is introduced into the combustion area of the heating apparatus to be mixed with the first stream at a high temperature, so that a secondary combustion reaction of the exhaust gas is caused therein. The secondary combustion exhaust gas produced by the secondary combustion reaction is exhausted through the heat exchanger. Tile sensible heat of the secondary combustion exhaust gas is accumulated in the regenerator by heat exchange therewith. The first and second heating processes are alternately carried out in a predetermined time interval, so that the low temperature supply air is continuously heated to the high temperature range by heat exchange between the coal combustion exhaust gas and combustion air though the regenerator. Thus, the preheated air at a high temperature is introduced into the combustion device.

In a preferred embodiment of the present invention, the coal combustion device is a pulverized coal boiler and the combustible exhaust gas thereof contains unburnt fuel components, hydrogen and carbon. The preheated air is heated tip to a temperature above the self-ignition temperature of the combustible components and the combustion exhaust gas is alternately fed to the first and second combustion area to be mixed with the first stream therein, thereby taking a secondary combustion reaction.

BRIEF DESCRIPTION OF THE DRAWINGS

FIG. 19 is a table showing proportion of flow rates of the respective passages in each of the modes shown in FIGS. 14 through 18.

BEST MODE FOR CARRYING OUT THE INVENTION

The apparatus and method according to the embodiments of the present invention will now be described in detail with reference to the accompanying drawings.

Figure 1:
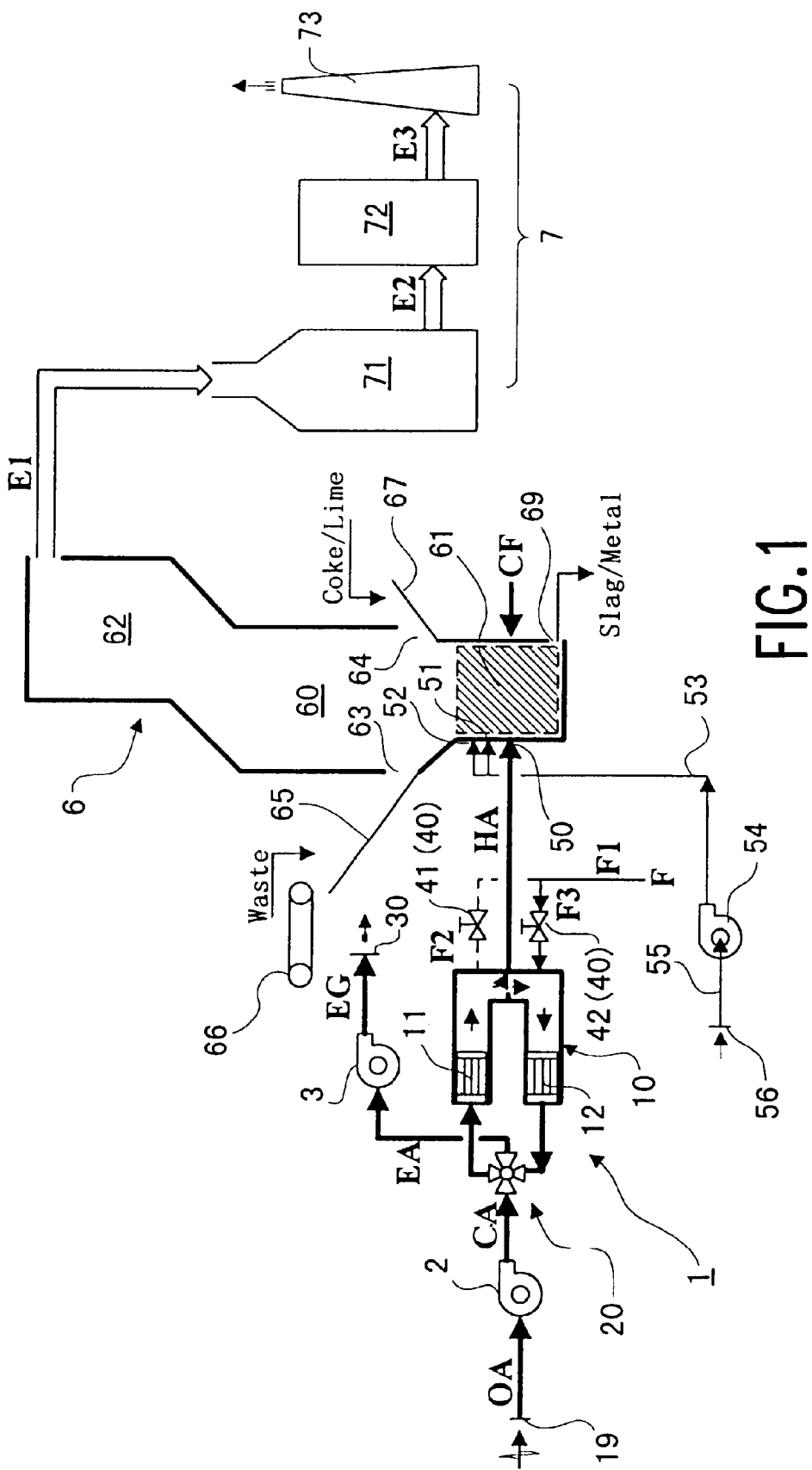
FIG. 1 is a schematic process flow diagram generally showing an arrangement of a whole system of a waste treatment plant provided with an heating apparatus according to a first embodiment of the present invention.

FIG. 1 is a schematic flow diagram showing a general arrangement of a system of a waste treatment plant, which includes a gaseous fluid heating apparatus of an embodiment according to the present invention A combustion furnace 6 constituting a waste treatment plant is connected to an intake system including a forced draft fan 2, a induced draft fan 3 and the gaseous fluid heating apparatus 1 and an exhaust system 7 including a combustion exhaust gas cooling device 71, a flue gas treatment system 72 and a stack 73. An internal area of the furnace 6 has a melting furnace region 60 and an upper secondary combustion region 62. The region 60 is provided with a fluidized zone of molten waste 61 in its lower part, and the region 62 is in communication with a combustion exhaust gas passage E1. A waste inlet opening 63 for introduction of waste, such as refuse or industrial waste, into the region 60 is provided on a first peripheral wall of the region 60. A secondary material inlet opening 64 is provided on a second peripheral wall of the region 60 for introducing thereinto a supplementary fuel, such as coke, and a supplementary material, such as limestone. The inlet 63 is connected through a waste shute 65 and a feeder (not shown) to a conveying means 66 having a measuring conveyor. The conveying means 66 is connected through a waste delivery means (not shown) with waste pretreatment devices (not shown) including a waste pit, a waste crusher, a waste hopper and the like. On the other hand, a secondary material conveying means 67 connected to the inlet 64 is associated with a secondary material feeding means (not shown) including a coke feeder and a lime feeder.

The melting furnace region 60 is provided with a plurality of burner throats positioned in a stepped formation below the inlet 63 and the conveying means 67. A primary burner throat 50 located in the fluidized zone 61 is connected with a regenerative heat-exchanger system 10 of the gaseous fluid heating apparatus 1 by means of a preheated air supply passage HA. The system 10 comprises regenerative heat exchangers 11, 12, fuel supply system F and a fluid passage changeover means 20 of a four-way valve type. The system 10 is connected to an air supply fan 2 of a forced draft blower type and a forced exhaust fan 3 of a forced induced blower type. The air supply fan 2 is connected to an outdoor air intake port 19 through an air intake passage OA so as to induce outdoor air (combustion air) at an atmospheric temperature through the intake port 19 into the passage CA. The combustion air is introduced into the first and second heat exchangers 11, 12 through the changeover means 20. The exhaust fan 3 induces combustion exhaust gas effluent from the heat exchangers 11, 12 through the changeover means 20 and discharges the induced exhaust gas to the atmosphere through an exhaust gas passage EG and an exhaust port 30.

The secondary throat 51 and the third throat 52 in the zone 60 and/or the zone 61 is connected to a forced draft fan 54 through an air supply line 53. The fan 54 is connected with an outdoor air intake 56.

A fuel feed system CF is connected to the air supply system of the throats 50, 51, 52 to feed thereto a quantity of fuel for combustion reaction in the furnace 60, so that the throat 50, 51, 52 fire in the internal area of the furnace 60. In the fluidized zone 61, a large number of ceramic balls or spherical ceramic forms are contained, which have a predetermined diameter approximately in a range of 3 to 5 centimeter. The ceramic balls are provided therein to be a heat accumulating material with thermal resistance and wear resistance so as to accumulate heat required for combustion reaction and thermal decomposition reaction of ask in the waste. The waste, which is preheated and subject to a thermal decomposition reaction in a fluidized in the melting furnace region 60, moves downward through gaps of the ceramic balls in a carbide movable section, high temperature combustion section or melting section, and separation section of the zone 61. The waste is trapped in a bottom portion or reservoir of the zone 61 to be a molten slag charged with heavy metals, which is introduced therefrom through a slag metal outlet port 69. The molten slag is cooled and solidified by cooling and solidifying means to be reformed or cast into reusable materials, such as pavement materials, and then, provided for desired use as being waste recycled materials.

A combustible exhaust gas, which is produced by a gasificating and melting reaction in the combustion area of the melting furnace region 60 and the fluidized zone 61, flows upward to the secondary combustion region 62 located above the region 60. The secondary combustion region 62 is provided with a secondary burner system and a secondary air supply system for secondary combustion (not shown 3), so that a quantity of hydrocarbon fuel and combustion air is fed to the secondary combustion region 62 through the burner system and the air supply system. The combustible gas or combustion exhaust gas produced in the region 60 takes a secondary combustion or reburning reaction with the secondary fuel and air, and thus, the region 62 defines a secondary combustion boiler or waste heat boiler.

A combustion exhaust gas passage E1 connected to an upper part of the secondary combustion region 62 is in communication with an exhaust gas inlet port of an exhaust gas cooling device 71. An exhaust gas discharge passage E2 of the device 71 is connected to a flue gas treatment system 72 including a bag filter, denitration equipment and the like. The system 72 is in communication with a stack 73 through a flue gas discharge passage E3, so that the exhaust flue gas of the furnace 6 is discharged to the atmosphere.

Figure 2:
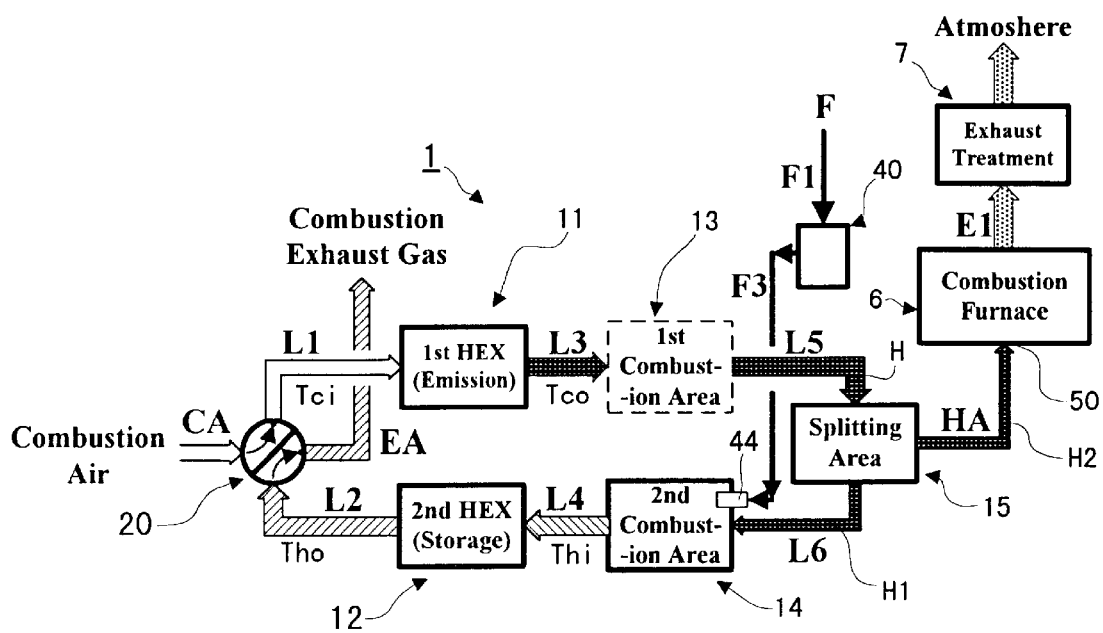
FIGS. 2 and 3 are a block flow diagram and a schematic cross-sectional view showing the arrangement and operation of the apparatus as illustrated in FIG. 1.
Figure 2:
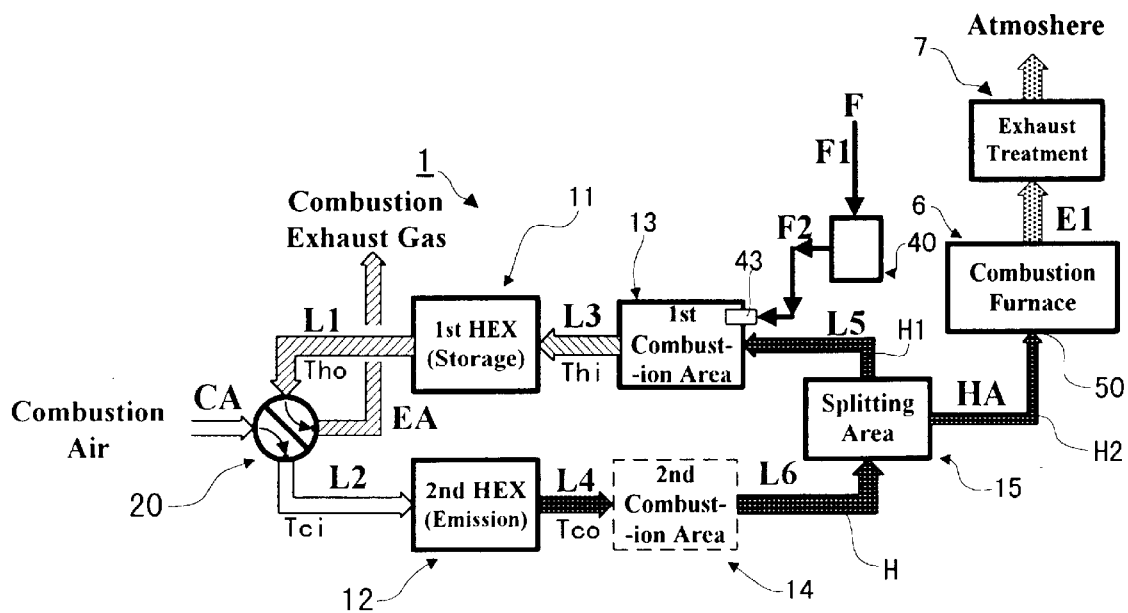

The construction and operation mode of the gaseous fluid heating apparatus 1 are illustrated in FIGS. 2 and, 3. The figure indicated by (A) shows a first preheating process in which the changeover means 20 of the heating apparatus 1 takes its first position, whereas the figure indicated by (B) shows a second preheating process in which the changeover means 21 takes its second position.

As shown in FIG. 2, the heating apparatus 1 comprises first and second flow passages L1, L2 selectively in communication with the air introduction passage CA and the exhaust gas passage EA. The heating apparatus 1 further comprises the first and second heat-exchangers 11, 12 for heating the combustion air introduced through the passage CA up to a predetermined temperature range; a splitting area 15 dividing a preheated air flow H heated by the heat-exchangers 11, 12; and first and second combustion areas 13, 14 generating a combustion reaction of a hydrocarbon fuel in the existence of a predetermined flow rate of first preheated air flow H1 divided in the area 15.

Figure 3:
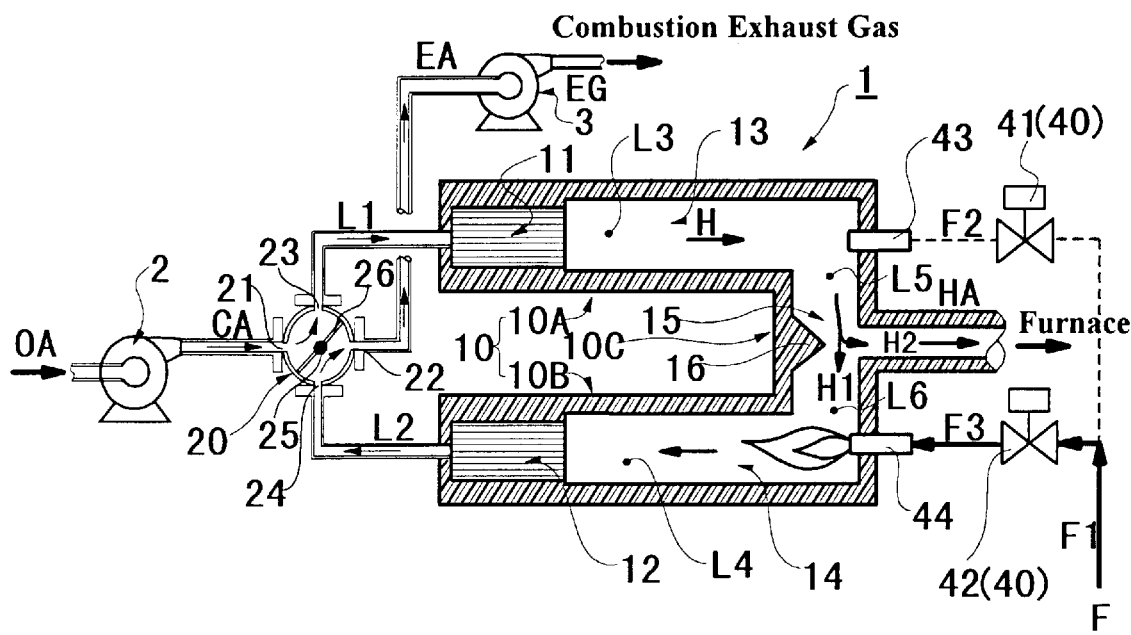
Figure 3:
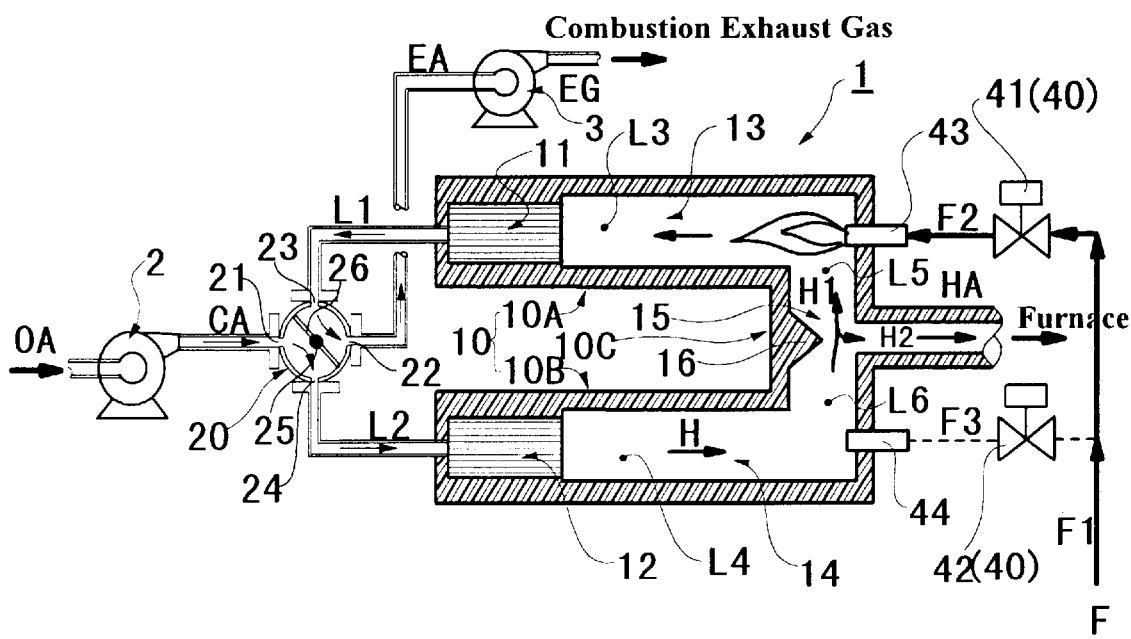

The passage CA is connected to a delivery port of the forced draft fan 2 as shown in FIG. 3, and a suction port of the fan 2 is connected to an ambient air intake 19 by means of the air intake passage OA as shown in FIG. 1. The fan 2 induces ambient atmospheric air in a normal temperature through the air intake 19 and delivers it to the passage CA tinder pressure.

As shown in FIG. 3, the changeover means 20 has an air inlet port 21 in communication with the passage CA and an exhaust gas outlet port 22 in communication with the passage EA. The changeover means 20 further comprises a first inlet/outlet port 23 in communication with the first passage L1 and a second inlet/outlet port 24 in communication with the second passage L2. The first port 23 is connected to a proximal end of the first heat-exchanger 11 through the first passage L1, and the second port 24 is connected to a proximal end of the second heat-exchanger 12 through the second passage L2.

The changeover means 20 comprises a four-way valve assembly with a high speed or high cycle changeover mechanism selectively switched to first and second positions, which has a rotary valve body 26 in a form of plate fixed on a central rotary shaft 25. The shaft 25 is driven in rotation by a four-way valve driving device (not shown), which operates the valve assembly to selectively occupy the first position as shown in FIGS. 2A 3A or the second position as shown in FIGS. 2B: 3B.

The driving device alternately rotates the shaft 25 in a predetermined time interval. The changeover means 20 is alternately switched to the first position and the second position. In the first position (FIGS. 2A: 3A), the first passage L1 communicates with the air introduction passage CA and the second passage L2 communicates with the exhaust gas passage EA, and in the second position (FIGS. 2B: 3B), the second passage L2 is in communication with the passage CA and the first passage L1 is in communication with the passage EA.

In the first position of the changeover means 20 (the first preheating process) as shown in FIG. 2A, the ambient air or combustion air introduced into the first passage L1 is fed to the first heat exchanger 11 to be heated by the heat exchanger 11 and flows into the splitting area 15 through the intermediate passages L3, L5 and the first combustion area 13 as being the preheated air flow H at a predetermined temperature. The preheated air flow H is split into the first and second preheated air streams H1, H2 in the splitting area 15.

The first air stream H1 is introduced through the fourth intermediate passage L6 into the second combustion area 14, which is provided with a second burner 44. The burner 44 is connected to a second fuel feed line F3 which is connected to a main fuel supply line F1 through fuel control means 40. The supply line F1 constitutes the fuel supply system of the heating apparatus 1. The first air stream H1 fed to the second combustion area 14 takes a combustion reaction therein with firing of the burner 44 to produce combustion exhaust gas at a high temperature. The combustion exhaust gas thus produced flows into the end of the second heat-exchanger 12 through the second intermediate passage L4 and passes through the heat-exchanger 12 to heat it to a predetermined temperature, and thereafter, the combustion exhaust gas flows into the second passage L2 from the proximal end of the heat-exchanger 12. The combustion exhaust gas of the passage L2 is induced by the fan 3 (FIG. 3) and discharged through the exhaust gas passage EG and the discharge port 30 (FIG. 1) to the ambient atmosphere.

On the other hand, the second preheated air stream H2 split in the splitting area 15 is delivered to the main burner throat 50 through the preheated air feed passage HA and mixed with the fuel fed by the fuel supply system CF (FIG. 1) to generate a flame zone on the throat 50 of the furnace 6.

In the second position of the changeover means 20 (the second preheating process) as shown in FIG. 2B, the ambient air or combustion air introduced into the second passage L2 is fed to the second heat-exchanger 12 to be heated by the heat-exchanger 12 and flows into the splitting area 15 through the intermediate passages L4, L6 and the first combustion area 13 as being the preheated air flow H at a predetermined temperature. The preheated air flow H is split into the first and second preheated air streams H1, H2 in the splitting area 15.

The first air flow H1 is introduced through the third intermediate passage L5 into the first combustion area 13, which is provided with a first burner 43. The burner 43 is connected to a first fuel feed line F2 which is connected to the main fuel supply line F1 through the fuel control means 40. The first air stream H1 fed to the first combustion area 13 takes a combustion reaction therein with firing of the burner 43 to produce combustion exhaust gas at a high temperature The combustion exhaust gas thus produced flows into the end of the first heat-exchanger 11 through the first intermediate passage L3 and passes through the heat-exchanger 11 to heat it to a predetermined temperature, and thereafter, the combustion exhaust gas flows into the first passage L1 from the proximal end of the heat-exchanger 11. The combustion exhaust gas of the passage L1 is induced by the fan 3 (FIG. 3) and discharged through the exhaust gas passage EG and the discharge port 30 (FIG. 1) to the ambient atmosphere.

On the other hand, the second preheated air stream H2 split in the splitting area 15 is delivered to the main burner throat 50 through the preheated air feed passage HA and mixed with the fuel fed by the fuel supply system CF (FIG. 1) to generate a flame zone on the throat 50 of the furnace 6.

As shown in FIG.3, the fuel control means 40 connected to the burners 43, 44 includes first and second fuel control valves 41, 42, the first valve 41 interposed between the feed lines F1, F2 and the second valves 42 interposed between the feed lines F1, F3. The feed. line F1 is connected to a fuel source (not shown) constituting the hydrocarbon fuel feed system F. The control means 40 is operated in synchronism with the changeover means 20 under control of electronic control devices and the like (not shown), so that the first and second valves 41, 42 are selectively opened, to alternately supply a hydrocarbon fuel to either one of the first and second burners 43, 44. Therefore, the first burner 43 injects the fuel into the first combustion area 13 when the changeover means 20 resides in the second position (FIGS. 2B; 3B) and stops the injection in its first position (FIGS. 2A; 3A), where as the second burner 44 injects the fuel into the second combustion area 14 when the changeover means 20 is in the first position (FIGS. 2A; 3A), and stops the injection in its second position (FIGS. 2B; 3B).

The changeover means 20 keeps the valve body 26 in the first position while a combustion reaction is generated in the second combustion area 14, wherein the first passage L1 communicates with the air introduction passage CA and the second passage L2 communicates with the exhaust gas passage EA, as shown in FIGS. 2A and 3A. On the other hand, the changeover means 20 keeps its valve body 26 in the second position while a combustion reaction is generated in the first combustion area 13, wherein the second passage L2 communicates with the passage CA and the first passage L1 communicates with the passage EA, as shows in FIGS. 2B and 3B.

As shown in FIG. 3, the heat exchanging system 10 constituting the heating apparatus 1 comprises a first preheating furnace unit 10A, a second preheating furnace unit 10B and a communication unit 10C. The first unit 10A contains the first heat exchanger 11 and defines the first intermediate passage L3 and the first combustion area 13 in series, whereas the second unit 10B contains the second heat-exchanger 12 and defines the second intermediate passage L4 and the second combustion area 14 in series. The communication unit 10C connects the first and second units 10A, 10B with each other and defines a third and forth intermediate passages L5, L6 and splitting area 15. The first and second units 10A, 10B have substantially the same construction and function. These units 10A, 10B, 10C are positioned symmetrically with respect to a center axis of the heating apparatus 1, and they are integrally formed from desired thermal-resistant refractory materials, such as thermal-resistant castable lining materials, refractory bricks, insulating firebricks, thermal-resistant ceramic materials or the like.

The first and second unit 10A,10B are provided on their end walls with first and second burners 43, 44 for firing toward the respective combustion areas 13, 14 in such a manner that the flame faces against the end surface of the heat exchanger 11,12. Each of the first and second burners 43, 44 is provided with attachments or accessories such as a pilot burner, ignition transformer and so forth. Depiction of those attachments or accessories, however, are omitted from the drawings for the purpose of simplification of illustration.

The communication unit 10C has a structure symmetrical with respect to the center axis of the heating apparatus 1 The unit 10C is formed with a protrusion or projection 16 in a triangle formation, which projects inward of the flow passage in alignment with the center axis. An inlet port of the preheated air flow supply passage HA opens on the inside wall in alignment with the center axis and is positioned in opposition to the apex of the protrusion 16. The protrusion 16 locally forms a narrow passage, portion between the third and fourth intermediate passages L5, L6. The protrusion 16 functions as an orifice or fluid flow resistance, splitting and acts as dividing means for splitting the preheated air flow H into first and second preheated air streams H1, H2 and orienting the divided streams H1, H2 in predetermined directions.

The delivery pressure and suction pressure of the fans 2, 3 act on the heating units 10A, 10B. The pressure balance of the fluid pressure in the unit 10A, 10B and the fluid pressure in the passage HA are adjusted or controlled by the orifice formed by protrusion 16. Thus, the preheated air flow H flowing into the splitting area 15 is divided into the first and second streams H1, H2, each having a desired flow rate in accordance with the dynamic pressure control and the splitting action of the protrusion 16.

Each of the first and second heat-exchangers 11, 12, through which the combustion air and the combustion exhaust gas pass, comprises a ceramic regenerator of honeycomb structure with a great number of cell holes or apertures defining a plurality of fluid passages or channels through which the air and exhaust gas can flow. For example, a commercially available ceramic honeycomb products having a large number of narrow cell passages (cell holes) can be preferably used for the regenerator, which is generally used as a media of catalyst in an ammonium selective catalytic reduction method or the like.

Figure 4:
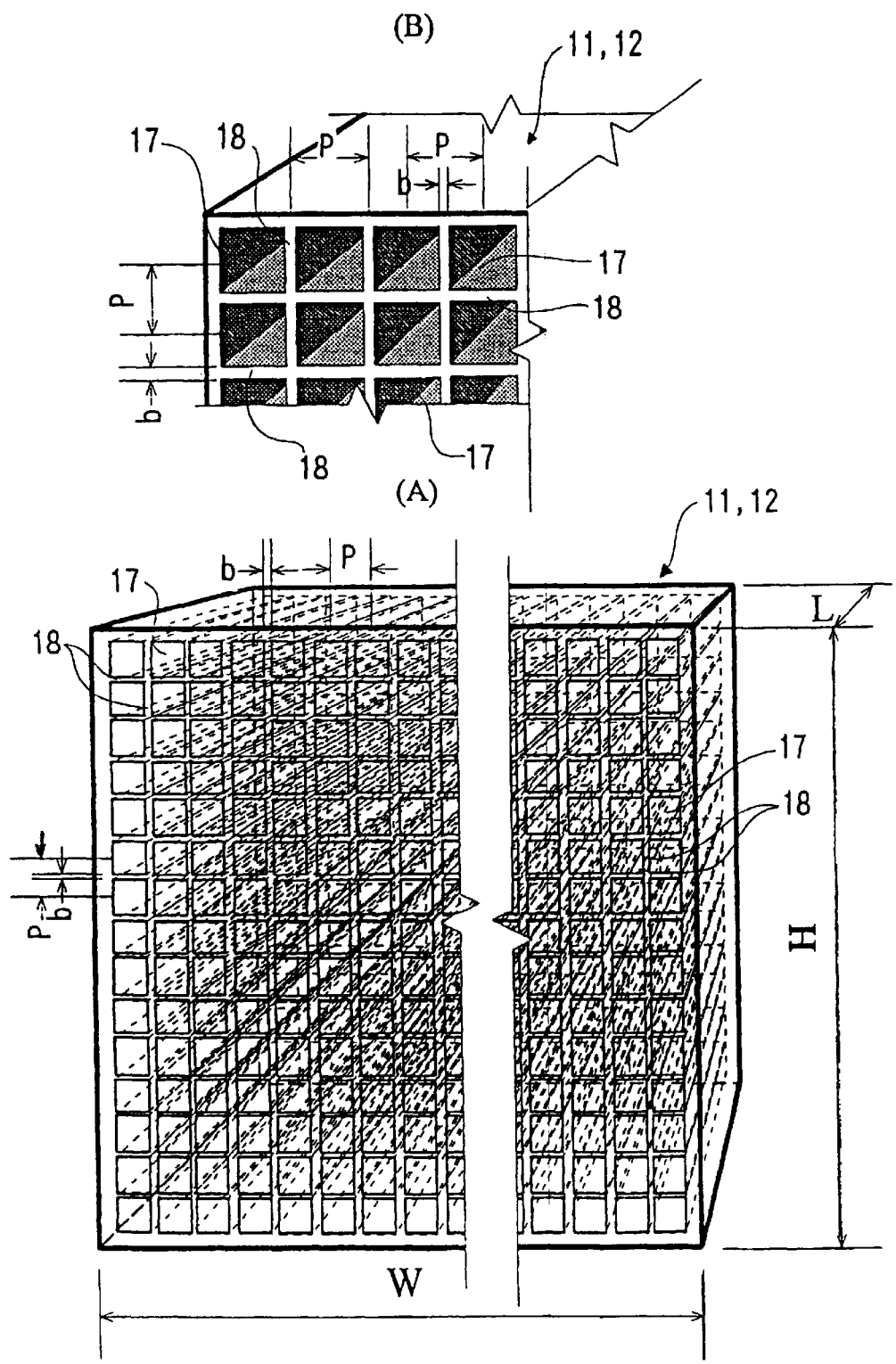
FIG. 4 includes a perspective view (FIG. 4A) and a fragmentary enlarged perspective view (FIG. 4B) of a regenerator of first or second heat exchanger.
Figure 5:
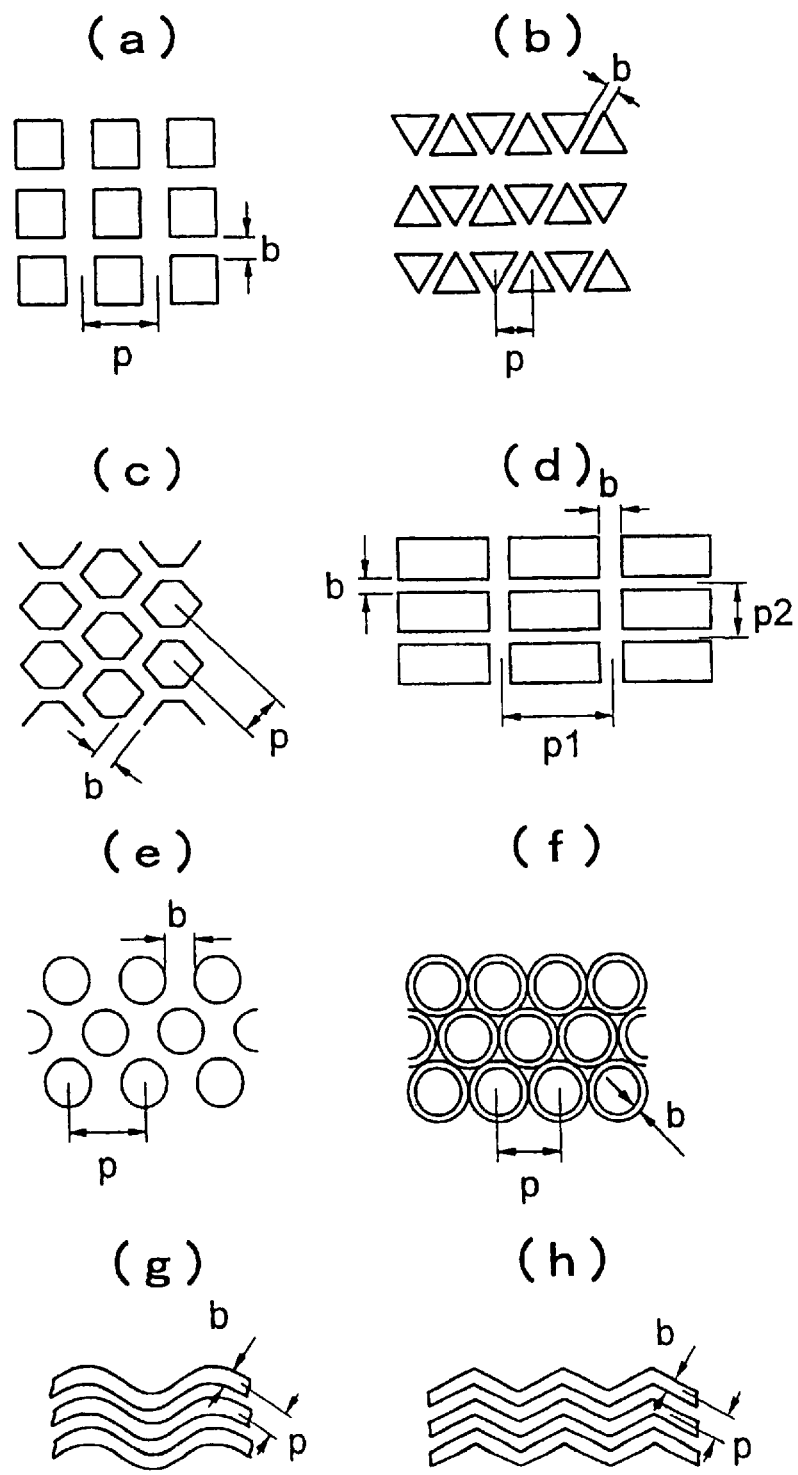
FIG. 5 is a partial cross-sectional view showing a variety of honeycomb structure of the regenerator.

FIG. 4 includes a perspective view showing the regenerator of the heat-exchanger 11,12 (FIG. 4A) and a partially enlarged perspective view thereof (FIG. 4B), and FIG. 5 is a partially enlarged cross-sectional view illustrating various types of honeycomb structure of the regenerator. The regenerator defining the heat-exchanger 11,12 which is formed in a lattice formation with a plurality of cell apertures (fluid passages) 17, each having a square cross-section. As shown in FIG. 4, the regenerator has the width W, the length L and the height H set to be the dimensions adapted for incorporation in the unit 10A, 10B. The honeycomb wall thickness b of the cell wall 18 defining the passage 17 and the honeycomb pitch P (the distance between the cell walls 18) are preferably set to be the dimensions b, P which correspond to a maximum volumetric efficiency of the regenerator and ensure the temperature effectiveness in a range of 0.7~1.0.

As shown in FIG. 2A, the low temperature combustion air flow (temperature Tci) introduced from the passage CA is introduced through the first flow passage L1 into the fluid passages 7 of the first heat exchanger 11 to be in heat-transferable contact with the surfaces of the cell walls 18, so that the air flow is heated to the high temperature by the heat exchange action with the cell walls 18. The combustion air heated to be a high temperature air flow H (temperature Tco) is delivered from the heat exchanger 11 into the splitting area 15. A predetermined ratio of the combustion air flow (temperature:Tco) is fed to the second combustion area 14 as the first preheated air stream H1 to take a combustion reaction with the fuel fed from the second burner 44, whereas a predetermined ratio of the combustion air (temperature:Tco), which is the remaining part of the air flow H in this embodiment, is introduced into the burner throat 50 of the furnace 6 as the second preheated air stream H2 to take a combustion reaction therein. The combustion exhaust gas at the high temperature (Temperature:Thi) produced in the second combustion area 14 passes through the fluid passages 17 of the second heat exchanger 12 so as to be in heat transferable contact with the cell walls 18, whereby the heat exchanger 12 is heated by the heat exchange action with the exhaust gas. The exhaust gas cooled by the heat-exchange action with the heat-exchanger 12 is delivered through the passage L2, EA and the changeover means 21 as flue gas at a low temperature (Tho).

As the changeover means 21 is switched from its first position to the second position, the low temperature combustion air flow (temperature:Tci) is introduced from the second flow passage L2 into the fluid passages 17 of the second heat exchanger 12 to be in heat-transferable contact with the surfaces of the cell walls 18, so that the air flow is heated to the high temperature by the heat-exchange action with the cell walls 18. The combustion air is heated to be the high temperature air flow H (temperature:Tco) which is delivered from the heat exchanger 11 into the splitting area 15. A predetermined ratio of the combustion air flow (temperature:Tco) is fed to the first combustion area 13 as the first preheated air stream H1 to take a combustion reaction with the fuel fed from the first burner 43, whereas a predetermined ratio of the combustion air (temperature:Tco), which is the remaining part of the air flow H in this embodiment, is introduced into the burner throat 50 of the furnace 6 as the second preheated air stream H2 to take a combustion reaction therein. The combustion exhaust gas at the high temperature (Temperature:Thi) produced in the first combustion area 13 passes through the fluid passages 17 of the first heat exchanger 11 so as to be in heat transferable contact with the cell walls 18, whereby the heat-exchanger 12 is heated by the heat exchange action with the exhaust gas. The exhaust gas cooled by the heat-exchange action with the heat-exchanger 11 is delivered through the passage L2, EA and the changeover means as flue gas at the low temperature (Tho)

The volumetric efficiency (Q/V) and the temperature effectiveness (ηt) can be defined by the following equation:

$$Q/V = \eta t (Thi - Tci)(1-\epsilon) Cm/\tau \cdot PM_2/PM_1 \quad (1)$$

$$\eta t = 1/(1 + 2/PM_1 + \exp(-2PM_1/PM_2)) \quad (2)$$

and $PM_1$ and $PM_2$ in the equation (2) are determined as follows:

$$PM_1 = hA/Cg\ Gg$$

$$PM_2 = hA\tau/Cm\ Gm$$

wherein the respective symbols represent the following factors:

Tci: inlet temperature of the low temperature fluid ° C.
Thi: inlet temperature of the high temperature fluid ° C.
$\epsilon$: void ratio or voidage of the heat accumulator
A: heat transmission area $m^2$
h: heat transmission coefficient $Kcal/m^2ha°$ C.
$\tau$: switching cycle time hr
Cg: constant-pressure specific heat of gas $Kcal/m^3N°$ C.
Gg: flow rate of the fluid $m^3N/h$
Cm: specific heat of the heat accumulator $Kcal/m^{3°}$ C.
Gm: net volume of the heat accumulator $m^3$ The void ratio ($\epsilon$), heat transmission coefficient (h) and heat transmission area (A) of the regenerator 11, 12 are so determined that the temperature effectiveness (ηt) indicates a value ranging from 0.7 to 1.0 and that the volumetric efficiency (Q/V) exhibits a maximum value. In correspondence with the void ratio ($\epsilon$), heat transmission coefficient (h) and heat transmission area (A) thus determined, the pitch P and the thickness b are determined. The net volume (Gm), heat transmission area (A) and flow rate (Gg) are those of the whole heat exchanger (regenerator). As the detail of the regenerator is disclosed in Japanese Patent Application No. 5-6911 (Laid-Open No. 6-213585), and therefore, further detailed description thereon, is omitted by reciting this reference.

FIG. 5 is a cross-sectional view showing alternative forms of the honeycomb structure of the regenerator constituting the heat exchanger 11, 12.

The honeycomb structure of the regenerator includes a variety of structures which have fluid passage divided into channels in a formation of honeycomb. The cross-sectional configuration of the channel is not limited to be a square form as shown in FIG. 4, but various forms of the channel of honeycomb structure may be adopted, which are illustrated in FIG. 5. The flow channel in the honeycomb structure may have a circular, triangular, square, rectangular or hexagonal cross-section, a assembly of tubes with circular cross-section or plates, and so forth. In FIG. 5, the pitch p and the thickness b are exemplified in those channels.

The operation of the gaseous fluid heating apparatus 1 will be described hereinafter.

In association with the operation of the, furnace 6, the fans 2,3 are operated, and the changeover means 20 and the first and second burners 43 44 of the heating apparatus 1 are operated tinder a synchronous switching control performed in a predetermined time interval. In a predetermined time interval, which is set to be preferably no longer than 60 seconds, and more preferably so longer than 30 seconds, the changeover means 20 is alternately switched to either of the first or second positions and the combustion air at relatively low temperature (the ambient air temperature) is alternately fed to either of the first and second heatexchangers 11, 12. In synchronism with the switching operation of the changeover means 20, on-off operation of the first and second fuel control valves 41, 42 are effected so that the combustion fuel, such as methane, ethane, propane, kerosene or heavy oil is alternately fed to either of the first and second burners 43, 44, whereby the first and second burners 43,44 alternately fire. The first burner 43 fires in the second position of the changeover means 20, whereas the second burner 44 fires in the first position of the changeover means.

The combustion air fed to the heat exchanger 11, 12 is heated in heat transfer contact with the cell wall surfaces of the regenerator to be heated to a predetermined temperature by heat exchange action therewith. The hot air flow H preheated preferably to a high temperature range over 800° C., and more preferably higher than 1,000° C., is split into the first and second air streams H1, H2 in the splitting area 15 and the stream H1 is directed to the first or second combustion area 13, 14 to take a combustion reaction with the fuel of the first or second burner 43, 44 and pass through the heat exchanger 11, 12 as the high temperature combustion exhaust gas in a range from 1,200° C. to 1,600° C., which is in heat transfer contact with the cell wall surfaces of the heat exchanger 11, 12 to raise the surface temperature and internal temperature of the cell walls and which flows into the passage L1, L2 as a cooled exhaust gas. The exhaust is induced by the fan 3 (FIG. 3) and discharged to the ambient atmosphere through the exhaust passage EA and the discharged port 30 (FIG. 1).

In the aforementioned preheating processes of the heating apparatus 1, the synchronous switching operation of the changeover means 20 and the fuel control means 40 in the predetermined time interval allows the sensible heat of the combustion exhaust gas of the area 13, 14 to be transmitted to the regenerator of the heat exchanger 11, 12. The sensible heat accumulated in the heat exchanger 11, 12 is emitted to the low temperature combustion air which is introduced thereinto after the successive changeover operation of the changeover means 20 and the fuel control means 40, so that the combustion air is heated to a high temperature. Such heat accumulating and heat emitting actions are repeatedly and alternately taken in a short time so that the heat exchange is smoothly performed between the combustion exhaust gas and the combustion air, whereby the first and second air streams H1, H2 is continuously and stably preheated to a temperature range from 800° C. to 1,000° C.

The second air stream H2 split in the area 15 is fed to the burner throat 50 of the furnace 6 so as to fire the waste with the combustion fuel of the fuel feed system CF (FIG. 1) so that the waste takes a gasification and slagging reaction.

Figure 6:
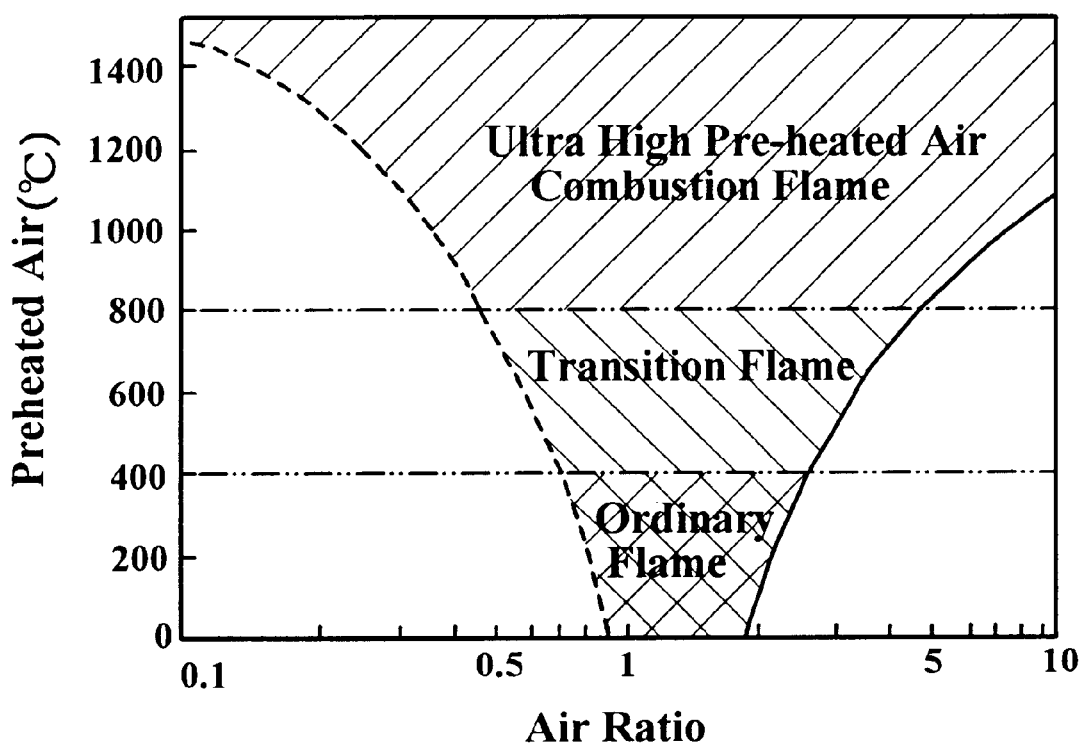
FIG. 6 is a graphic diagram showing combustible ranges with respect to a combustion reaction in a combustion area supplied with high temperature preheated air.

FIG. 6 is a diagram showing the combustible range of the combustion air in the combustion area 13, 14 and the throat 50. In comparison with the combustion of ordinary flame (the temperature of air $\leqq 400°$ C.) or transition flame (400° C. <the temperature of air <800° C.), the ultra high temperature heated air combustion (the temperature of air $\geqq 800°$ C.) allows a stable combustion in an extensively wide range of air ratio. The flame stability in such a combustion manner with use of the extremely high temperature combustion air is considered to be derived from the phenomenon in that the nature of combustion flame entirely differs from that of the conventional flame in a reaction velocity, the reaction velocity being effectively increased by the extremely high temperature of the preheated combustion air. In particular, in a case where the combustion air or gaseous mixture for combustion is heated up to the temperature higher than the self-ignition temperature of the fuel, an ignition action can be spontaneously induced without external ignition means. Further, the fluid flow rate or a feeding velocity of the combustion air can be substantially increased, while the combustion air can be fed to an ignition area or a combustion zone without extinguishing the flame. The velocity of the combustion air through the burner throat can be increased and the combustion air at a high velocity can be introduced into the combustion area 13, 14 or the combustion zone of the throat 50. This contrasts with the conventional combustion theory in that the combustion air conventionally preheated to the temperature range of 200° C.~400° C. can not be logically and practically increased in its flow velocity to the velocity range greater than the normal limitation for preventing the flame failure.

As regards the heating apparatus 1, the heat exchange action between the combustion air at a relatively low temperature and the combustion exhaust gas of the combustion areas 13, 14 is caused in the heat exchangers 11,12, and the fuel of the burners 43, 44 stably progresses in the existence of the first stream H1 at a high velocity heated tip to the temperature higher than the self-ignition temperature of the fuel.

Further, the combustion air is heated merely by the sensible heat emission of the heat exchanger 11,12, and the oxygen density of the combustion air to be fed to the throat 50 is not substantially changed in the preheating process. Therefore, specific means for supplementing or adding oxygen to the combustion air is not required.

Figure 7:
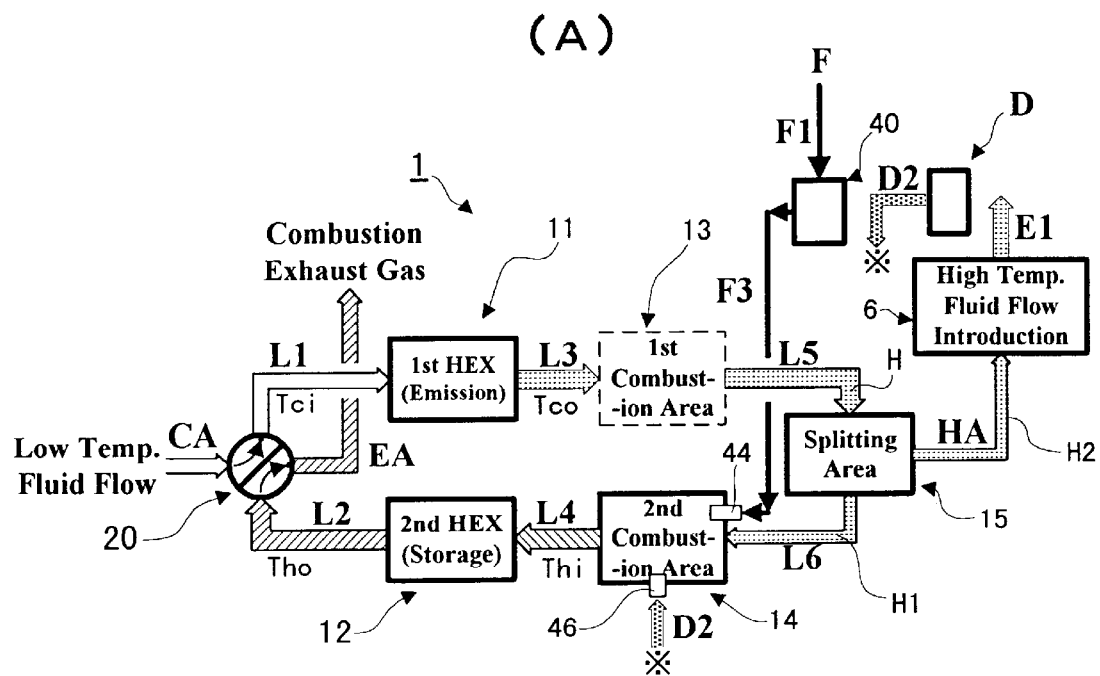
FIGS. 7 and 8 are a block flow diagram and a schematic cross-sectional view showing the arrangement and operation of the apparatus of a second embodiment of the present invention.
Figure 7:
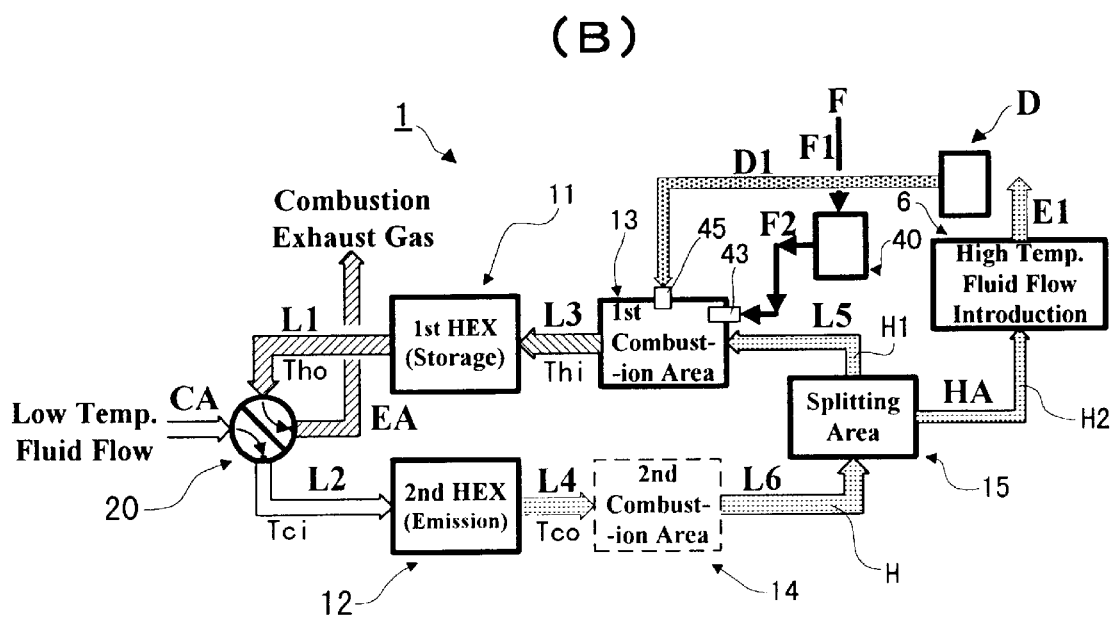
Figure 8:
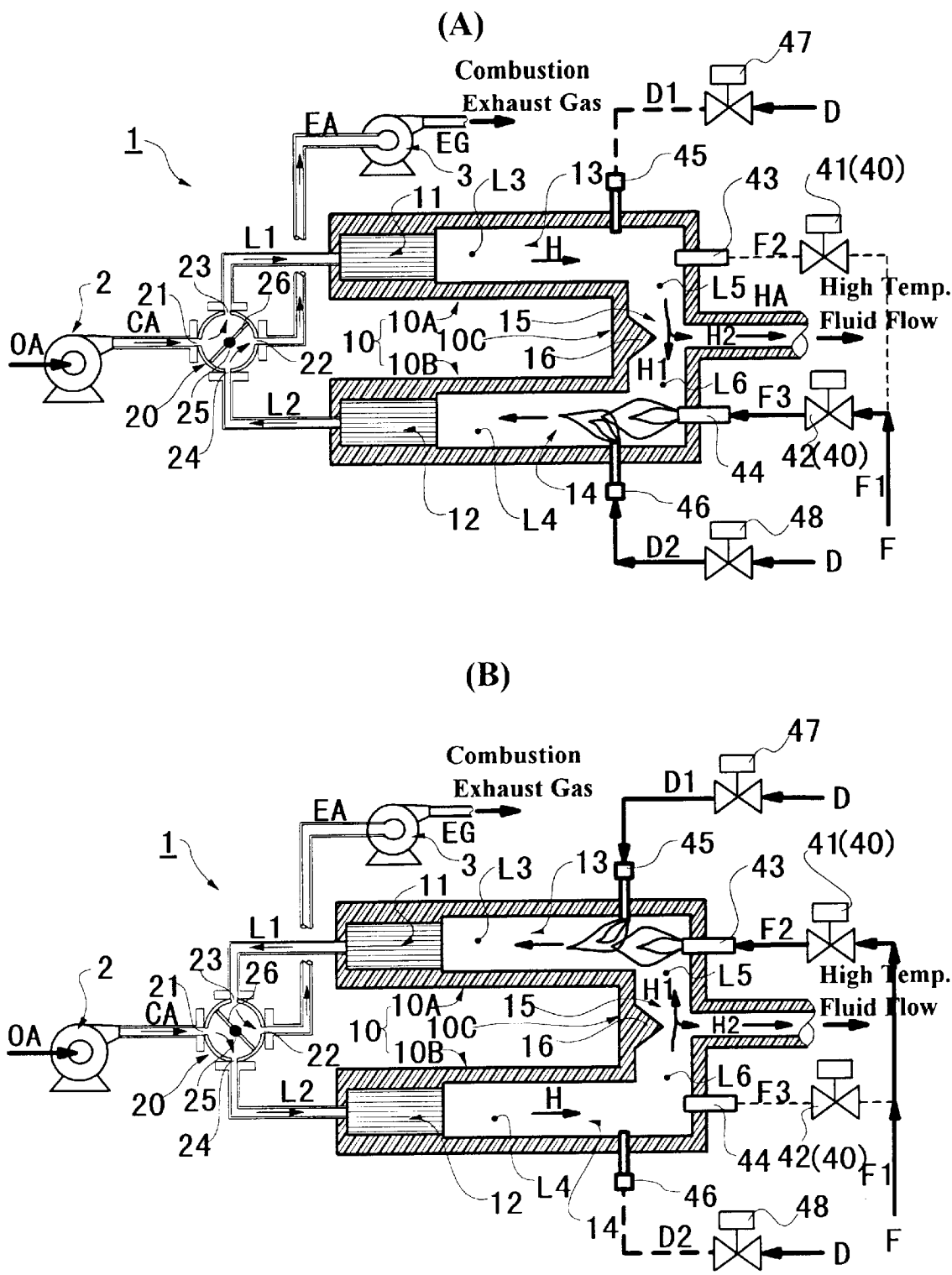

FIGS. 7 and 8 are a block flow diagram and a schematic cross-sectional view showing the arrangement and operation of the apparatus of a second embodiment of the present invention. In those figures, the elements or means substantially same as those in the first embodiment are indicated by the same reference numerals.

The gaseous fluid heating apparatus 1 is connected with a high temperature fluid introduction apparatus 6, such as a combustion apparatus or a heatexchanger using the high temperature air flow, and is also connected with an odor source D, such as a dryer in a painting facility or printing facility. An odorous exhaust gas of the odor source D is alternately fed through either of first and second inlet ports 45, 46 to the first and second combustion areas 13, 14 by odor gas passages D1, D2. As shown in FIG. 8, a first control valve 47 is interposed in the passage D1, and a second control valve 48 is interposed in the passage D2. The first and second valves 47, 48 are switched simultaneously with switching operation of the first and second fuel control valves 41, 42. That is, the opening period of the first control valve 47 corresponds to that of the first fuel control valve 42, and the opening period of the second valve 48 corresponds to that of the second fuel control valve 42. The first and second inlet ports 45, 46 extends through side walls of the first and second combustion areas 13, 14 so as to alternately introduce the odorous exhaust gas of the odor source D into the first and second combustion areas 13, 14. The odor exhaust gas discharged to the first or second area 13, 14 through the first or second port 45, 46 takes a combustion reaction in the existence of the aforementioned preheated air stream H1 by means of the first or second burner 43, 44, so that odor matters or components contained in the exhaust gas undergos a thermal decomposition action in the high temperature combustion atmosphere. Thus, the odor matters or components in the odorous gas effluent from the odor source D undergo the combustion reaction or the thermal decomposition action in the heating apparatus 1, and the exhaust gas deodorized therein is discharged to ambient atmosphere through the fan 3 and the exhaust passage EG. The second preheated air stream H2 split in the splitting area 15 is fed to the apparatus 6, in which the air stream H2 is consumed for an intended use.

Figure 9:
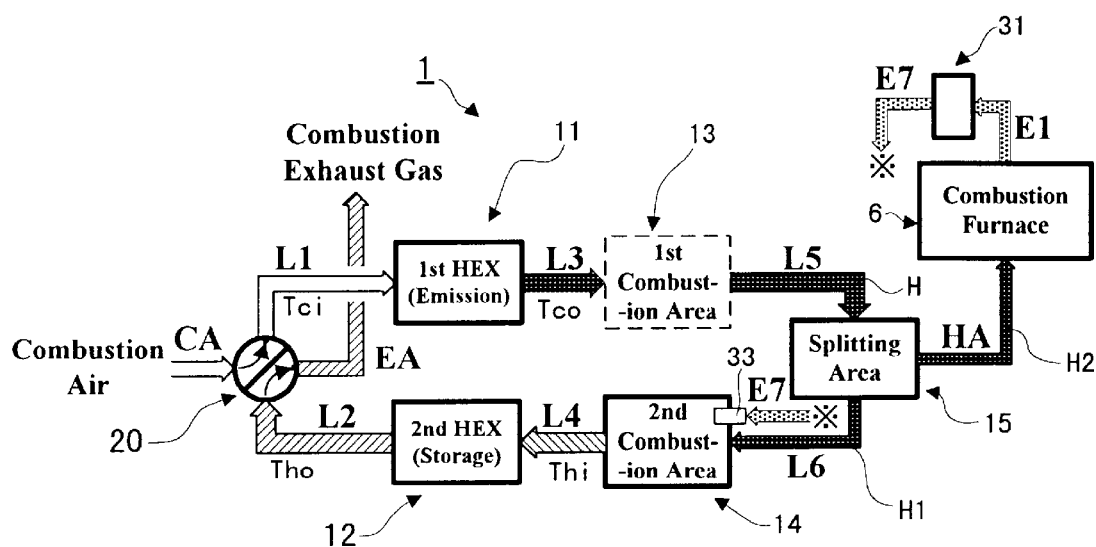
FIGS. 9 and 10 are a block flow diagram and a schematic cross-sectional view showing the arrangement and operation of the apparatus of a third embodiment of the present invention.
Figure 9:
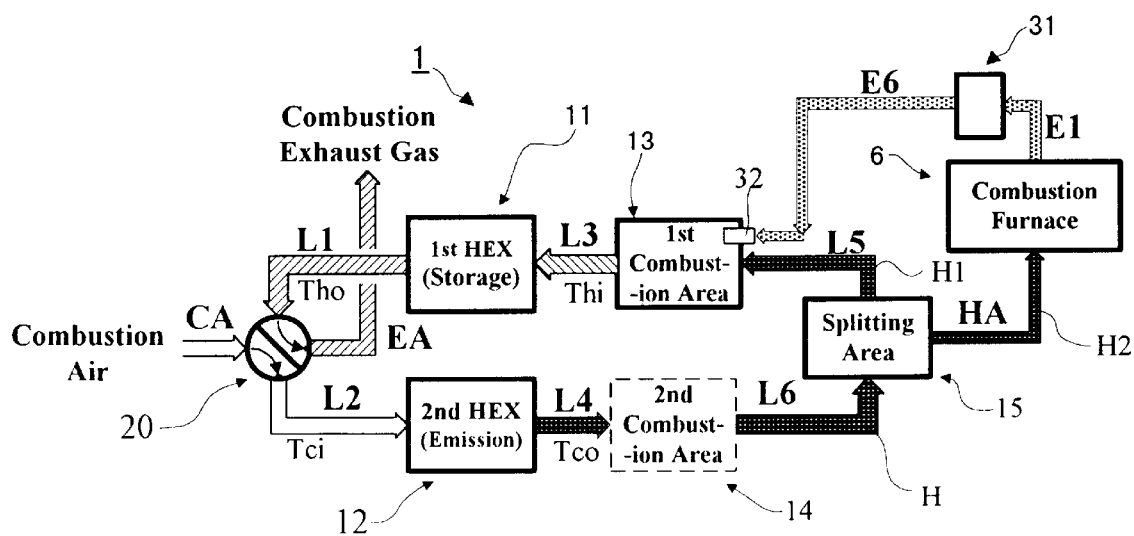
Figure 10:
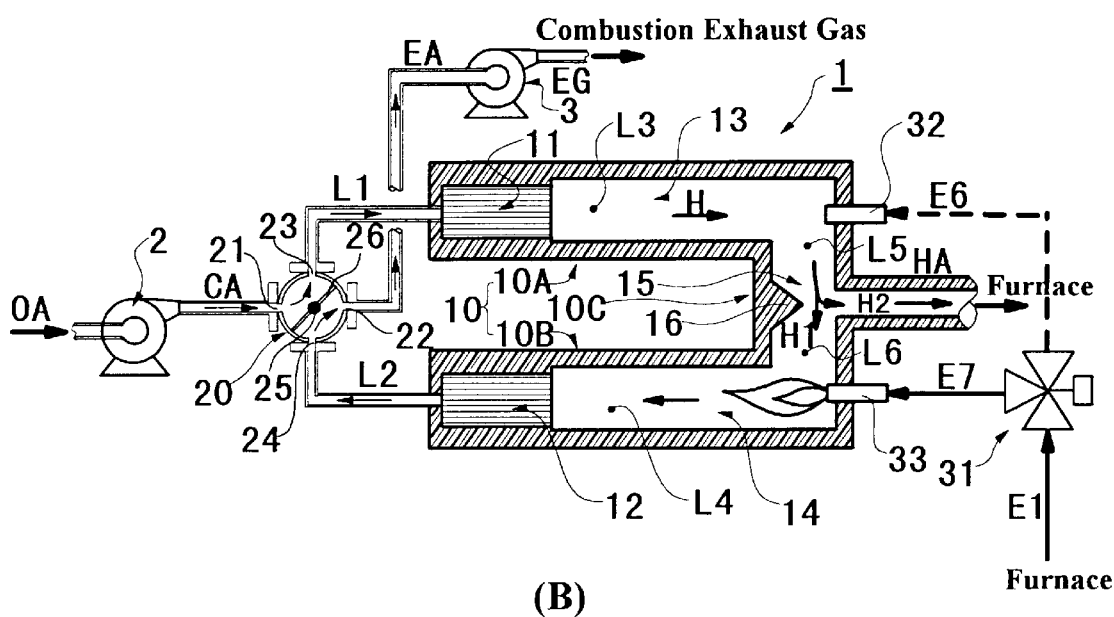
Figure 10:
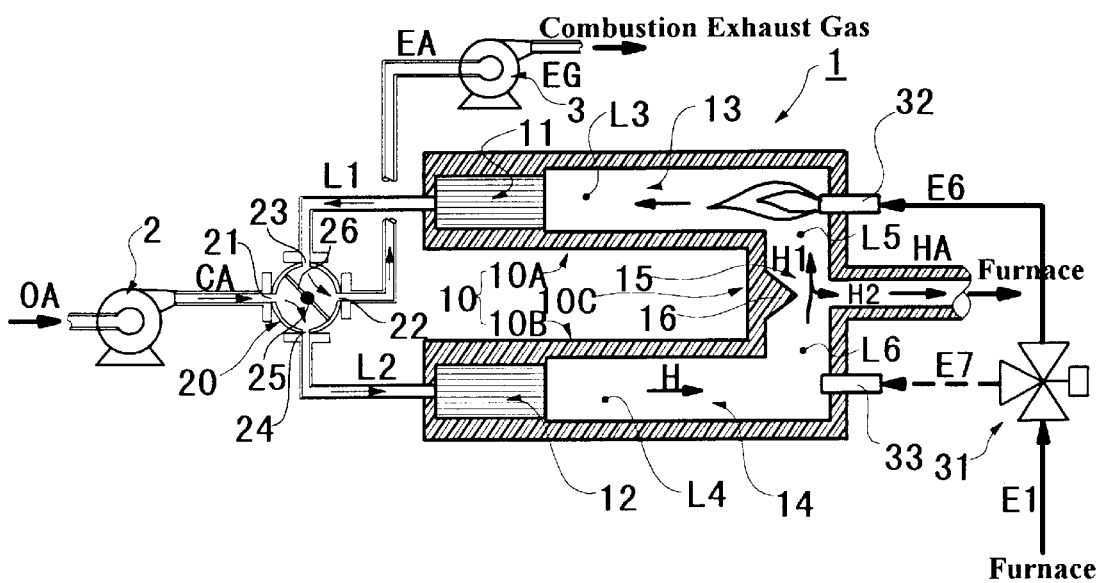

FIGS. 9 and 10 are a block flow diagram and a schematic cross-sectional view generally showing the arrangement and operation made of the gaseous fluid heating apparatus of the third embodiment according to the present invention. In the heating apparatus 1 illustrated in FIGS. 9 and 10, a combustible flue gas produced in a combustion furnace 6 is introduced into the first and second combustion areas 13, 14 through first and second nozzles 32, 33. A secondary combustion reaction of combustible matters in the flue gas is generated as the reburning effects of the areas 13, 14. In FIGS. 9 and 10, the elements or means substantially same as those in the first and second embodiments are indicated by the same reference numerals.

The combustible flue gas effluent from the furnace 6 is alternately introduced into the first and second nozzles 32,33 of the respective areas 13,14 though flue gas passages F1, E6, E7 with a three-way valve 31 and is ignited by an auxiliary ignition means (not shown) of the respective nozzles 32, 33. A flame zone is formed in the area 13, 14 by the combustible flue gas, and its secondary combustion or reburning reaction takes place therein. If desired, each of the nozzles 32, 33 is provided with a fuel injection nozzle for injecting an auxiliary fuel. The valve 31 is controlled in synchronism with the changeover means 20 so that the gas effluent from the furnace 6 is fed to the second nozzle 33 in the first heating process (FIG. 9A; 10A) and that the gas effluent is fed to the first nozzle 32 in the second preheating process (FIG. 9B; 10B).

The unburnt matters or unburnt fuel components contained in the gas effluent of the furnace 6 undergo a complete combustion in a high temperature combustion condition. Nitrogen oxides in the gas effluent is denitrated by a denitfirification action, owing to the high temperature combustion atmosphere in the combustion area 13, 14 which has a low residual oxygen density or low stoichiometric air ratio.

A boiler with use of a hydrocarbon fuel, a combustion apparatus such as a coal gasifier, or a combustible gas generator may be exemplified as the furnace 6. The combustion reaction or thermal decomposition reaction is carried out in the existence of the second air stream flow H2 heated to a high temperature above 800° C.–1000° C. by the heating apparatus 1. Such a combustion reaction with a ultra high temperature air allows the feed of combustion air for the combustion means of the furnace 6 to be limited so as to maintain a combustion reaction of a low stoichiometric air ratio in the combustion area of the furnace 6. The furnace 6 carrying out a combustion reaction under a combustion atmosphere of a low air ratio exhausts the combustible flue gas containing a relatively large quantity of unburnt matters or unburnt fuel components. As described above, the combustible flue gas is introduced into the combustion areas 13, 14 in which it takes a secondary combustion or reburning reaction. The secondary combustion reaction thus caused in the areas 13, 14 produces a high temperature combustion exhaust gas therein, an amount of heat is transferred to the regenerators of the heat exchangers 11,12 and accumulated in the regenerators. The sensible heat accumulated in the regenerator is transferred to a low temperature combustion air introduced into the heat exchangers 11, 12 after the successive changeover operation of the changeover means 20 and the, valve 31 so as heat the combustion air.

Figure 11:
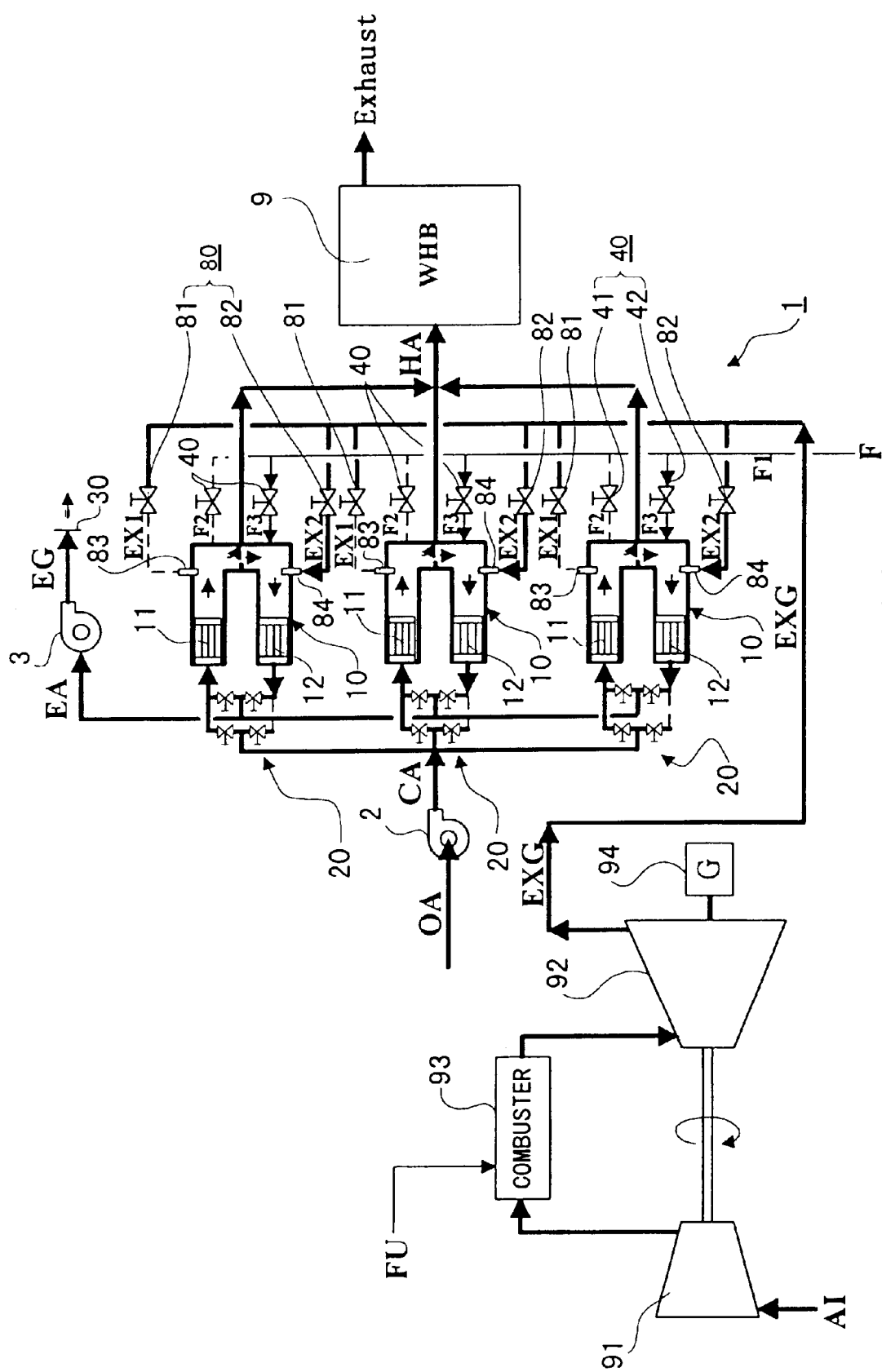
FIG. 11 is a schematic block flow diagram partially showing an arrangement of an exhaust system of a gas turbine with the apparatus of a fourth embodiment of the present invention.
Figure 12:
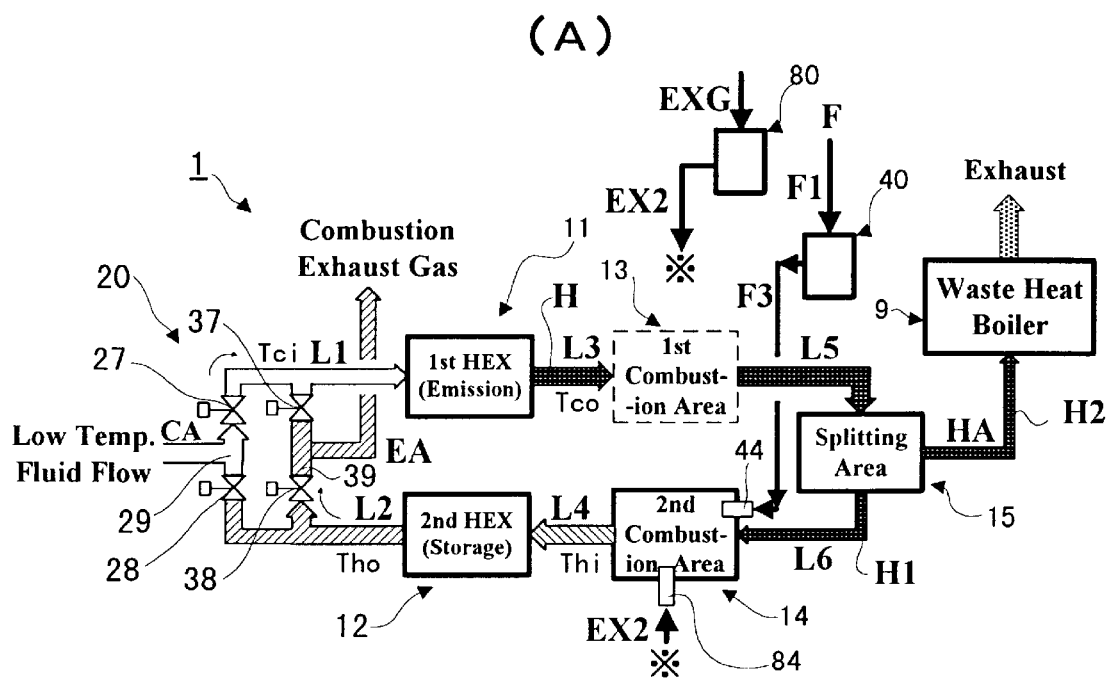
FIG. 12 is a block flow diagram showing the arrangement and operation of the apparatus as shown in FIG. 11.
Figure 12:
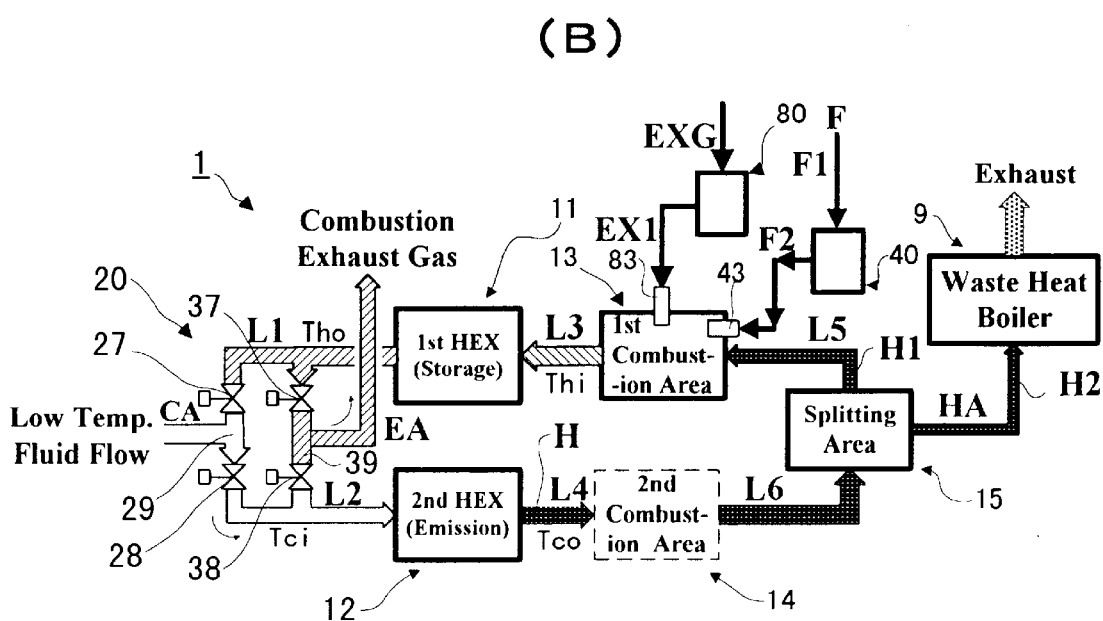

FIG. 11 is a schematic block flow diagram partially showing an arrangement of an exhaust system of a gas turbine in a fourth embodiment, and FIG. 12 is a block flow diagram showing the arrangement and operation of the heating apparatus. In those figures, the elements or means substantially same as those in the aforementioned embodiments are indicated by the same reference numerals.

In FIG. 11, a gas turbine plant comprises a compressor 91 compressing intake air introduced though an air passage AI, and a combustor 93 with use of fuel of a fuel supply system FU, into which compressed air is introduced from the compressor 91. A turbine causes an adiabatic expansion of the combustion gas effluent from the combustor 93 at a high temperature and a high pressure, and an electric generator 94 generates an electric power with rotation of the turbine 92.

The gaseous fluid heating apparatus 1 is in communication with an exhaust gas passage EXG of the turbine 92. The heating apparatus 1 includes a plurality of regenerative heat-exchanging systems 10 arranged in parallel. The passage EXG, which delivers an exhaust gas effluent from the adiabatic expansion step of the turbine 92, branches Pinto first and second exhaust passages EX1, EX2 connected to the systems 10. First and second valves 81, 82 for on-off operation are interposed in the respective passages EX1, EX2. Inlet ports 83, 84 for turbine exhaust gas, which extend through side walls of the first and second combustion areas, are connected to downstream ends of the passages EX1, EX2. The valves 81, 82 constitute a turbine exhaust gas distributor 80 (FIG. 12) for alternately introducing the turbine exhaust gas into either of the combustion areas 13, 14.

Similarly to the respective embodiments as previously described, the heating apparatus 1 is provided with a forced draft fan or compressor 2 for feeding ambient atmospheric air, which delivers a relatively low temperature air to the passage CA under pressure. As shown in FIG. 12, the heating apparatus 1 is provided with first and second intake valves 27, 28 and first and second exhaust valves 37, 38, which define the changeover means 20. The intake valves 27, 28 are in communication with each other by means of a communication passage 29 of the passage CA, and the exhaust valves 37, 38 are in communication with each other by means of a communication passage 39 of the passage EA.

The first intake valve 27 and the second exhaust valve 38 are simultaneously opened or closed under an interlocking control, and the second intake valve 28 and the first exhaust valve 37 are simultaneously opened or closed tinder the interlocking control. The controller of the heating apparatus 1 (not shown) allows the valves 27, 38 to open and the valves 28, 37 to close during the first heating process (FIG. 12A), whereas the controller allows the valves 27, 38 to close and the valves 28, 37 to open during the second heating process (FIG. 12B).

Further, the controller of the heating apparatus 1 allows the second valve 82 to open during the first heating process, so that the turbine exhaust gas of the passage EX2 is introduced into the second combustion area 14, whereas the controller allows the first valve 81 to open during the second heating process, so that the turbine exhaust gas of the passage EX1 is introduced into the first combustion area 13.

According to this embodiment, the turbine exhaust gas is introduced into the combustion areas 13, 14 of the systems 10, and is discharged to the ambient atmosphere after taking a combustion step in the area 13, 14 and a heat accumulation step in the heat exchanger 11, 12 (regenerator). The amount of heat possessed by the turbine exhaust gas, which has been cooled to an order of 600° C., is transferred to the low temperature air flow by the combustion step and the heat accumulation step, whereby the low temperature air is heated to on order of 1,000° C. and fed to a waste heat recovery boiler 9 as the high temperature stream H2, the boiler 9 being arranged on a downstream side of the exhaust system, Therefore, the heating apparatus 1 increases the amount of heat of the turbine exhaust gas with the combustion reaction in the combustion areas 13, 14 and delivers the heated gas flow to the waste heat recovery boiler 9, wherein the gas flow is heated to a high temperature range by the heat recovery and repowering action on the heat possessed by the turbine exhaust gas. That is, the heating apparatus 1 functions as repowering means for improving the heat recovery efficiency.

Similarly to the first embodiment, the heating apparatus 1 performs first and second processes alternately in a preset time interval when the turbine 92 and fans 2, 3 is driven in operation. In the first process (FIG. 12A), the low temperature flow (ambient air) fed to the first passage L1 through the first intake valve 27 is introduced into the first heat-exchanger 11 to be heated therein, and then, passed through the intermediate passages L3, L5 and the first combustion area 13 into the splitting area 15, in which it is split into the first and second heated streams H1; H2. The first flow H1 is introduced through the fourth intermediate passage L6 into the second combustion area 14, in which a firing operation of the second burner 44 allows the stream H1 to take a combustion reaction with the turbine exhaust gas fed through the second inlet port 84 under control of the distributor 80. Combustion :exhaust gas produced in the area 14 is induced by the fan 3 (FIG. 11) through the second intermediate passage L4, heat exchanger 12, flow passage L2, exhaust valve 38 and exhaust gas passage EA, and discharged through the exhaust gas passage EG and the discharge port 30 (FIG. 11) to the ambient atmosphere.

In the second process (FIG. 12B), the low temperature flow (ambient air) fed to the second passage L2 through the second intake valve 28 is introduced into the second heat exchanger 12 to be heated therein, and then, passed through the intermediate flow passages L2, L4 and the second combustion area 14 into the splitting area 15, in which it is split into the first and second heated flows L1; H2. The first flow H1 is introduced through the third intermediate passage L5 into the first combustion area 13, in which a firing operation of the first burner 43 allows the streams H1 to take a combustion reaction with the turbine exhaust gas fed through the first inlet port 83 under control of the distributor 80. Combustion exhaust gas produced in the area 13 is induced by the fan 3 (FIG. 11) through the first intermediate passage L3, heat exchanger 11, flow passage L1, exhaust valve 37 and exhaust gas passage EA, and discharged through the exhaust gas passage EG and the discharge port 30 (FIG. 11) to the ambient atmosphere.

According to the heating apparatus 1 as set forth above, the second stream H2 at a high temperature divided in the splitting area 15 is delivered to the waste heat recovery boiler 9 to improve the heat recovery efficiency thereof. Further, the arrangement of the heating apparatus 1 with the intake valves 27, 28 and the exhaust valves 37, 38 enables variation of control of the changeover means 20, thereby improving applicability of flow control in the heating apparatus 1. In addition, pressure-resistance type of valve such as a high-pressure shut-off valve may be employed as the valves 27, 28, 37, 38 so that high pressure exhaust gas or high-pressure and high-temperature gas effluent from an adiabatic compression step can be heated by the heating apparatus 1. Thus, with the above arrangement, the heating apparatus 1 can be interposed in a high pressure gas supply system of a heat recovery equipment such as a waste heat boiler, or that of a fluidized bed boiler in a PFBC (Pressurized Fluidized Bed Combustion) combined cycle power generation plant or IGCC (Integrated Coal Gasification Combined Cycle) power generation plant so that a high-pressure or compressed gas flow heated to a high temperature by the heating apparatus 1 is fed to a combustion equipment or power plant.

In a case where the heating apparatus 1 has a plurality of regenerative heat exchange systems 10 in parallel to feed the high temperature flow to the exhaust passage EA, the switching timing of the first and second heating processes may be rendered offset to each other for a preset time difference, so that the mode of the respective heating apparatus 1 are not simultaneously changed over. The heating apparatus 1 are switched to a first or second position with a differential time being ensured. Thus, pressure variation of the second stream fed to the passage EA is regulated by the offset changeover timing of the operation mode in the respective heating apparatus 1, so that the pressure of supply flow to the boiler 9 is continuously kept in constant.

Figure 13:
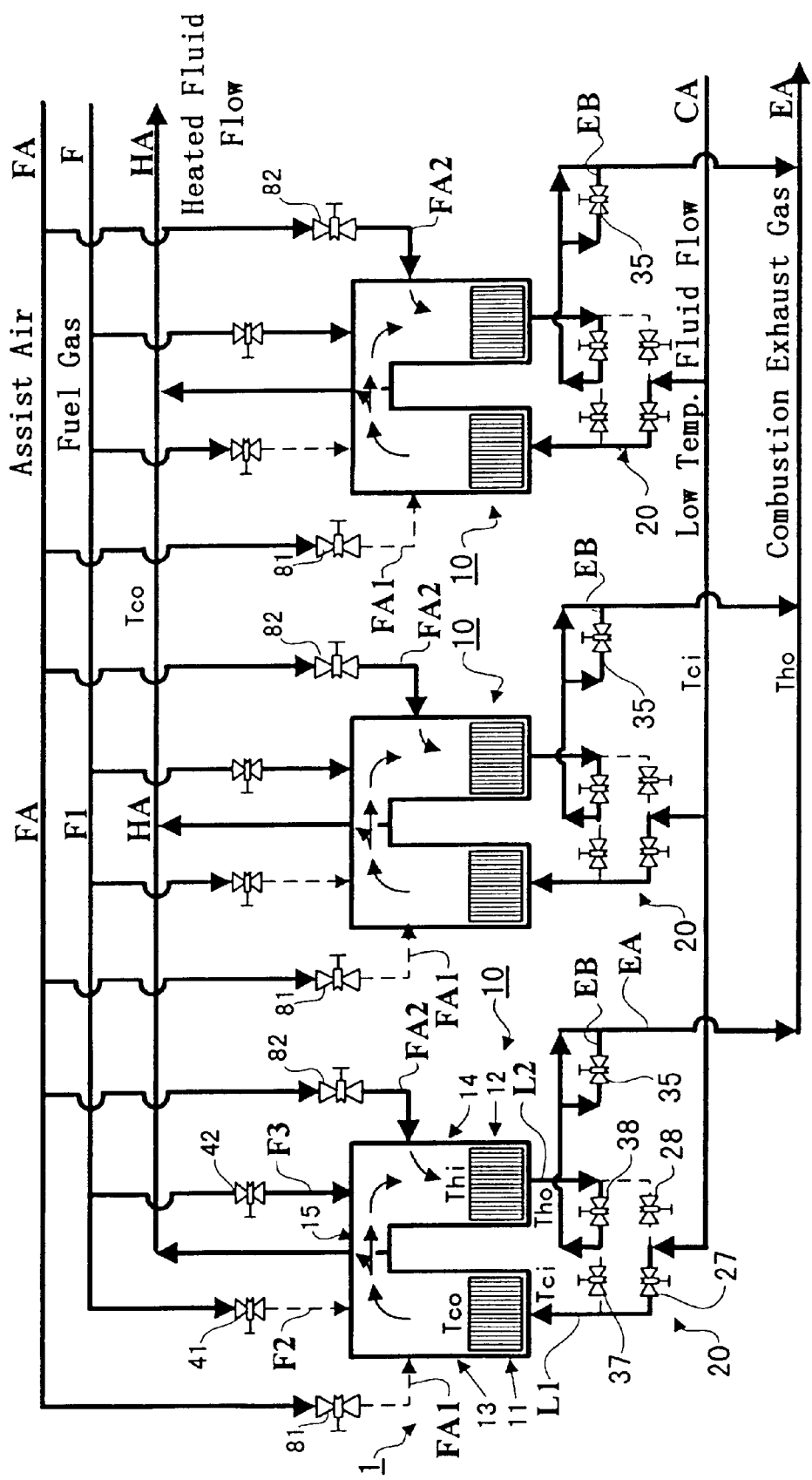
FIG. 13 is a block flow diagram showing an arrangement of the apparatus of a fifth embodiment of the present invention.

FIG. 13 is a schematic block flow diagram generally showing an arrangement of the heating apparatus of a fifth embodiment of the invention, and FIGS. 14 through 18 are block flow diagrams (A) and cross-sectional views (B) illustrating the operation modes of the heating apparatus 1. In those figures, the elements or means substantially same as those in the aforementioned embodiments are indicated by the same reference numerals.

Figure 14:
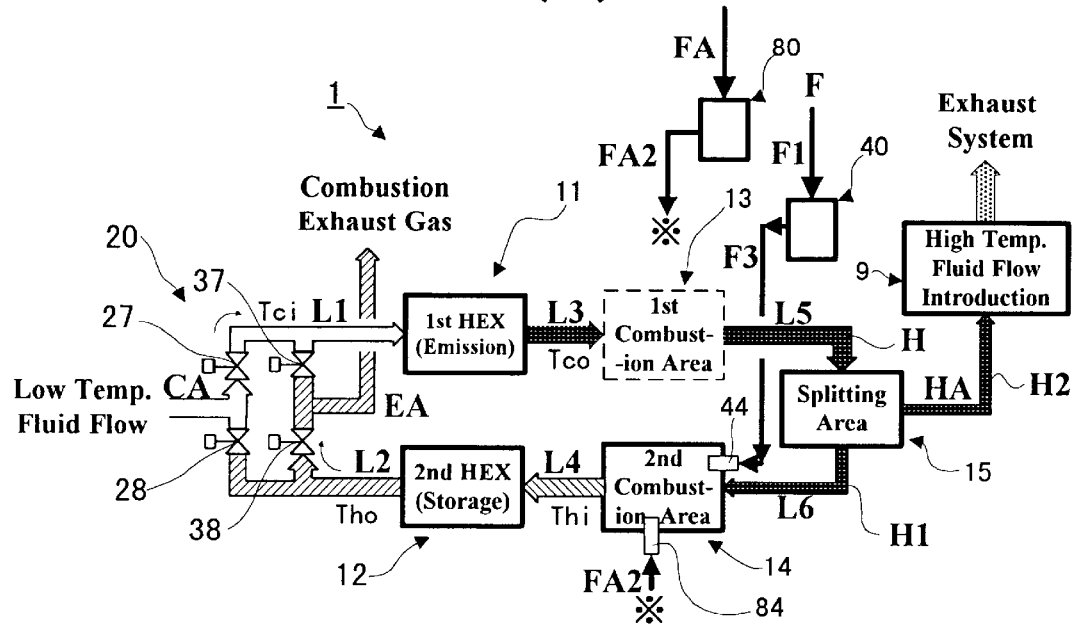
FIGS. 14 through 18 are block flow diagrams (A) and schematic cross-sectional views (B) showing modes of operation in first, first transitive, second transitive, third transitive, and second processes of a regenerative heat-exchanging system as shown in FIG. 13.
Figure 14:
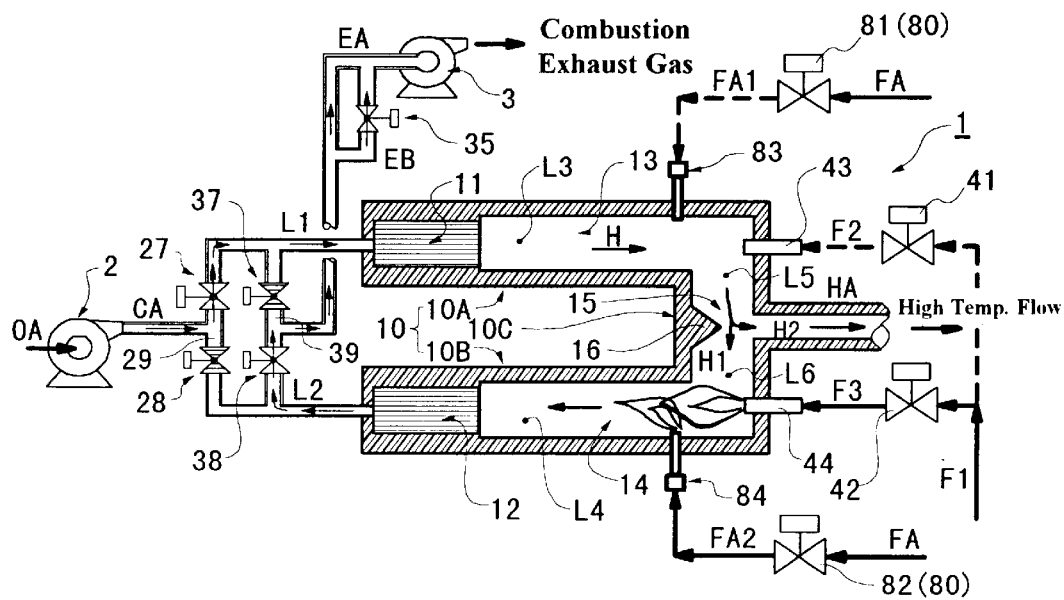

As shown in FIG. 13, the gaseous fluid flow heated by the heating apparatus 1 is delivered to any type of high temperature gaseous fluid introduction equipment (not shown), such as a combustion furnace or a boiler, through a reheated gas passage HA. First and second assist air passage FA1, FA2 branching from a assist air feed passage FA is connected to assist air inlet ports 83, 84 (FIG. 14). The inlet ports 83, 84 open:in the combustion areas 13, 14 of the respective heat exchanging system 10. First and second valves 81, 82 are interposed in the passages FA1, FA2, respectively. The valves 81, 82 are operated simultaneously with the changeover means 20 of the corresponding system 10 under synchronous control of a controller (not shown) to control the supply of assist air to the combustion areas 13, 14.

The heating apparatus 1 comprises a plurality of heat-exchanging systems 10 arranged in parallel. As in the fourth embodiment, the system 10 has the first and second intake valves 27, 28 and the first and second exhaust valves 37, 38. The valves 27, 38, 82 are simultaneously opened and closed under interlocking control, and the valves 28, 37, 81 are simultaneously opened and closed under interlocking control.

The system 10 further comprises an exhaust bypass passage EB and an exhaust flow control valve 35 for adjusting or controlling the flow rate of the exhaust gas passage EA, so that the flow rate of the passage EA is increased during opening of the valve 35 and reduced during closing thereof.

In the first heating process as shown in FIGS. 13 and 14, the controller (not shown) of the heating apparatus 1 allows the valves 27, 38, 82 to open and the valves 28, 37, 81 to close. In the first process, the second fuel control valve 42 is opened and the burner 44 injects hydrocarbon fuel into the second combustion area 14 to generate a combustion reaction therein with the first heated steam H1. The assist air inlet port 84 positioned between the second burner 44 and the second heat exchanger 12 feeds combustion air to a flame zone of the second burner 44 generated in the second combustion area 14 so that combustion air required for the combustion reaction in the area 14 is compensated. Promotion of combustion reaction on the burner 44 results in a complete combustion of the fuel injected from the burner 44. Therefore, emission of unburnt matters of the fuel can be prevented from being entrained with the discharged exhaust gas, and an amount of heat enough to be transferred from the exhaust gas to the second heat exchanger 12 can be ensured.

Figure 18:
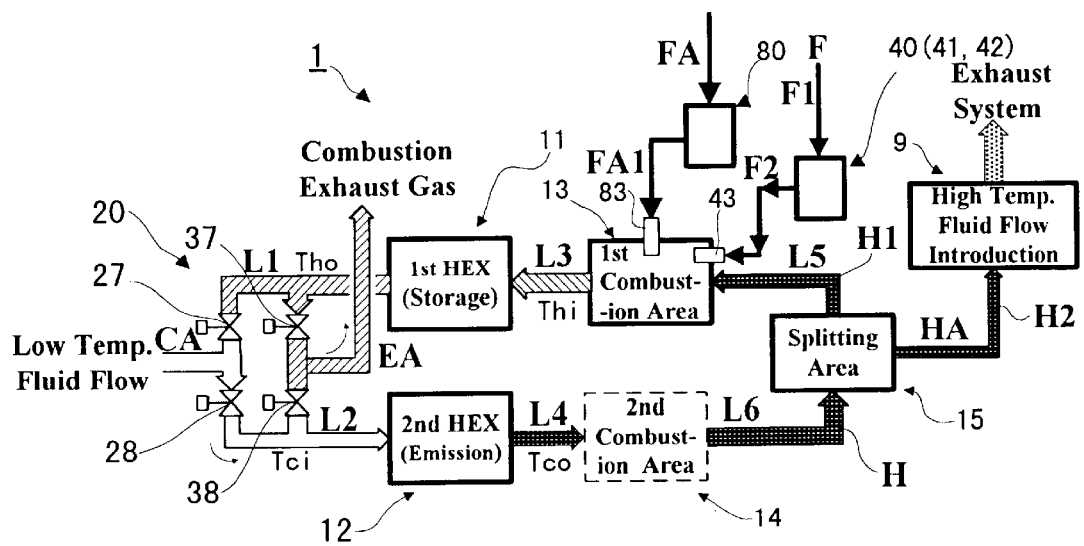
Figure 18:
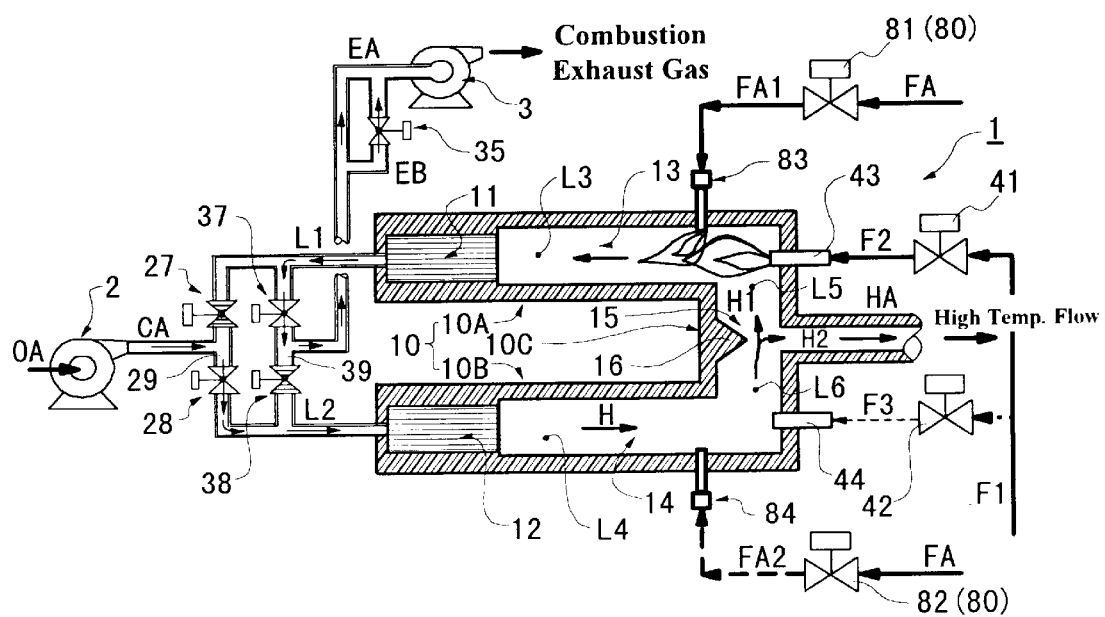

On the other hand, the controller (not shown) of the heating apparatus 1 allows the valves 27, 38, 82 to close and the valves 28, 37, 81 to open in the second heating process as shown in FIG. 18. In the second process, the first fuel control valve 41 is opened and the burner 43 injects hydrocarbon fuel into the first combustion area 13 to generate a combustion reaction therein with the first heated steam H1. The assist air inlet port 83 positioned between the first burner 43 and the first heat exchanger 11 feeds combustion air to a flame zone of the first burner 43 generated in the first combustion area 13 so that combustion air required for the combustion reaction in the area 13 is compensated. Promotion of combustion reaction on the burner 43 results in a complete combustion of the fuel injected from the burner 43. Therefore, emission of unburnt matters of the fuel can be prevented and an amount of heat sufficient to be transferred to the first heat exchanger 11 can be ensured, as set forth above.

Further, the controller of the heating apparatus 1 allows the exhaust gas flow control valve 35 to open in the first and second processes, so that the combustion exhaust gas of the combustion areas 13, 14 is partially induced through the bypass passage EB by the fan 3. The increased amount of the exhaust gas flow is compensated by opening of the bypass passage EB, corresponding to the amount of assist combustion air from the inlet ports 83, 84.

Figure 15:
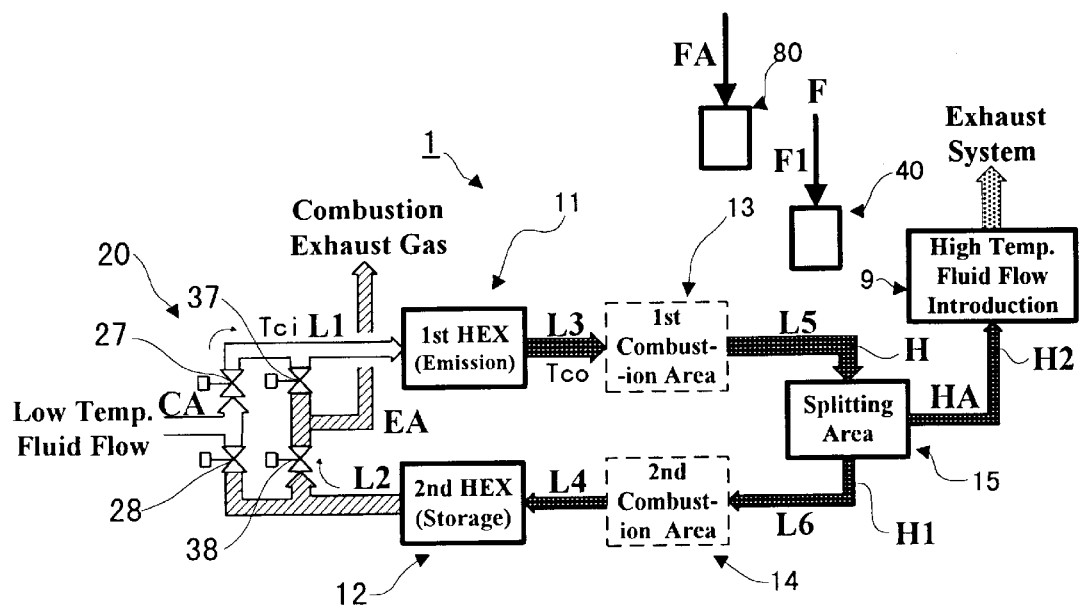
Figure 15:
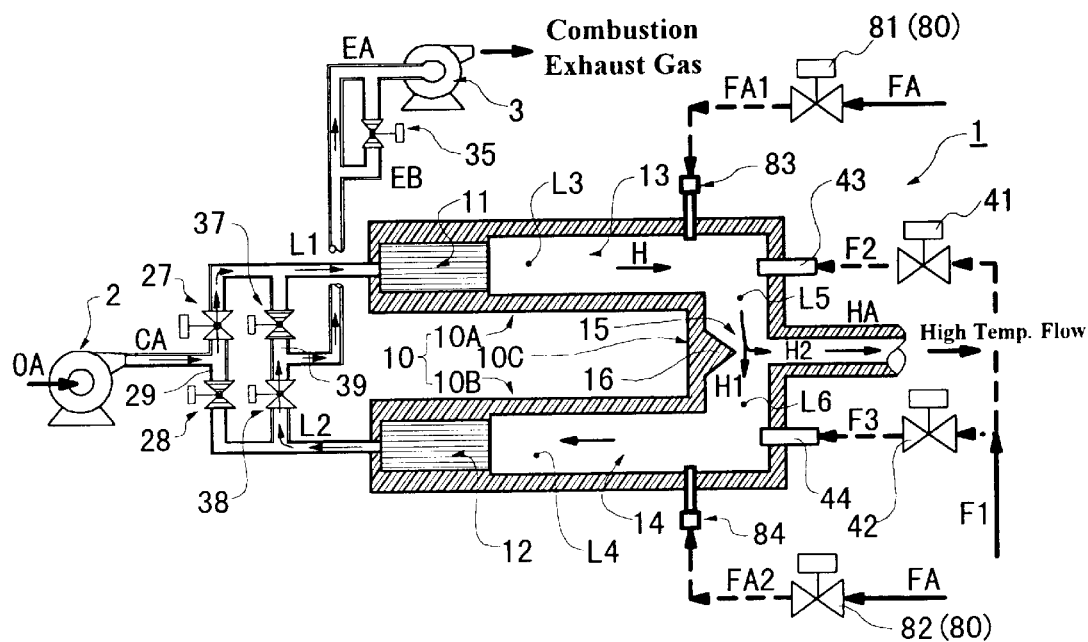

The heating apparatus transitionally carries out first, second and third transitive processes stepwisely between the first and second heating processes. The operation mode of the first transitive process as shown in FIG. 15 differs from the mode of the first heating process (FIG. 14) in that both of the first and second values 81, 82 is closed so as not to feed the assist air through the valve means 80 and that the first and second fuel control valves 41, 42 is closed so as not to feed the fuel through the fuel control means 40. Further, the control valve 35 is closed in the first transitive process. The combustion exhaust gas in the combustion areas 13, 14 is induced by the fan 3 through the exhaust gas passage EA which is reduced in its cross-section owing to closure of the bypass passage EB.

Figure 17:
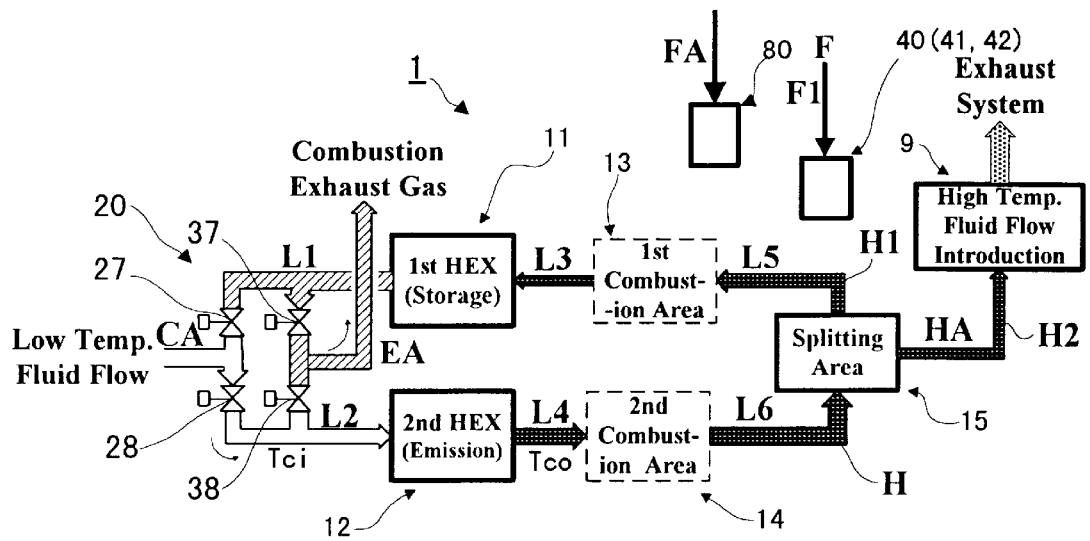
Figure 17:
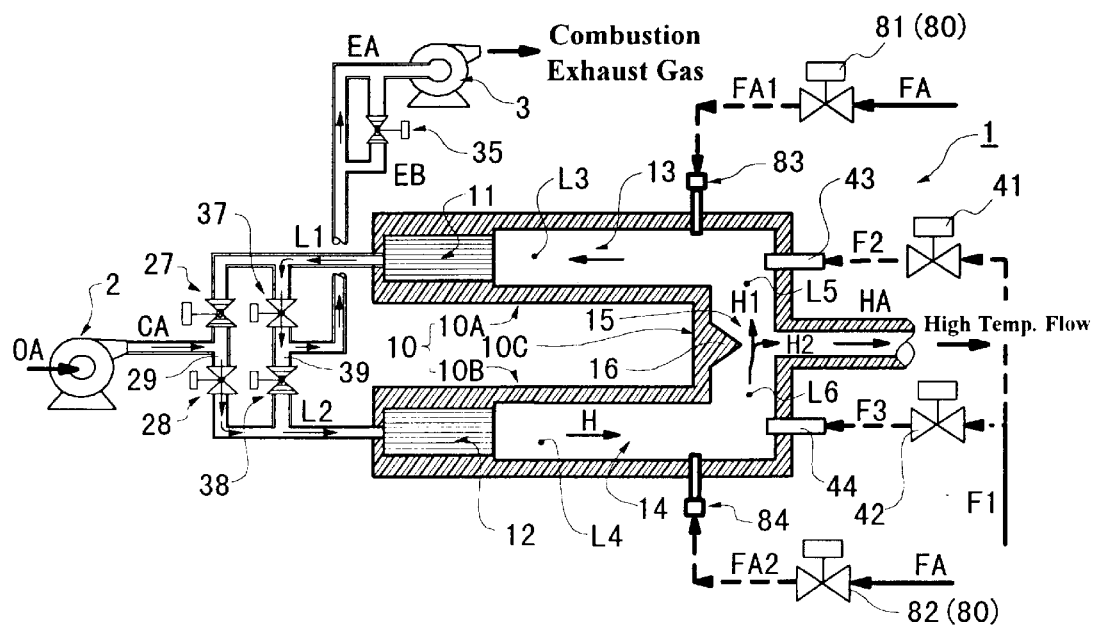

Tile operation mode of the third transitive process as shown in FIG. 17 differs from the mode of the second process (FIG. 18) in that the assist air is not fed through the valve means 80 and the fuel, is not fed through the fuel control means 40. In the third transitive process, the control valve 35 is closed. Tile combustion exhaust gas in the combustion areas 13, 14 is induced by the fan 3 through the exhaust gas passage EA which is reduced in its cross-section.

Figure 16:
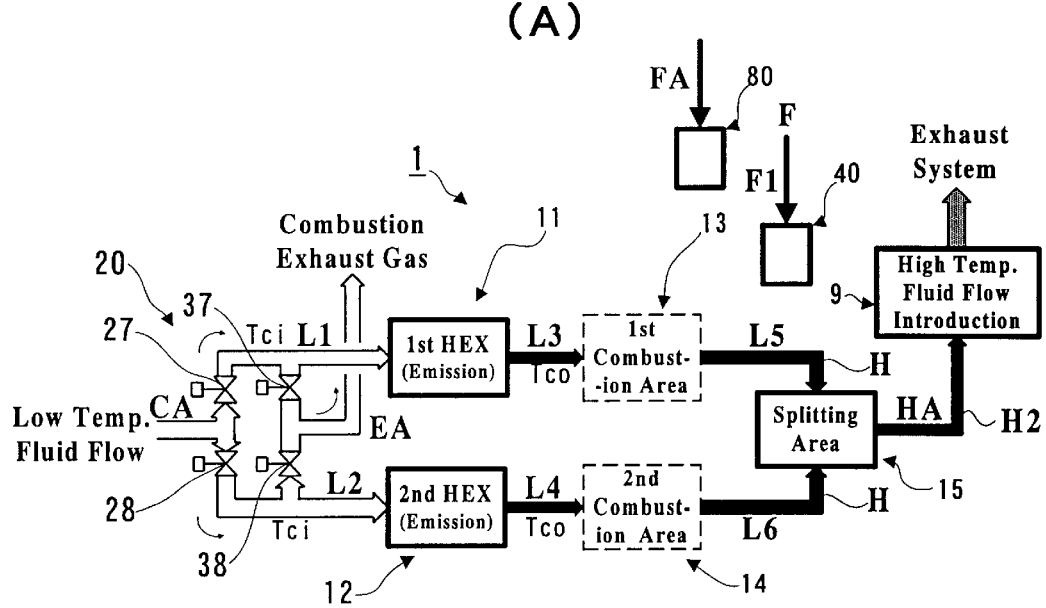
Figure 16:
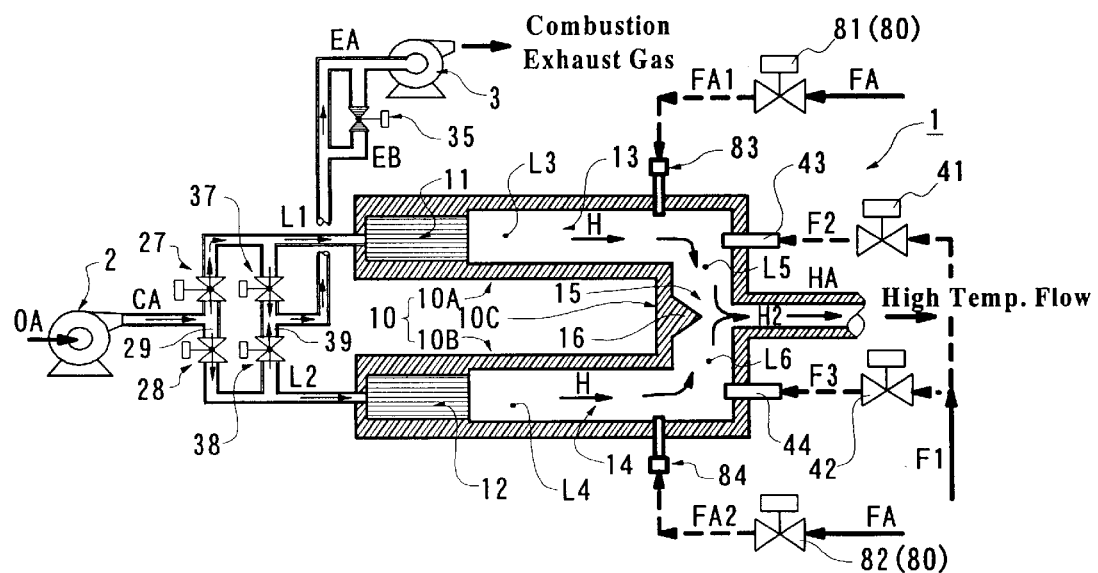

In the second transitive process as shown in FIG. 16, the valve means 80 stop feeding of the assist air and the fuel control means 40 stop feeding of the fuel as in the first and third transitive processes. The second transitive process, however, permits the first and second intake valves 27, 28 and the first and second exhaust valves 37, 38 to open. The gaseous fluid of the passage CA is divided in the communication passage 29 and passes through the passages L1, L2. A predetermined flow rate of the gaseous fluid is introduced into the exhaust passage EA through the communication passage 39 and induced by the fan 3. The remaining part of the gaseous fluid flows into the splitting area 15 through the first and second heat exchangers 11, 12 and the first and second combustion areas 13, 14, and joins together in the splitting area 15 so as to be introduced into the equipment 9 through the passage HA.

FIG. 19 is a table showing an example of the balance of flow rates in the respective passages with respect to each of the operation modes illustrated in FIGS. 14 to 18. For simplification of description, the flow rate of the passage CA is represented by "1.0" and the flow rates of passages HA, FA are represented by "0.5".

The balance of flow rates of the respective passages can be intentionally controlled by control of the on-off valves or the control valves of the system 10, However, the flow rate of the passages UA, HA are kept in constant throughout the whole processes. Thus, the flow rate of the second stream H2 to be fed from the system 10 to the equipment 9 is not substantially affected by the flow rate of the assist air, and therefore, it is stably maintained to be a predetermined flow rate (rate=0.5).

Figure 20:
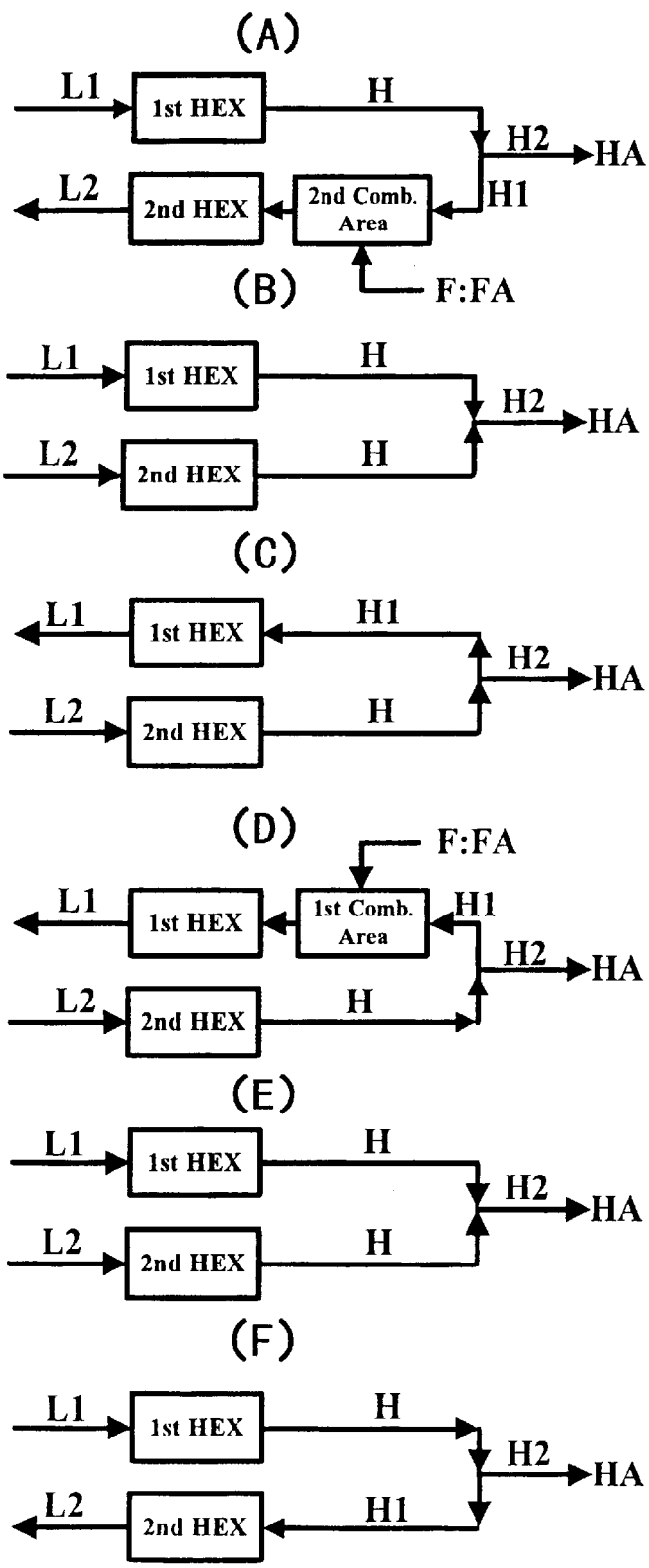
FIG. 20 is a schematic flow diagram transitionally illustrating the variation of modes of the system as shown in FIGS. 14 through 18.

FIG. 20 is a schematic flow diagram transitionally illustrating the modes of operation of the heat-exchanging system 10.

In FIG. 20A to 20F, the modes of operation varying transitionally and stepwisely are illustrated, the system 10 changes its mode of operation every predetermined time interval, e.g., every 10 seconds in an order as shown in FIG. 20. The system 10 is continuously operated in a manner of variation in its mode of operation illustrated in FIGS. 20A–20F The modes of second transitive process (FIGS. 16; 20B) and third transitive process (FIGS. 17; 20C) are stepwisely carried out between the mode of first process (FIG. 14; 20A) and the mode of second heating process (FIGS. 18:20D), and the modes of second transitive process (FIGS. 16; 20E) and first transitive process (FIGS. 15; 20F) are stepwisely carried out between the mode of second heating process (FIGS. 18; 20D) and first heating process (FIGS. 14; 20A) In accordance with appropriate setting of combination and order of the modes of operation, the variation in temperature and the temperature gradient of the cell wall surface and the storage heat in the heat exchangers 11, 12 can be equalized or stabilized, and the variation in temperature of the second stream H2 can be restricted so that the temperature of fluid flow HA is stabilized.

As set forth above, the heating apparatus 1 comprises the fluid flow introduction passage CA for receiving the low temperature gaseous fluid flow, the combustion exhaust gas passage EA for exhausting the hot gas effluent, the heated supply flow delivery passage HA for delivering the second gaseous stream to the introduction equipment 6, 9, the changeover means 20 connected to the introduction passage CA and the combustion exhaust gas passage EA, the first and second fluid flow passages L1, L2 connected to the changeover means 20, the first and second heating devices 10A, 10B connected to the first and second fluid flow passages L1, L2, and the splitting area 15 which is in communication with the first and second heating devices 10A, 10B and in communication with delivery passage HA. The first heating device 10A has the first heat exchanger 11 connected to the first fluid flow passage L1 and the first combustion area 13 arranged in series with the first heat exchanger 11. The first fluid flow passage L1, the first heat exchanger 11 and the first combustion area 13 are in communication with each other so that the supply flow is directed to the splitting area 15 and the combustion exhaust gas produced in the first combustion area 13 is delivered to the combustion exhaust gas passage EA. Similarly, the second heating device 10B has the second heat exchanger 12 connected to the second fluid flow passage L2 and the second combustion area 14 arranged in series with the second heat exchanger 12. The second fluid flow passage L2, the second heat exchanger 12 and the second combustion area 14 are in communication with each other so that the supply flow to the splitting area 15 and the combustion exhaust gas produced in the second combustion area 14 is delivered to the combustion exhaust gas passage EA. The splitting area 15 is provided with the splitting means 16 for splitting the supply flow H heated by the heat exchangers 11, 12 into the first and second gaseous fluid streams H1, H2 so as to direct the first stream H1 to the second combustion area 14 and direct the second stream H2 to the delivery passage HA. The first and second combustion areas 13, 14 are provided with combustion means 40–48, 31–33, 80–84 for generating the combustion reaction of the first stream H1. The first and second heat exchangers 11, 12 are provided with regenerators which accumulate heat in heat transferable contact with the combustion exhaust gas produced by the combustion reaction in the areas 13, 14 and which emit heat in heat transferable contact with the low temperature gaseous fluid flow.

The heating apparatus 1 carries out the first and second heating processes which are alternately changed over in a predetermined time interval so that the low temperature flow is continuously heated to a high temperature. In the first heating process, the heating apparatus 1 receives the low temperature flow through the first heat exchanger 11 at a high temperature so as to heat the low temperature fluid lip to a high temperature with a heat exchange action in its heat transferable contact with the first heat exchanger 11. The heated flow H at the high temperature is split into the first and second streams H1, H2 by the splitting means 16 in the splitting area 15. The second stream H2 is fed to the equipment 6, 9, and the first stream H1 is directed into the second combustion area 14 to take a combustion reaction therein. The combustion exhaust gas produced by the combustion reaction in the area 14 is exhausted through the second heat exchanger 12, and the sensible heat of the exhaust gas is accumulated in the regenerator of the second heat exchanger 12 with a heat exchange action in a heat transferable contact between the exhaust gas and the second heat exchanger 12. In the second heating process, the heating apparatus 1 receives the low temperature flow through the second heat exchanger 12 at a high temperature so as to heat the low temperature fluid up to a high temperature with a heat exchange action in its heat transferable contact with the second heat exchanger 12. The heated flow H at the high temperature is split into the first and second streams H1, H2 by the splitting means 16 in the splitting area 15. The second stream H2 is fed to the equipment 6, 9, and the first stream H1 is directed into the first combustion area 13 to take a combustion reaction therein. The combustion exhaust gas produced by the combustion reaction in the area 13 is exhausted through the first heat exchanger 11, and the sensible heat of the exhaust gas is accumulated in the regenerator of the first heat exchanger 11 with a heat exchange action in a heat transferable contact between the exhaust gas and the first heat exchanger 11.

According to such arrangements of the heating apparatus and method, the low temperature fluid, such as ambient air, tan be heated or preheated to a high temperature in the heat-transferring/heating steps substantially directly performed by the heat accumulation/heat emission action, without heating or preheating step for the low temperature flow by direct firing. Therefore, the oxygen density of the low temperature flow or the ratio of components contained therein are substantially kept to be its initial density or ratio, so that specific means for reforming the flow, e.g., means for supplementing a quantity of oxygen, is not required for the equipments 6, 9.

Further, in the above apparatus and method, the combustible exhaust gas of the equipment 6 is fed to the first and second combustion areas 13, 14, so that a secondary combustion reaction of the combustible exhaust gas occurs therein. The regenerators can heated by the sensible heat possessed by the exhaust gas of the secondary combustion. The low temperature flow is heated or preheated by the regenerator and therefore, the sensible heat of the exhaust gas in the combustion area 13, 14 is transmitted or heat-transferred to the low temperature flow through the regenerator. Thus, heat recovery of the exhaust gas is performed and the denitration of the combustible exhaust gas of the equipment 6 can be attempted by the high temperature combustion in the areas 13, 14.

Still further, the odorous gas of the odor source D containing odorous components is introduced into the areas 13, 14, so that the odorous matters undergo a thermal decomposition. Thus, exhaust gas deodorization means can be provided for the odorous source D.

Further, in accordance with the aforementioned arrangement, the introduction of gas with waste heat, e.g., turbine exhaust gas, can be fed to the heating apparatus 1 to be reheated so as to increase the heat thereof, while transferring the increased heat to the low temperature flow so as to heat it to a high temperature. Thus, the heating apparatus land the heating method allows the heat recovery equipment to enhance its heat recovery efficiency, thereby extensively improving the practical effects of the heat recovery equipment.

Figure 21:
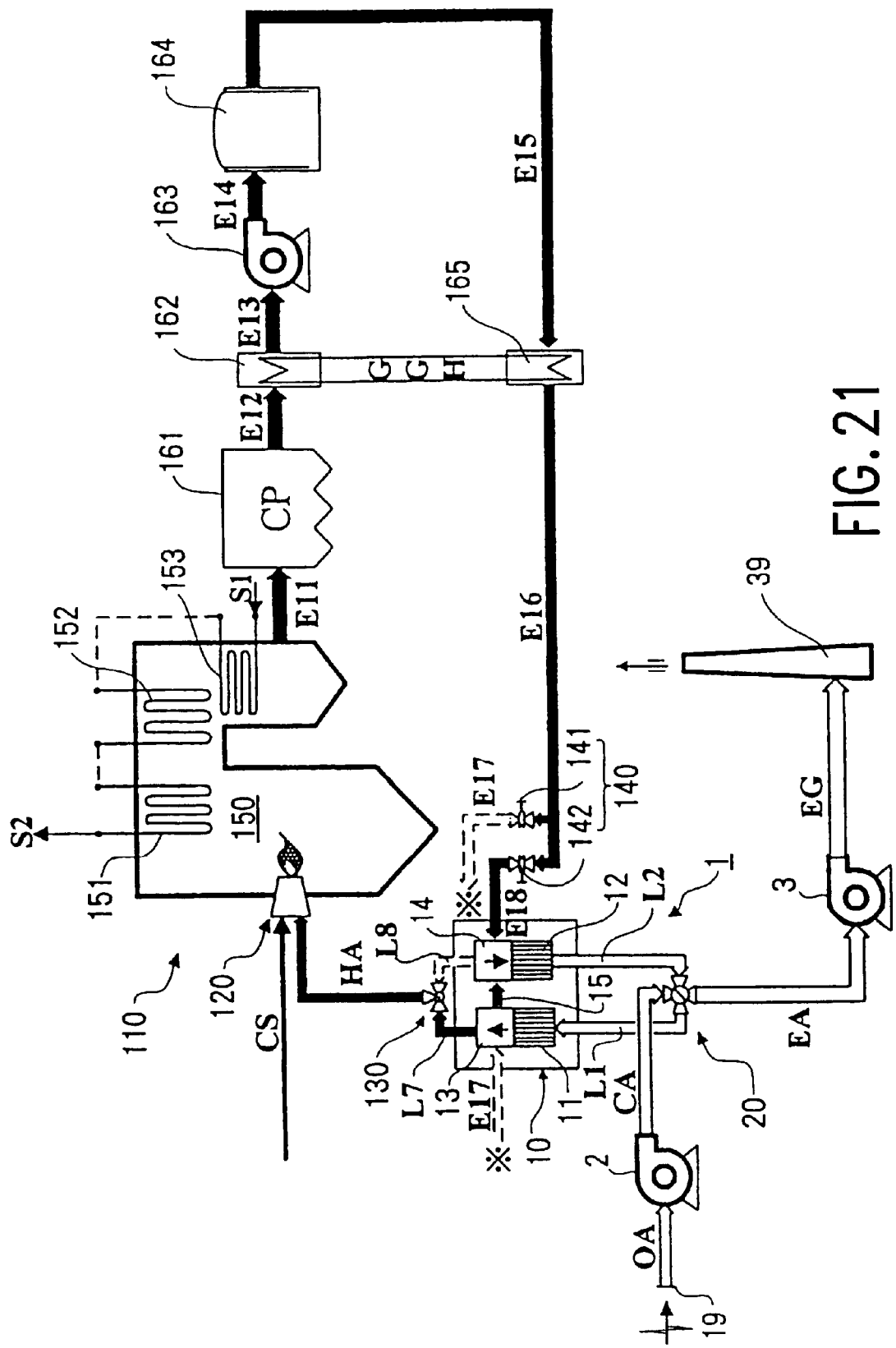
FIG. 21 is a schematic process flow diagram generally showing an arrangement of a whole system of a coal fired power generation boiler with the apparatus of a sixth embodiment of the present invention.

FIG. 21 is a schematic flow diagram generally showing a whole system of a boiler or coal fired power generation plant, which is provided with the heating apparatus of the sixth embodiment according to the present invention. In those figures, the elements or means substantially same as those in the aforementioned embodiments are indicated by the same reference numerals.

The boiler for coal fired power generation plant includes a burner for pulverized coal 120 and a pulverized coal firing boiler 110, and the burner 120 is connected a pulverized coal feed line CS for feeding pulverized coal. The feed line CS is connected to a pulverized coal feeding system including a pulverized coal feeder of a pressure feeding type (not shown). The feeder is adapted to feed a quantity of pulverized coal having a predetermined diameter, e.g., the diameter no greater than 50–100 μm.

A primary air flow is delivered through the feed line CS so that the pulverized coal is transported through the feed line CS to the burner 120 by the primary air flow. The flow rate of the primary air is set to be a predetermined ratio to the entire flow rate of required combustion air.

The preheated air feed passage HA is connected to the burner 120. The passage HA feeds a high temperature preheated air flow to the burner 120, heated to a temperature range above 800~1000° C. The pulverized coal, primary air flow and the preheated air flow are mixed together in the burner 120 and generate a flame zone in a combustion area 150 in the boiler 110 with the ignition means such as a pilot burner (not shown).

A superheater 151, a reheater 152 and an economizer 153 are arranged in predetermined positions of the combustion area 150. The economizer 153 is joined to a feed water pipe S1 and the superheater 151 is joined to a superheated steam feed line S2. The feed water fed to the economizer 153 through the pipe S1 is introduced through tubes of the economizer 153, reheater 152 and superheater 151. The water is heated in a high temperature atmosphere of the area 150 by radiant heat and convection heat acting on the economizer 153, reheater 152 and superheater 151 and delivered through the line S2 to a steam turbine of the power generator or the like.

A exhaust gas line E11 for exhausting the combustion exhaust gas of the area 150 is joined to the boiler 110 beneath the economizer 153. A downstream end of the line E11 is joined to an inlet port of a dust collector 161 and an outlet port thereof is connected to a heat recovery section 162 of a gas-gas heater GGH through an exhaust gas line E12. The section 162 is connected to an inlet port of a desulfurization equipment 164 through exhaust gas lines 13, E14 with a booster fan 163, on outlet port of the desulferizer 164 is connected to a heating section 165 of the heater GGH through an exhaust gas line E15, and the heating section 165 is connected through a distributor 140, to an exhaust gas line E16.

The dedusting device 161 comprises a high temperature ceramic filter type of dust collector containing a plurality of cylindrical ceramic filters. The device 161 is a housing of a pressure vessel structure type lined on its inner wall surface with ceramic fiber insulation material and dedusting chamber, which is vertically partitioned to a plurality of sections. The ceramic filters are positioned therein, which is formed in a porous cylinder having approximately 150 mm in inner diameter and made of β cordielite. Tile combustion flue gas flowing into the respective filters passes outwardly through the walls thereof to be filtrated and delivered to the line E12. The dust on the inner wall surface of the filter drops therefrom or is removed by operation of back wash means of ejector pulse type.

The desulferizer 164 is designed to perform Selexol process or Benfield process to mainly remove $H_2S$ from the exhaust gas, and the gas-gas heater GGH is provided with a circulation passage of working fluid connected to the heat recovery section 162 and the heating section 165.

The distributor 140 provided with a pair of control valves 141, 142 is connected to a regenerative heat exchange system 10 of a preheating apparatus 1 through exhaust gas passages E17, E18. The system 10 includes the exhaust passages E17, E18 with the valves 141, 142 and a pair of combustion areas 13,14 connected to the passages E17, E18. The system 10 also has a splitting communication passage 15 connecting the areas 13,14 with each other. The first and second combustion areas 13, 14 is connected to a preheated air delivery passage HA through a three-way type of control valve 130 and is in communication with first and second heat exchangers of high cycle regenerative type for heating or preheating a supply flow of combustion air flow.

The heat exchangers 11, 12 are in communication with a four-way type of control valve 20 through first and second fluid passages L1, L2, and the valve 20 is connected to a forced draft fan 2 and a forced induced fan 3 through intake and exhaust passages CA, EA. The fan 2 sucks normal temperature outdoor air (combustion air) through the ambient air intake 19 and the air intake passage OA, and delivers it under pressure to the first and second heat exchangers 11, 12, whereas the fan 3 induces the secondary combustion exhaust gas of the first and second combustion areas 13, 14 through the first and second heat exchangers 11, 12, and exhaust it through the exhaust passage EA and the stack 39.

Figure 22A:
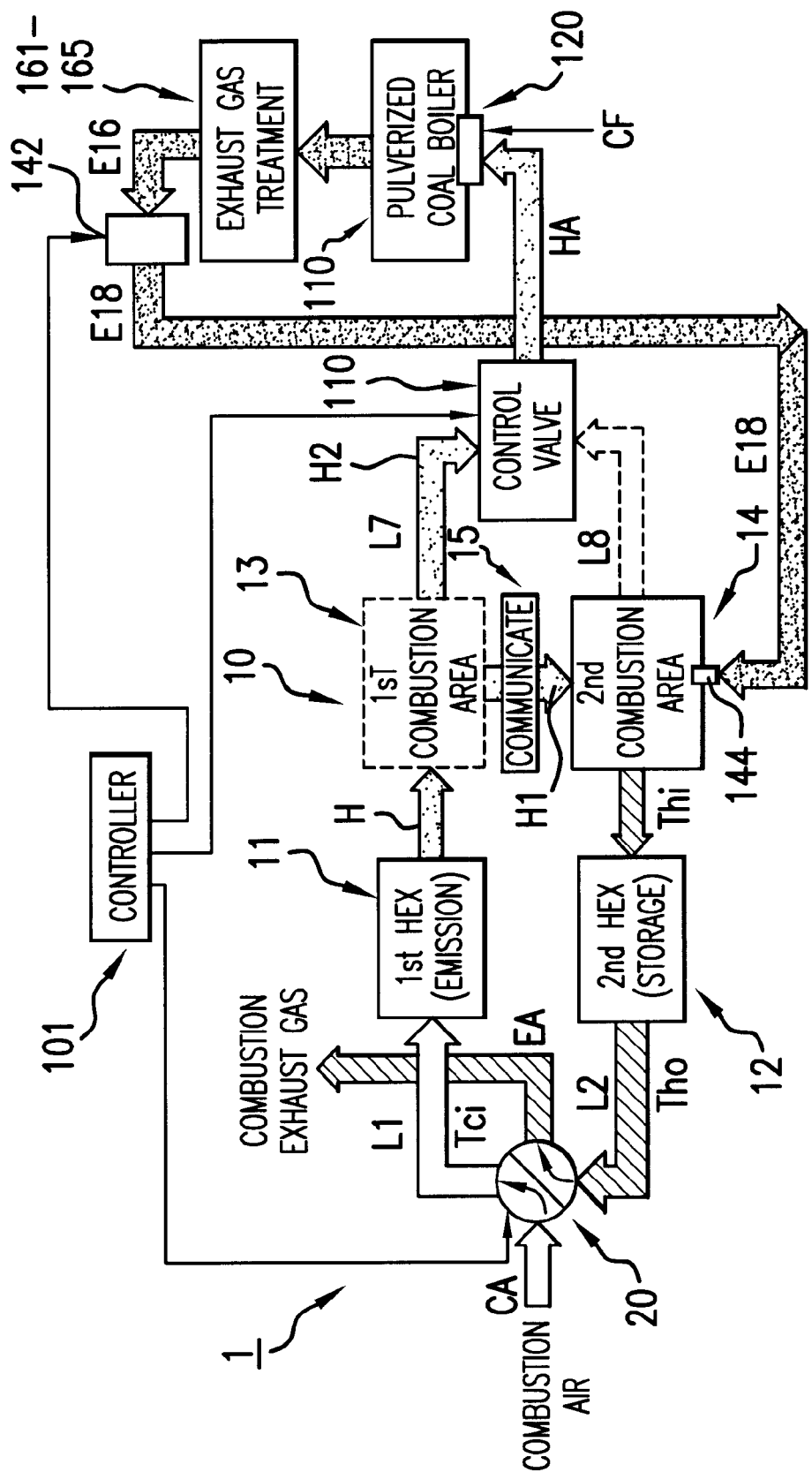
FIG. 22 is a block flow diagram showing the arrangement and operation of the apparatus as illustrated in FIG. 21.
Figure 22B:
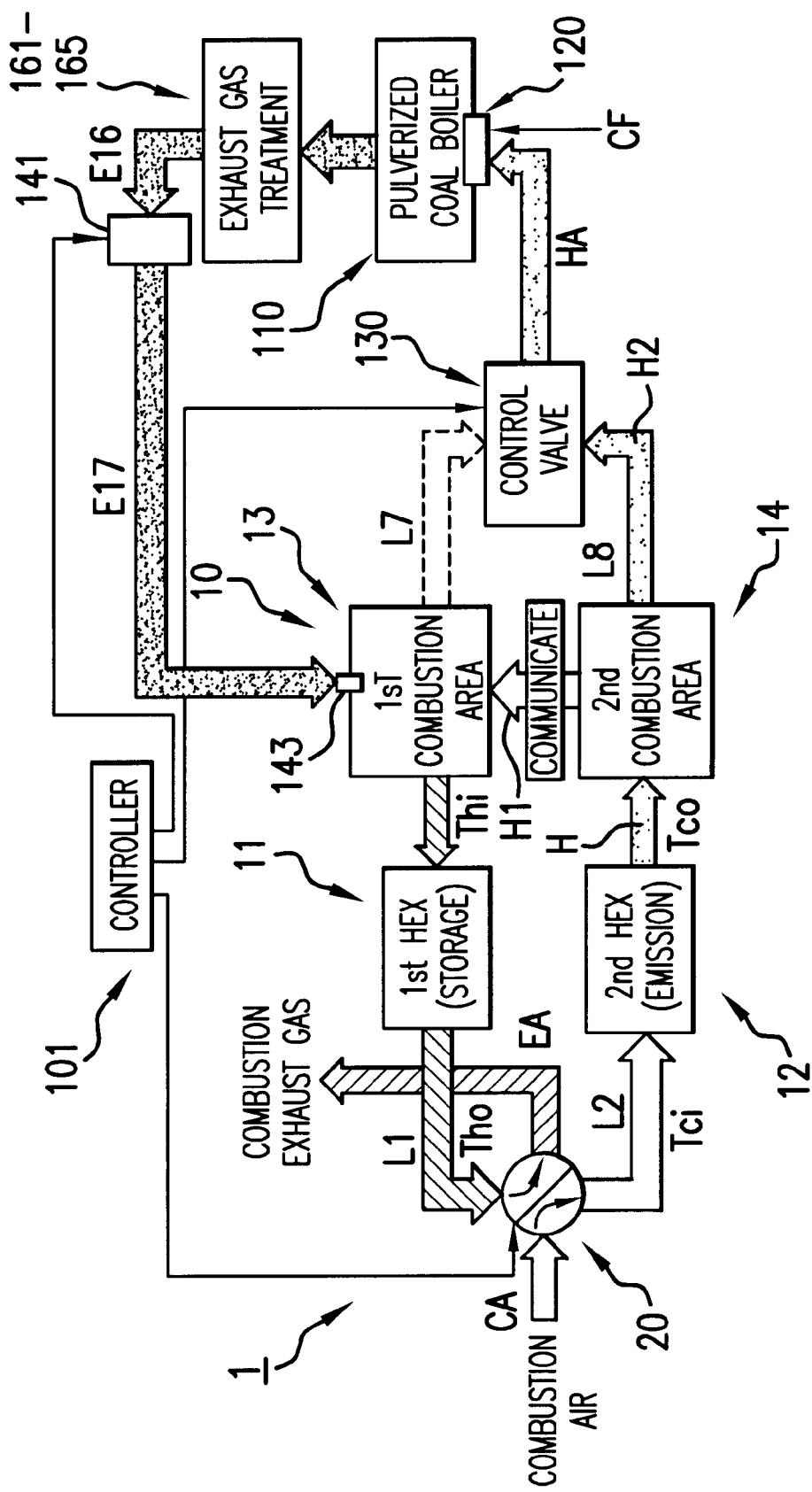
Figure 23:
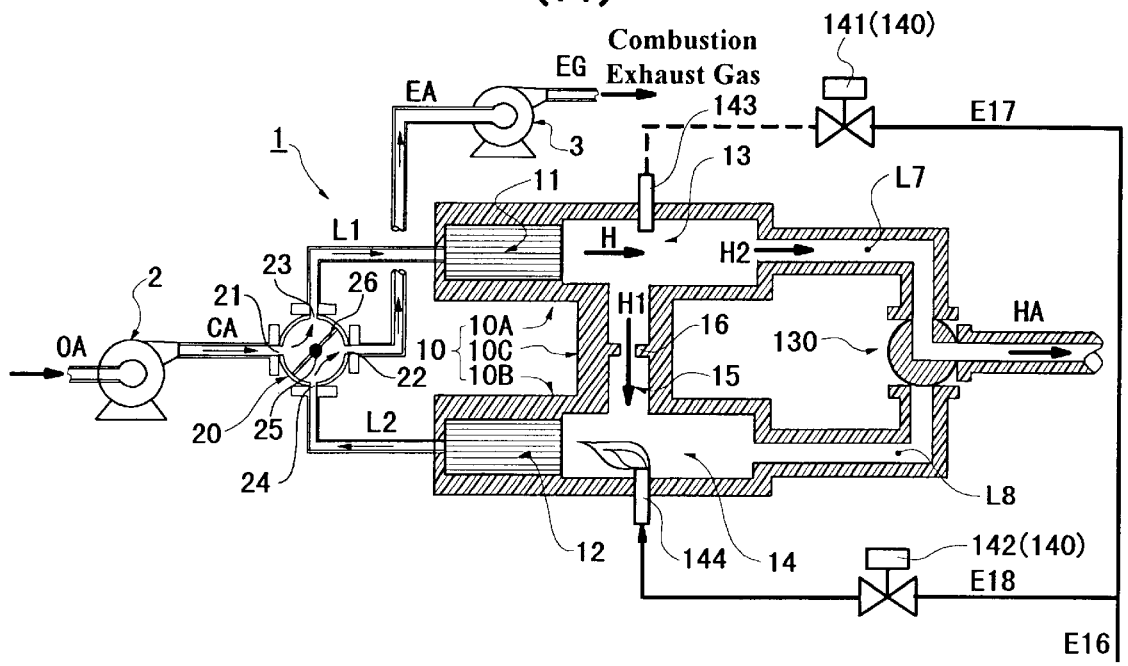
FIG. 23 is a schematic cross-sectional view showing the arrangement and operation of the heating apparatus in the boiler shown in FIG. 21, and FIG. 24 includes a vertical cross-sectional view (FIG. 24A) and horizontal cross-sectional views (FIGS. 24B:24C) of control valve means.
Figure 23:
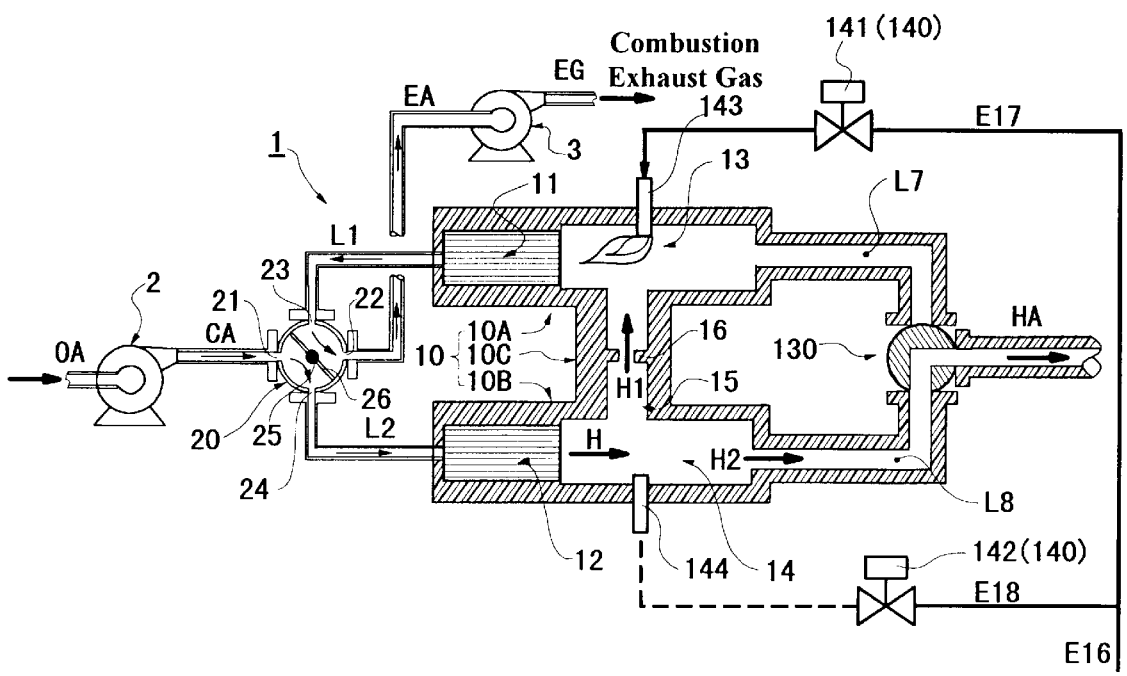

FIGS. 22 and 23 are a schematic flow diagram and a cross-sectional view generally showing the arrangement and operation of the preheating apparatus 1 installed in the boiler, wherein the illustration indicated by (A) shows a first position of the changeover means 20 (first pre heating process) and wherein the illustration indicated by (B) shows a second position of the changeover means 20 (second preheating process).

As shown in FIG. 22, the heating apparatus 1 has the first and second fluid flow passages L1, L2 connected to the introduction passage CA and the exhaust gas passage EA through the changeover means 20, the first and second heat exchangers 11, 12 for preheating the combustion air introduced through the passage CA, the communication passage 15 for splitting the air heated by the heat exchanger 11, 12, and first and second combustion area 11, 12 for causing a secondary combustion reaction of the first stream H1 passing though the passage 15 and the combustion exhaust gas produced in the boiler 110.

As shown in FIG. 23, the changeover means 20 has an air inlet port 21, an exhaust gas outlet port 22, a first inlet/outlet port 23 and a second inlet/outlet port 24. The changeover means 20 comprises a four-way valve assembly with a high speed or high cycle changeover mechanism selectively switched to the first position (FIGS. 22A:23A) and the second position (FIGS. 22B:23B), the assembly having a rotary valve body 26 in a form of plate.

The combustion areas 13, 14 is provided with first and second exhaust gas inlet ports 143, 144 extending through side walls of the areas 13, 14, and the ports 143, 144 can introduce the exhaust gas of the boiler 110 through the passages E17, E18. The combustion exhaust gas of the combustion area 150 is passed through the dust collector 161, gas-gas heater GGH and desulifurizer 164, and the cool gas is introduced into the combustion areas 13, 14 through the ports 143, 144.

The heat exchanger system 10 includes an electronic controller 101 (FIG. 22) which controls the operation mode of the system and times the switching timing of the constituents of the system. The controller 101 controls the switching timing and position of the changeover means 20, the control valve 130 and the valves 141, 142. The controller is connected to the driving means of each of the changeover means 20, the control valve 130 and the valve 141, 142 by signal lines to control the operation thereof.

The valves 141, 142 are opened or closed simultaneously with the changeover means 20 by the controller 101 wherein the opening term of the valve 141 coincides with the second position of the changeover means 20 and the opening term of the valve 142 coincides with the first position of the changeover means 20.

The control valve 130 operated in association with the changeover means 20 is interposed between the combustion area 13, 14 and the burner 120. The control valve 130 is switched synchronously with the changeover means 120 under control of the controller 101 so that the passage HA alternately communicates with either of the passages L7, L8. In the first position of the changeover means 20 (FIGS. 22A; 23A), the control valve 130 is held in its first position in which the first combustion area 13 is in communication with the passage HA through the passage L7 so that the stream H2 is fed to the burner 120.

In the second position of the changeover means 20 (FIGS. 22B; 23B), the control valve 130 is held in its second position in which the second combustion area 14 is in communication with the passage HA through the passage L8 so that the stream H2 is fed to the burner 120.

In the first position of the changeover means 20 (the first preheating process) as shown in FIG. 2A, the ambient air or combustion air fed through the first passage L1 to the first heat exchanger 11 is preheated to a predetermined temperature by the heat-exchanger 11 and flows into the first combustion area 13 in which the preheated air is split into the first and second preheated air streams H1, H2 in a predetermined proportion. The first stream H1 passes through the communication passage 15 into the second combustion area 14 as a heated air flow at a high temperature, and the second stream H2 is fed through the passage HA to the burner 120 in which the it is mixed with the pulverized coal and the primary air fed from the fuel supply system CS (FIG. 1) so as to fire in the combustion area 150 of the boiler 110.

The first steam H1 introduced into the second combustion area 14 is mixed with the exhaust gas of the boiler 110 so that a second combustion reaction of the unburnt fuel matters or hydrogen ($H_2$), carbon, carbon oxide (C:CO) and hydrocarbon ($C_nH_m$), which are produced: by the coal gasification reaction in the combustion area 150, is caused in the area 14 to generate a flame zone therein. The high temperature combustion exhaust gas produced in the second combustion area 14 flows into the end of the second heat exchanger 12 and passes therethrough to heat it to a predetermined temperature, and thereafter, the combustion exhaust gas is induced through the changeover means 20 and the passage EA by the fan 3 (FIG. 23) and discharged through the passage EG and the stack 39 (FIG. 1) to the ambient atmosphere.

In the second position of the changeover means 20 (the second preheating process) as shown in FIG. 22B, the air introduced into the second passage L2 is fed to the second heat exchanger 12, and then, it is preheated to the predetermined temperature by the heat exchanger 12 and flows into the second combustion area 14 in which the preheated air is split into the first and second preheated air streams H1, H2 in the predetermined proportion. The first stream H1 passes through the communication passage 15 into the first combustion area 13 as a heated air flow at a high temperature, and the second stream H2 is fed through the passage HA to the burner 120 in which it is mixed with the pulverized coal and the primary air fed from the fuel supply system CS (FIG. 1) so as to fire in the combustion area 150 of the boiler 110.

The first stream H1 introduced into the first combustion area 13 is mixed with the exhaust gas of the boiler 110 so that a second combustion reaction of the unburnt fuel matters or the hydrogen ($H_2$), carbon, carbon oxide (C:CO) and hydrocarbon ($C_nH_m$), which are produced by the coal gasification reaction in the combustion area 150, is caused in the area 13 to generate a flame zone therein. The high temperature combustion exhaust gas produced in the first combustion area 13 flows into the end of the first heat exchanger 11 and passes therethrough to heat it to a predetermined temperature, and thereafter, the combustion exhaust gas is induced through the changeover means 20 and the passage EA by the fan 3 (FIG. 23) and discharged through the passage EG and the stack 39 (FIG. 1) to the ambient atmosphere.

During the combustion operation of the second combustion area 14, the changeover means 20 holds the valve 26 in its first position (FIGS. 22A; 23A) in which the passages L1, CA inter communicate and the passages L2, EA inter communicate, whereas during the combustion operation of the first combustion area 13, it holds the valve 26 in its second position (FIGS. 22B; 23B) in which the passages L2, CA inter communicate and the passages L1, EA inter communicate.

As shown in FIG. 23, the heat exchanging system 10 constituting the preheating apparatus 1 comprises first and second preheating furnace units 10A, 10B and a communication unit 10C interconnecting the first and second units 10A, 10B. The first or second units 10A, 10B contains the first or second heat-exchanger 11 and forms the first or second intermediate passage L7, L8 and the first or second combustion area 13, 14 in series. The units 10A, 10B have substantially the same construction and function, and the passage 15 axially extending through the core of the unit 10C allows the combustion areas 13, 14 to be in intercommunication. These units 10A, 10B, 10C are positioned symmetrically with respect to a center axis of the preheating apparatus 1.

The first and second unit 10A,10B are provided on their side walls with the first and second inlet ports 143, 144 for firing in the combustion areas 13, 14 in direction against the first stream through the passage 15. Each of the first and second ports 143, 144 is provided with attachments or accessories such as a pilot burner, ignition transformer and so forth. Depiction of those attachments or accessories, however, are omitted from the drawings for the purpose of simplification of illustration.

The communication unit 10C has a structure symmetrical with respect to the center axis of the preheating apparatus 1 with a restriction 16 protruding inward of the passage 15 on the center axis. The restriction 16 locally reducing the passage 15 functions as an orifice or fluid flow resistance. The delivery pressure of the fan 2 and the suction pressure of the fan 3 act on the combustion areas 13, 14. The pressure balance of the fluid pressure in the units 10A, 10B, and also the fluid pressure of the streams H1, H2 are regulated by the resistance of orifice defined by the restriction 16 and the cross-sectional area of the passage L7, L8, and therefore, the preheated air flow H flowing into the combustion areas 13, 14 are divided into the predetermined ratio of the streams H1, H2 substantially in dependence on the pressure regulating action of the restriction 16.

The heat exchanger 11, 12 is formed from a ceramic regenerator of honeycomb structure substantially identical with that in the first embodiment. FIG. 24 includes a vertical cross-sectional view (FIG. 24A) and a transverse cross-sectional views (FIGS. 24B; 24C) generally showing an arrangement of the control device 130

The control device 130 has a cylindrical housing 131 and rotatable cylindrical valve 132 therein. The housing 131 is provided with a first inlet port 133 forming a downstream end portion of the passage L7, a second inlet port 134 forming a downstream end portion of the passage L8, and an outlet port 135 forming an upstream portion of the passage HA. The housing 131 and valve 132 are concentrically arranged about a center axis of the device 130, and the ports 133,134, 135 protrude outward from the housing 131, circumferentially spaced at right angles.

The valve 132 has a cavity 138 defined by a circumferential wall 136, upper and lower end walls 137. The wall 136 is formed with an opening 138a thereon through a predetermined angle, which is selectively shifted to a first position (FIG. 24B) in which the passage HA and the passages L7 are rendered in intercommunication, and a second position (FIG. 24C) in which the passage HA and the passage L8 are rendered in intercommunication.

An outside surface of the wall 136 is in sliding contact with an inside surface 139 of the housing 131 so that the valve 132 is carried in the housing 131 rotatably about the center axis thereof Upper and lower end portions of the valve 132, which protrude from upper and lower end surfaces of the housing 131 are engaged with driving means (not shown) for bidirectionally rotating the valve 132, and the driving means rotates or oscillates the valve 132 under synchronous switching control of the controller 101 (FIG. 22) so that the rotation of the valve is carried Out simultaneously with the switching of the changeover means 20. In the first position of the changeover means 20, the valve 132 is kept in the first position (FIG. 24B) so as to effect intercommunication of the passages HA, L7 and close the downstream end of the passage L8, and in the second position of the changeover means 20, the valve 132 is kept in the second position (FIG. 24C) so as to effect intercommunication of the passages HA, L8 and close the downstream end of the passage L7.

Each of the housing 131 and the valve 132 is integrally formed from ceramic material, such as alumna, mulite, cordielite or the like to have desired gas tight performance and thermal durability.

Figure 25:
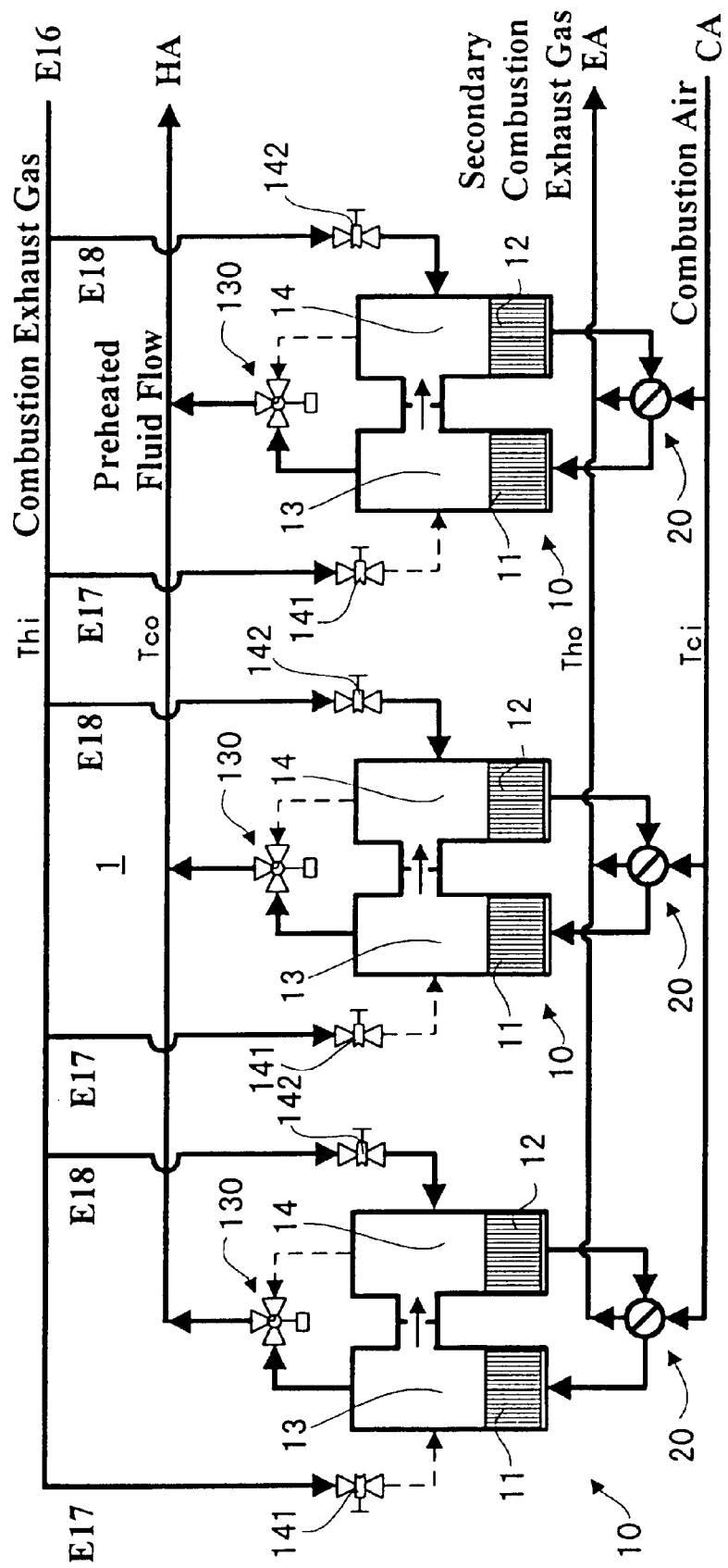
FIG. 25 is a schematic block flow diagram illustrating a preheating system applicable to a preheated air supply system of the boiler.

FIG. 25 is a schematic flow diagram illustrating an application of the preheated air supply system of the coal fired generation boiler, wherein the preheating system has a plurality of regenerative heat exchange system 10 arranged in parallel.

The passages HA, CA, EA include branch passages leading to the respective heat-exchange systems 10 the branch passages being connected to the changeover means 20 and the control device 130 of the systems 10.

In the supply system having the heat exchange systems 10 in parallel, the changeover timing of first and second processes of the system 10, may be offset so that the operation mode of the systems 10 are not simultaneously switched, but it is switched in a predetermined offset time. Therefore, the pressure variation of the flow H2 introduced into the passage HA is regulated by the offset of the switching timing, whereby the fluid pressure to the boiler is stably kept in constant.

The operation of the preheating apparatus 1 will be described hereinafter.

The combustion exhaust gas at a temperature of approximately 400° C. produced by the combustion operation of the boiler 110 contains an amount of smoke dust (dust, fly ash). The exhaust gas is subject to the dedusting treatment in the dedusting device 161 and exchanges heat with the section 162 so as to be cooled, and then, it is pressurized by the booster fan 163 to be fed to the desulfurizer 164. The exhaust gas, from which $H_2S$ is mainly removed by the desulfurizer 164, is reheated by the section 165 of the heater GGH to a temperature around 300° C., and then, fed to the, preheating apparatus 1 through the distributor 140.

In association with the boiler 110, the fans 2,3 are operated, while the changeover means 20 and the control device 130 are alternately shifted to the first or second position under synchronous control in a predetermined time interval preferably set to be no longer than 60 second, whereby relatively tow temperature combustion air (outdoor air temperature) is alternately fed to the first or second heat exchanger 11,12. The first and second control valves 141, 142 are alternately operated under control synchronous with changeover means 20 so as to alternately feed the exhaust gas of the boiler 110 to either of the first and second inlet ports 143, 144, and thus, a flame zone is ;formed alternately in the first or second combustion zone. The second inlet port 144 injects the exhaust gas into the second combustion area 14 in the first position of the changeover means 20 and the first inlet port 143 injects it into the, first combustion area 13 in the second position thereof.

The combustion air in an order of 20° C. fed to the first or second heat exchanger 11, 12 is in heat transferable contact with the cell wall of the regenerator to be heated to a high temperature, preferably above 800° C., more preferably above 1,000° C. by the heat exchange therewith. The high temperature air flow H thus preheated is split into the first and second streams H1 H2 in the combustion area 13, 14. The first stream H1 is introduced into the first or second combustion are 13, 14 through the communication passage 15 to cause the secondary combustion reaction of the combustible exhaust gas of the boiler 110, and the secondary combustion exhaust gas at a temperature range from 1,200° C. to 1,600° C. produced in the area 13,14 passes through the heat exchanger 11, 12. The secondary combustion exhaust gas is brought into heat transferable contact with the cell wall of the heat exchanger 11, 12 to raise the temperature of the cell wall surface and that of its heat accumulation, and then, flows into the first or second passage L1, L2 as being the exhaust gas cooled down to an order of 200° C., which is induced through the changeover means 20 and the passage EA and discharged through the passage EG and the stack 39 to the atmosphere by the fan 3.

In the preheating processes of the preheating apparatus 1 as set forth above, the sensible heat possessed by the secondary combustion gas of the combustion area 13, 14 is transferred to the regenerator of the heat exchanger 11, 12 to be accumulated therein under the synchronous control to the changeover means 20, the control device 130 and the distributor 140 in the predetermined time interval. The accumulated heat of the heat exchanger 11, 12 is emitted to the combustion air at a low temperature introduced thereinto after the successive switching operation of the changeover means 20, the control device 130 and the distributor 140, so that the combustion air is raised in temperature. Such heat accumulation and heat emission are alternately and repeatedly carried out in a short time, whereby the heat exchange action is successively performed between the combustion air to be fed to the burner 120 and the secondary combustion exhaust gas of the combustion area 13, 14. Thus, the first and second streams H1, H2 are continuously and stably preheated over a temperature ranging from 800° C. to 1,000° C.

The second stream H2 divided in the combustion area 13, 14 is fed to the burner 120 as high temperature combustion air, and mixed with pulverzed coal and the primary air fed by the system CS so that the flame zone is maintained in the combustion area 150 of the boiler 110.

Figure 26:
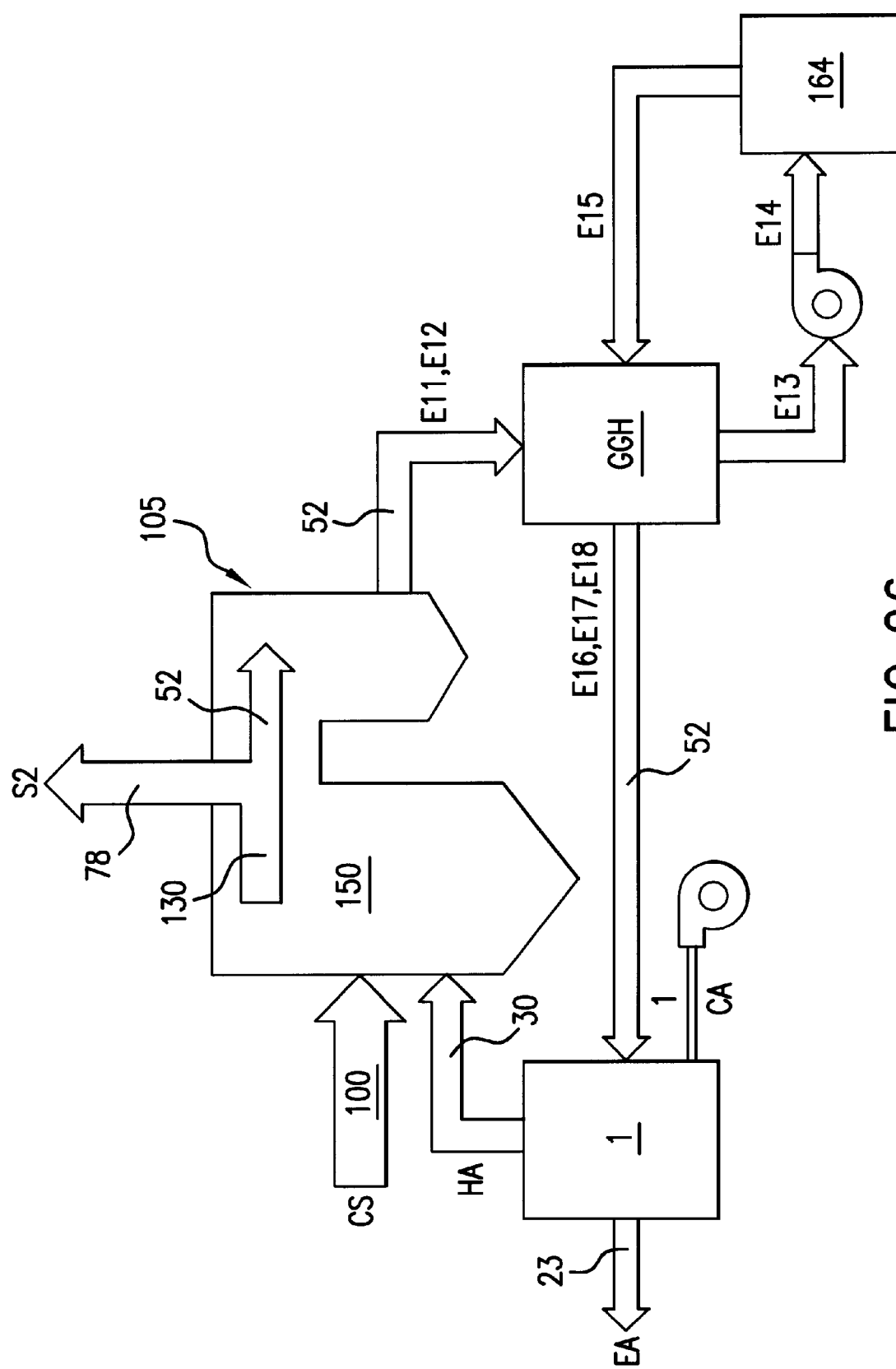
FIG. 26 is a block flow diagram showing a heat energy balance in the boiler.

FIG. 26 is a schematic block flow diagram showing an energy balance (total heat energy balance) of the coal fired generation boiler with the preheating apparatus 1 In FIG. 26, the numerals indicated in the arrows, which represent the heat inputs or outputs of the constituents of the boiler system, exemplify the ratios of enthalpy which indicates the total heat energy inputted or outputted from or to each constituent.

The total heat energy of enthalpy ratio equal to 78 is outputted as the energy of steam from the boiler 110 to a steam consumption system (not shown), e.g., a steam turbine, wherein the enthalpy ratio of the heat input from the pulverized coal feeding system to the boiler 110 is supposed to be 100. The remaining energy of enthalpy ratio equal to 52 is inputted to the preheating 296 apparatus 1 through the exhaust gas treatment system of the boiler 110, and the energy of combustion air (outdoor air), the enthalpy ratio of which equals to 1, is inputted to the preheating apparatus 1 The preheating apparatus 1 inputs the energy of enthalpy ratio equal to 30 into the boiler 110 with the second stream H2, and discharges the energy of enthalpy ratio equal to 23 out of the system with the secondary combustion exhaust gas through the exhaust system EA.

In the application as shown in FIG. 26, the total feed rate of the air to be fed to the boiler 110 through the passages HA, EA is substantially reduced in comparison to the theoretical stoichiometric air ratio, the air ratio for combustion in the combustion area 150 can be limited to a low air ratio no greater than a to predetermined air ratio. For instance, the actual air ratio (λ) can be limited to 0.7 with respect to the theoretical air ratio for complete combustion of the pulverized coal fed to the burner 120

As set for above, the preheating apparatus 1 comprises the passage 17 for introduction of the low temperature flow, the first and second heat exchangers 11, 12 for heating the supply flow to be fed to the boiler 110, and the first and second combustion areas 13, 14 for introducing the combustible exhaust gas of the boiler 110 and generating the secondary combustion reaction thereof. The heat. exchangers 11, 12 and combustion areas 13, 14 intercommunicates with each other so as to exhaust the secondary combustion exhaust gas of the areas 13, 14 through the heat exchangers 13, 14. The heat exchangers 11, 12 have the regenerators which accumulate heat in heat transferable contact with the secondary combustion gas and emit it to the low temperature air in heat transferable contact therewith.

The first and second heating units 10A, 10B are connected to the changeover means 20 by the first and second passages L1, L2 and the changeover means 20 is connected to the introduction passages CA for the low temperature flow and exhaust passage EA for the secondary combustion gas. The first heating unit 10A has the first heat exchanger 11 connected to the first passage L1 and the first combustion area 13 in series therewith, whereas the second heating L1 unit 10B has the second heat exchanger 12 connected to the second passage L2 and the second combustion area 14 in series therewith. The communication passage 10C has the communication passage 15 interconnecting the first and second combustion areas 13, 14, which are provided with the exhaust gas introduction means 140–144 for introducing the combustible exhaust gas of the boiler 110, respectively. The preheating apparatus 1 further comprises controller 101 for controlling the change over means 20, control means 130 and introduction means 140–144 in synchronous control, so that the heating unit 10A, 10B sprit the high temperature flow H heated by the heat exchangers 11, 12 into the first and second streams H1, H2, the first flow H1 directed to the combustion areas 13, 14 and the stream H2 directed to the passage HA.

The preheating apparatus 1 alternately carries out the first process for introducing the low temperature flow through the high temperature first heat exchanger 11 and the first preheated flow H1 into the second combustion area 14, and the second process for introducing the low temperature flow through the high temperature second heat exchanger 12 and the first preheated flow H1 into the first combustion area 13. In the first process, the combustion exhaust gas of the coal fired apparatus 110 containing combustible matters is introduced into the second combustion area 14 and mixed with the first stream H1 at a high temperature to take a secondary combustion reaction therein. The secondary combustion exhaust gas produced in the area 14 is brought into contact with the second heat exchanger 12 so that the sensible heat of the gas is accumulated in the regenerator thereof. In the second process, the combustion exhaust gas of the apparatus 110 is introduced into the first combustion area 13 and mixed with the first stream H1 to take the secondary combustion reaction therein. The secondary combustion exhaust gas produced therein is exhausted through the first heat exchanger 11, which accumulates the sensible heat of the exhaust gas by the heat exchange therewith.

According to such heating apparatus and method, the pulverized coal of the burner 120 takes a combustion reaction in the ultra-high temperature atmosphere, owing to the second stream H2 at the high temperature fed thereto. Such a ultra-high temperature air combustion allows the excess air ratio to be reduced, thereby extensively the feed rate of the combustion air being substantially reduced. Further, the ultra high temperature preheated air combustion in the combustion area 150 effects uniformity or equalization of the temperature distribution therein, which improves the combustion efficiency of the boiler. Such reduction of the air ratio and improvement of combustion efficiency enable reduction of the air or gas flow rate through the boiler 110, whereby a reduced capacity of the boiler and a compact volume of the combustion chamber can be achieved.

Further, according to the aforementioned embodiment, the combustion exhaust gas cooled by the flue gas treatment processes of the boiler system is raised in temperature by the secondary combustion reaction in the combustion areas 13, 14, and then, fed to the regenerators 11, 12 as being the secondary combustion exhaust gas at a high temperature. This exhaust gas possesses the sensible heat enough to heat the low temperature flow to a high temperature and therefore, the second stream H2 to be fed to the burner 120 is continuously and effectively preheated to a temperature above 800° C., preferably above 1,000° C. by the heat exchange directly made thorough the regenerators 11, 12 between the coal combustion exhaust gas and the low temperature combustion air.

Still further, reduction of the air ratio of the combustion air for the burner 120 allows the boiler 110 to produce combustible exhaust gas which contains a relatively large amount of unburnt fuel components, hydrogen ($H_2$), carbon/carbon monoxide (C:CO) and hydrocarbon ($C_nH_m$) Additionally, the ultra-high temperature air combustion, which is carried out in the combustion atmosphere with the limited quantity of oxygen, allows nitrogen oxide ($NO_x$) to be restricted in production and therefore, omission of denitrizer in the exhaust treatment system or compact design of desulifurizer can be achieved. Further, reduction of the air ratio enables reduction of flow rate through the boiler 110 and reduction of flow rate of the combustion exhaust gas effluent from the boiler 110. As the result, it is possible to reduce the capacity, volume and load of the dedusting device 161, the desulfurizer 164 or the like.

The combustion exhaust gas fed from the boiler 110 to the combustion area 13,14 is mixed with the high temperature stream H1 to generate or promote the secondary combustion, thereby the flame zone in the ultra-high temperature atmosphere, the unburnt matters contained in the exhaust gas is completely combusted in the ultra-high temperature atmosphere, so that the nitrogen oxide in the exhaust gas is subject to a denitration reaction in the high temperature and low air ratio combustion reaction in the combustion areas 13, 14.

Figure 27:
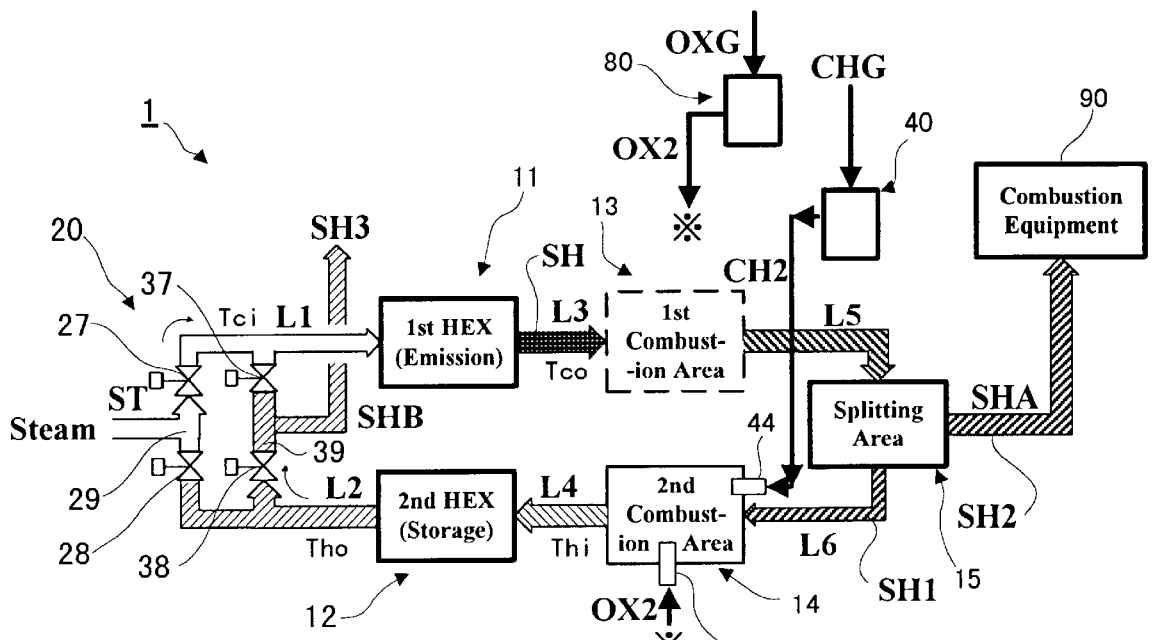
FIGS. 27 and 28 are a block flow diagram and a schematic cross-sectional view showing an arrangement and operation of the apparatus according to a seventh embodiment of the present invention.
Figure 27:
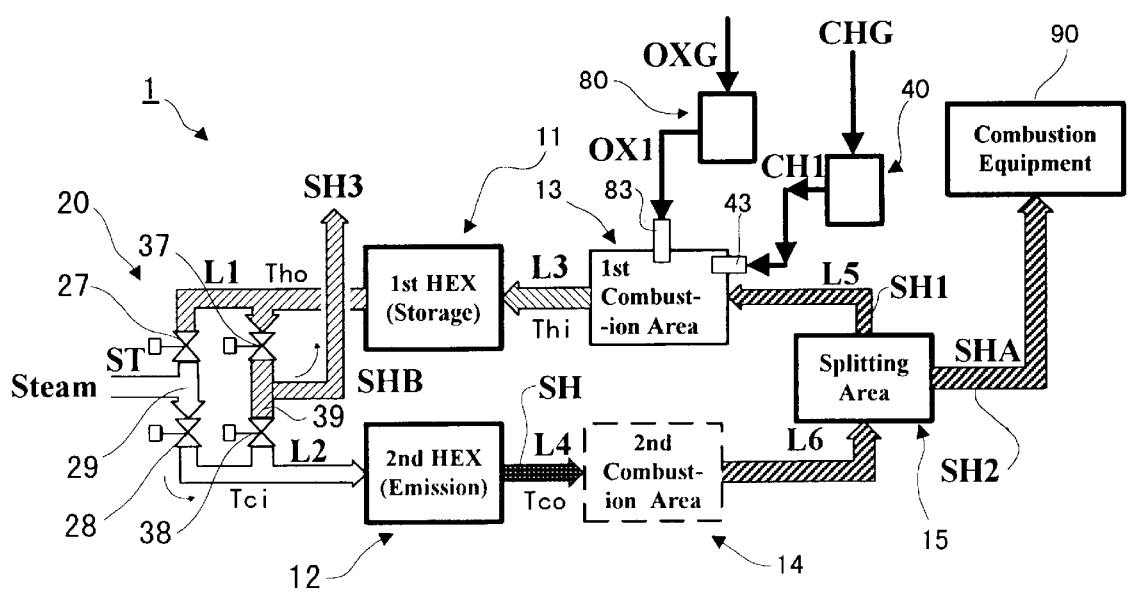
Figure 28:
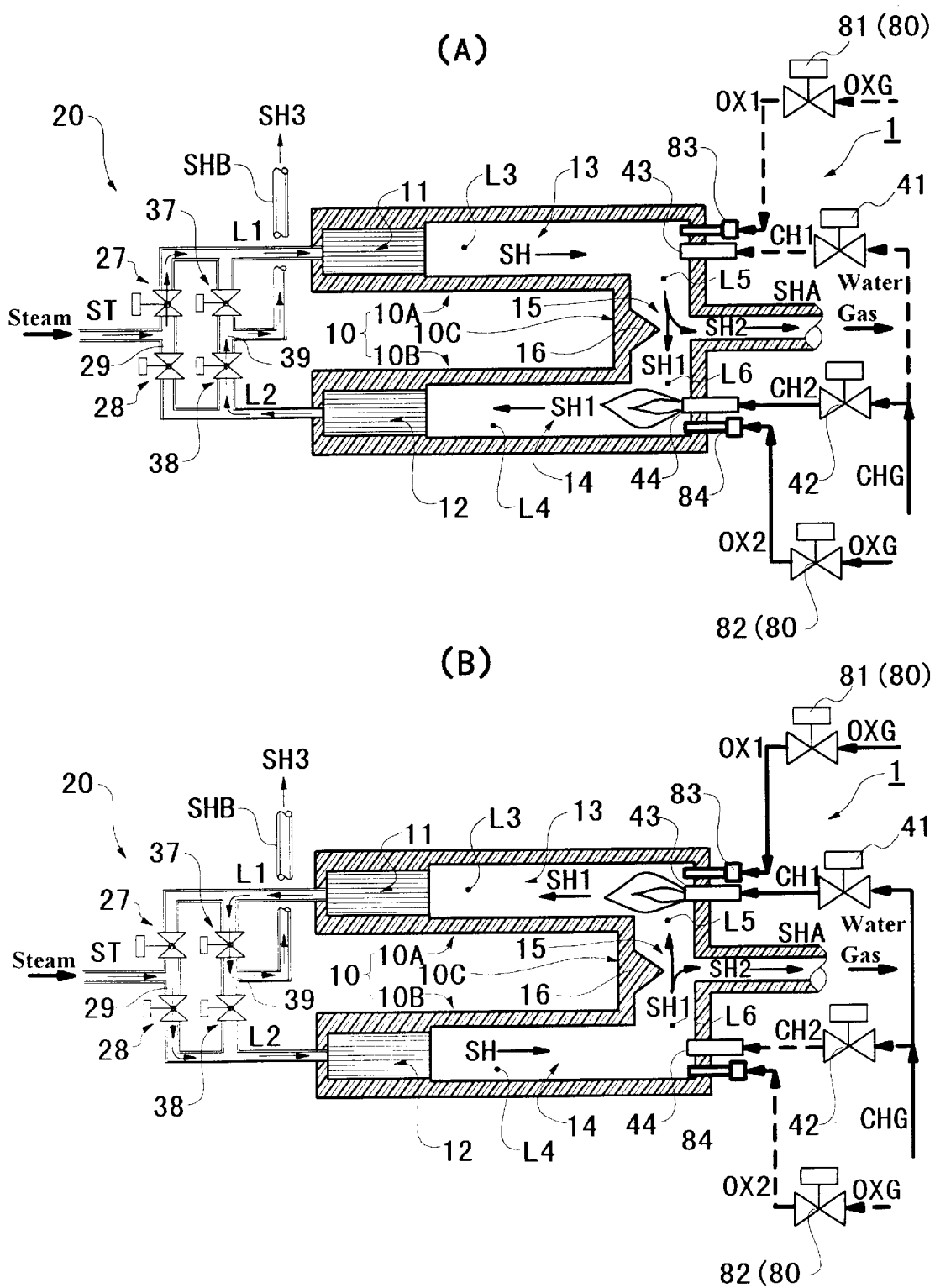

FIGS. 27 and 28 are a block flow diagram and a schematic cross-sectional view showing an arrangement and operation of the apparatus according to a seventh embodiment of the present invention in which illustrations indicated by (A) show the first process and illustrations indicated by (B) show the second process.

In this embodiment, the heating apparatus 1 is used as a water gas generator or gasification reactor vessel producing water gas by a water gas reaction. The heating apparatus 1 is equipped in a coal gasification system or the like.

In general, a combustion furnace, or gasification furnace in the coal gasification system is supplied with heated air and superheated steam is fed to a combustion area. The superheated steam at a high temperature fed into the coal gasification furnace reacts with carbon produced therein to produce hydrocarbon compound. However, the temperature of steam is conventionally limited to 500~600° C. as an upper limit, and means for continuously supplying steam at a temperature above such an upper limit cannot obtained, and therefore, steam which does not sufficiently take a water gas reaction has to be supplied to coal gasification system.

In contrast, the heating apparatus 1 of this embodiment is capable of continuously supplying steam to equipment 90 such as a coal gasification furnace, the steam having a temperature equal to or higher than 800° C.~1,100° C. Therefore, a production reaction of hydrocarbon compound or the like effectively progresses in a combustion area of coal gasification system connected to the heating apparatus 1.

The changeover means 20 and the heat exchange system 10 of the heating apparatus 1 have substantially the same arrangement as those in the fourth or fifth embodiment has, and the heating apparatus 1 is provided with the heat exchangers 11, 12, combustion area 13, 14 and splitting area 15. In this embodiment, however, the first and second combustion areas 13,14 defines gasification reaction areas for the water gas, and the combustion areas 13, 14 are provided with fuel injection ports 43, 44 for injecting hydrocarbon gas or liquid fuel thereinto and oxidizer inlet ports 83,84 for introducing oxidizing agent thereinto.

The injection ports 43, 44 are connected to fuel control means 40 through fuel supply lines CH1, CH2, and the control means 40 is joined to a main fuel supply line CHG. Methane, ethane, propane or butane, kerosene, heavy oil or the like may be used as the hydrocarbon fuel. The oxidizer inlet port 83, 84 are connected to oxidizer control means through oxidizer supply lines OX1, OX2, and the control means 80 is joined to a. main oxidizer line OXG. Oxygen may be generally used as the oxidizing agent. Alternatively, air may be used as the oxidizing agent. At shown in FIG. 28, the control means 80 includes first and second flow control valves 81, 82 provided in the supply lines OX1, OX2, and the control means 40 includes first and second fuel control valves 41, 42 provided in the supply lines CH1, CH2.

The splitting area 15 arranged between the combustion areas 13, 14 is joined to an upstream end of a water gas delivery passage SHA, whereas ends of the heat exchangers 11, 12 are selectively in communication with a downstream end of a steam supply passage ST and an upstream end of the high temperature gas discharge passage SHB.

The operation of the heating apparatus 1 will be described hereinafter.

The superheated steam produced by a boiler or steam generator (not to shown) is fed to the changeover means 20 of the heating apparatus 1 through the passage ST. The temperature of the steam is set to be a range from 150° C. to 300° C.

As in the aforementioned embodiments, the heating apparatus 1 is alternately switched to either of the first position (FIG. 27A) and the second position (FIG. 27B) in a preset time interval, and allows the second combustion area 14 to be in combustion operation during a first heating process (FIGS. 27A: 28A) and the first combustion area 13 to be in combustion operation during a second heating process (FIGS. 27B: 28B).

In the first process (FIG. 27A: 28A), the superheated steam of the passage ST is introduced into the first combustion area 13 though a first control valve 27, a first passage L1, the first heat exchanger 11 and a first intermediate passage L3. The steam is heated to a high temperature range above 800° C., preferably above 1,000° C. while passing through the heat exchanger 11, so that water gas reaction of the steam occurs and progresses in the heat exchanger 11 and the combustion area 13. The superheated steam undergoes the water gas reaction, and then, flows through a third intermediate passage L5 into the splitting area 15, as a water gas flow SH at a high temperature containing hydrogen, and the flow SH is split into first and second streams of the water gas SH1,SH2 in the area 15.

The second stream SH2 is delivered to the water gas delivery passage SHA so as to be fed to combustion means 90 of the coal gasification equipment, whilst the first stream SH1 is directed to the second combustion area through a fourth intermediate passage L6. The hydrocarbon fuel of the fuel line CHG is fed from the control valve 42 to the second combustion area 14 through the injection port 44, and the oxidizing agent ($O_2$) of the oxidizer feed line OXG is introduced from the oxidizer inlet port 84 into the second combustion area 14 through the control valve 82. The fuel, oxidizer and the first stream SH1 take a combustion reaction in the area 14 to produce combustion exhaust gas at high temperature, which is delivered, as a high temperature gas flow SH3, to a hot gas discharge passage SHB through an intermediate second passage L4, the second heat exchanger 12, the second passage L2 and a second exhaust valve 38. The first stream SH1 is in heat transfer contact with the second heat exchanger during passing therethrough, so that the sensible heat possessed by the stream SH1 is accumulated in the heat exchanger 12.

In the second process (FIG. 27B: 28B) following the first process, the superheated steam of the passage ST is introduced into the second combustion area 14 though a second control valve 28, the passage L2, the second heat exchanger 12 and the passage L4. The steam is heated to a high temperature range above 800° C., preferably above 1,000° C. while passing through the heat exchanger 12, so that water gas reaction of the steam occurs and progresses in the heat exchanger 12 and the combustion area 14. The superheated steam undergoes the water gas reaction, and then, flows through the passage L6 into the splitting area 15, as a water gas flow SH at a high temperature containing hydrogen, and the flow SH is split into first and second streams of the water gas SH1,SH2 in the area 15.

The second stream SH2 is delivered to the water gas delivery passage SHA so as to be fed to combustion means 90 of the coal gasification equipment, whilst the first stream SH1 is directed to the second combustion area through the passage L5. The hydrocarbon fuel of the fuel line CHG is fed from the control valve 41 to the first combustion area 13 through the injection port 43, and the oxidizing agent ($O_2$) of the oxidizer feed line OXG is introduced from the oxidizer inlet port 83 into the area 13 through the control valve 81. The fuel, oxidizer and the first stream SH1 take a combustion reaction in the area 13 to produce combustion exhaust gas at high temperature, which is delivered, as a high temperature gas flow SH3, to a hot gas discharge passage SHB through the L3, the heat exchanger 11, the passage L1 and a first exhaust valve 37. The first stream SH1 is in heat transfer contact with the second heat exchanger during passing therethrough, so that the sensible heat possessed by the stream SH1 is accumulated in the heat exchanger 11.

The heating apparatus 1 thus arranged functions as a water gas generator, wherein the superheated steam introduced into the combustion areas 13, 14 is heated to a high temperature range above 800° C.~1,100° C. by the substantially direct heat exchange between the streams SH, SH3, which is performed by the heat exchangers 11, 12, and the steam thus heated generates and maintains the efficient water gas reaction in the heat exchangers 11, 12 and the combustion areas 13, 14. The first stream SH1 is mixed with a relatively small quantity of fuel and oxidizer to generate and maintain the combustion reaction in the areas 13, 14, Thus, the heating apparatus 1 allows the reaction temperature of the water gas reaction in the areas 13, 14 to be kept in a desired range, so that the hydrogen gas generating reaction effectively occurs therein in the existence of the steam flow heated to, the high temperature and the efficient water gas including a desired hydrogen can be fed to the combustion means 90 of the coal gasification furnace. Further, the heating apparatus 1 enables reduction of production of carbon dioxide ($CO_2$) and water ($H_2O$) involved in oxidizing combustion reaction, and allows fine water gas of a relatively high quality to be produced by a small quantity of oxidizer and fuel.

Figure 29:
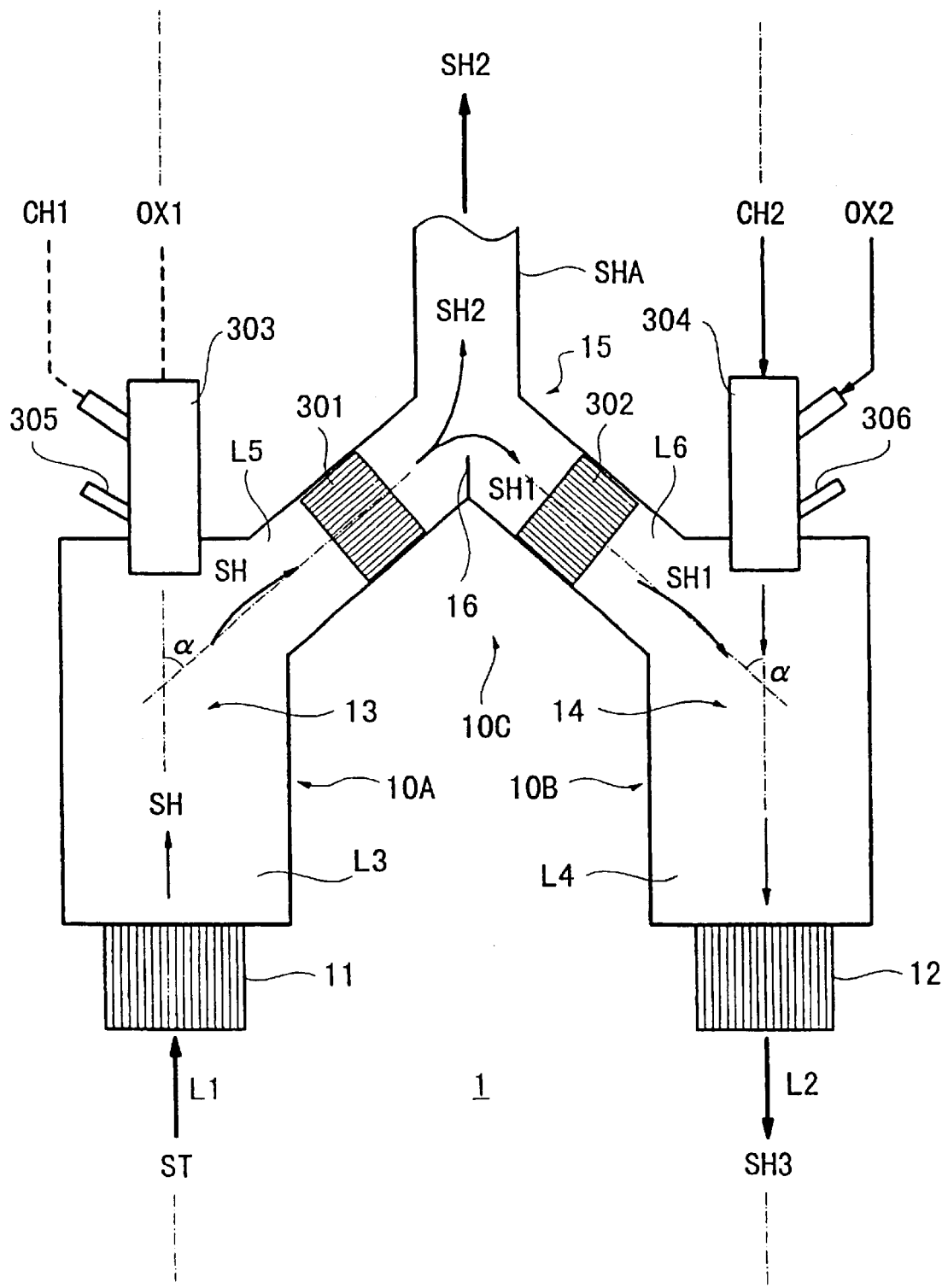
FIG. 29 is a diagram illustrating a concept of an alternative arrangement of the apparatus as shown in FIGS. 27 and 28.

FIG. 29 is a schematic across-sectional view of the heating apparatus 1 showing an alternative arrangement of splitting area 15 in accordance with the seventh embodiment. In FIG. 29, a profile of each fluid passage is schematically illustrated.

The heating apparatus as shown in FIG. 29 includes the first and second heating furnace units 10A, 10B and the communication section 10C interconnects the units 10A, 10B. The furnace 10A, 10B is provided on an end wall with a burner assembly 303, 304 having a continuous ignition type of pilot burner 305, 306. The fuel supply lines CH1, CH2 and the oxidizer supply lines OX1, OX2 is joined to the burners 303, 304 which axially inject the hydrocarbon fuel and the oxidizing agent toward the combustion areas 13, 14.

The right and left intermediate passages L5, L6 constituting the splitting area 15 are inclined at a predetermined angle relative to center line of the units 10A, 10B so as to direct the fluid flow of the water gas stream SH into the first water gas delivery passage SHA, and the passages L5, L6 are joined together on the centerline of the heating apparatus 1. The juncture of the passages L5, L6 is joined to an upstream end of the first water gas delivery passage SHA, and is provided with the protrusion 16. The protrusion 16 is formed by a relatively thin plate extending along the center line of the heating apparatus 1 so as to project into the fluid passage, opposing against the opening of the upstream end of the passage SHA.

According to such an arrangement, of the splitting area 15, the splitting area 15 is configured to facilitate the introduction of the water gas flow SH into the passage SHA, so that a desired flow rate of the second stream SH2 can be delivered through the passage SHA in accordance with the orientation and inertia effect of the water gas flow SH, the flow rate of which may be reduced otherwise. Thus, the second stream SH2 is prevented from decreasing in its flow rate, and the water gas flow SH can be surely split in the splitting area 15 into the first and second streams SH1, SH2 in the proportion of the desired flow rates.

In addition, the passages L5, L6 is provided therein with regenerators of honeycomb structure 301, 302 for increasing the pressure loss of the fluid flow and rendering it in a unidirectional flow. The regenerators 301, 302 is of substantially the same material, configuration and dimension as those of the heat exchangers 11, 12. As shown in FIG. 29, the water gas flow SH of the combustion area 13 flows into the passage L5 and passes through the regenerator 301, and then, splits into the streams SH1, SH2. The stream SH1 flows through the honeycomb passages of the regenerator 302 into the passage L6 and the combustion area 14.

The regenerators 301 and 302 function to accumulate the heat of the sensible heat of the flow SH and the stream SH1 and dissipate the heat thereto. However, the regenerators 301, 302 is not primarily intended for such a purpose, but they are mainly intended to locally increasing the resistance of the passages L5, L6 and regulating the water gas flow SH, which may be introduced into the passages L5, L6 in a turbulent condition, so as to be in a unidirectional condition, thereby controlling the splitting action in the splitting area 15. That is, the water gas flow SH of the combustion areas 13, 14, which may flow into the passage L5, L6 as being a high temperature gas flow in a turbulent condition or irregular state, is regulated to be in a unidirectional or laminar condition during flowing through the honeycomb passages of the regenerators 301, 302, so that the flow SH is introduced into the splitting area 15 as a regulated flow oriented in an intended direction. Further, the resistance of the regenerators 301, 302 is imposed on the first stream SH1 so as to restrict the flow rate of the first stream SH1, which tends to be increased otherwise. As the result, the proportion of the flow rates of the streams SH1, SH2 can be appropriately controlled, whereby desired flow rates of the streams SH1, SH2 can be introduced into the passage SHA and the combustion area 13, 14.

Thus, the proportion of the flow rates of the streams SH1, SH2 can be properly controlled in accordance with the arrangement of the fluid passages and the splitting area 15. Such an arrangement is not limited to the illustrated embodiment, but may be applied to the aforementioned embodiments.

Figure 30A:
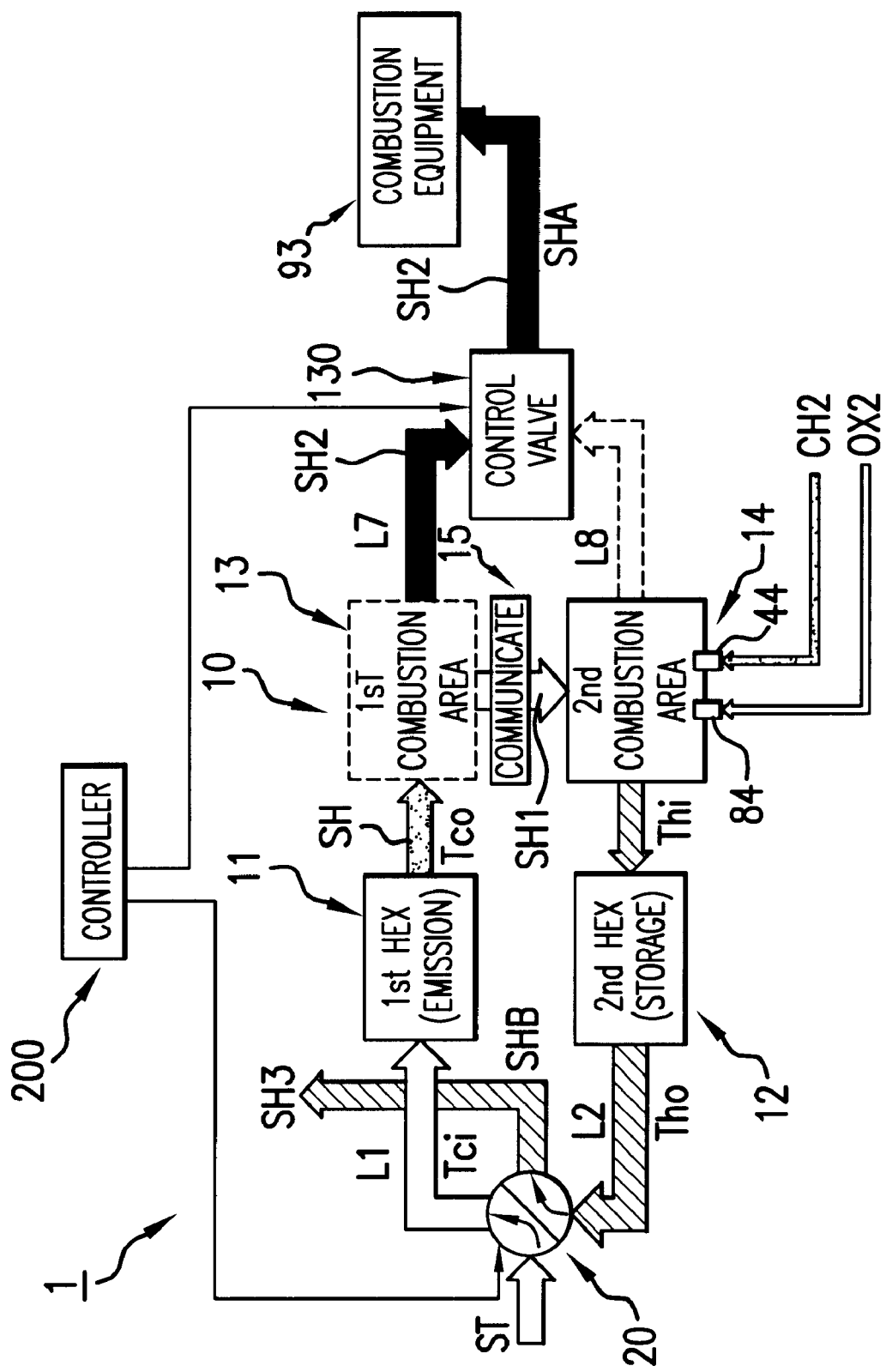
FIG. 30 is are a block flow diagram illustrating a further modification of the apparatus as shown in FIGS. 27 and 28, and FIGS. 31 and 32 are schematic cross-sectional views of the apparatus in its first and second positions.
Figure 30B:
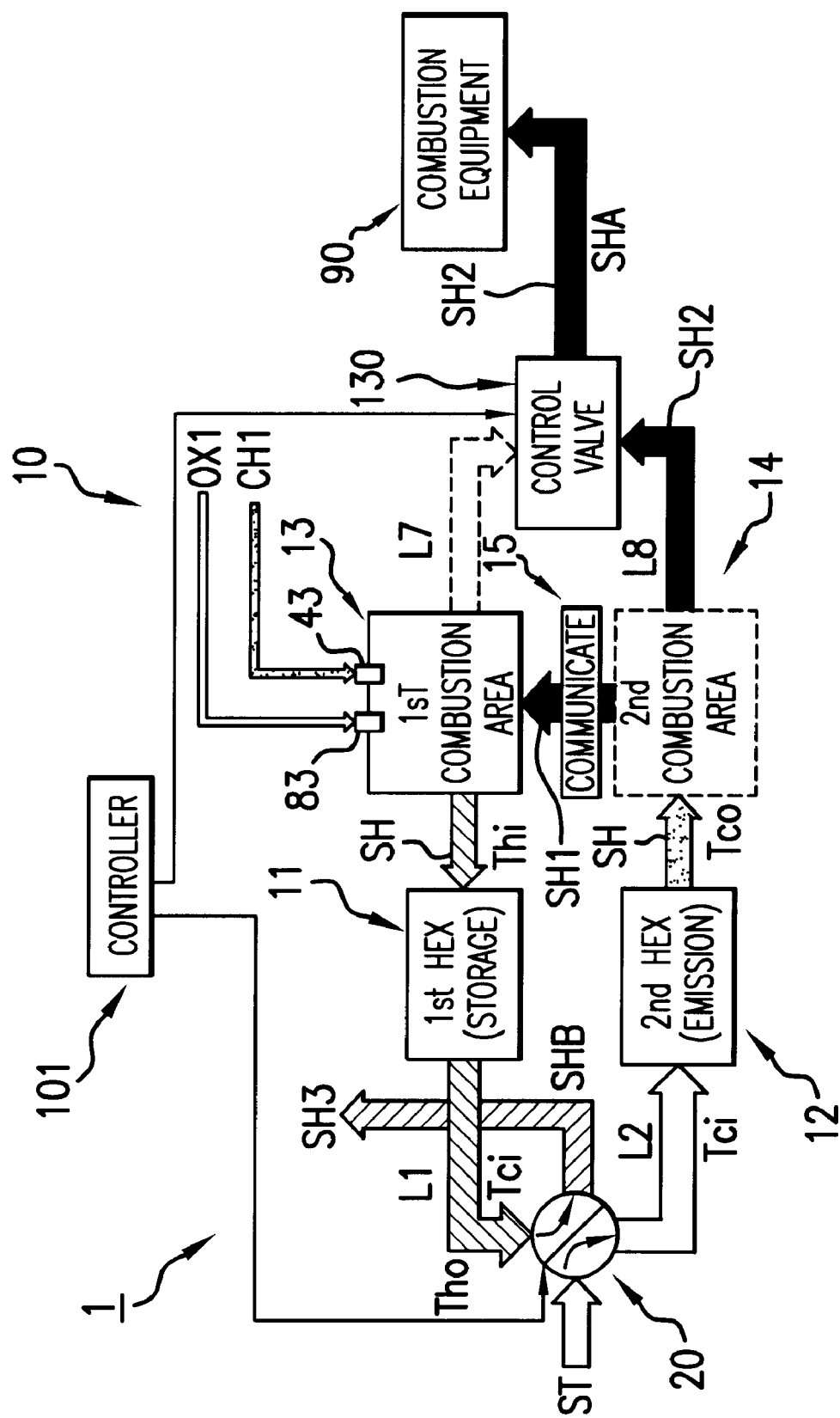
Figure 31:
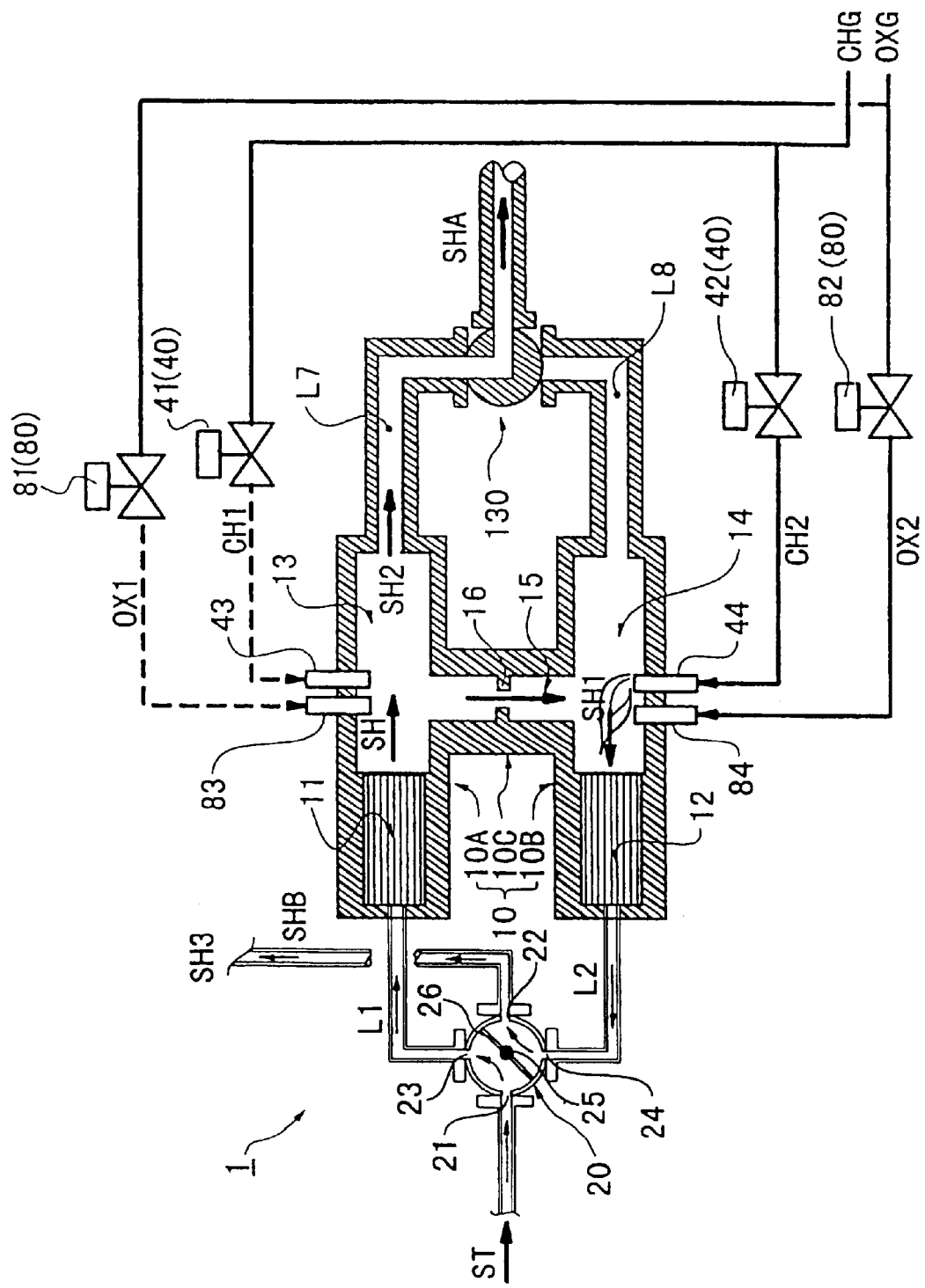
Figure 32:
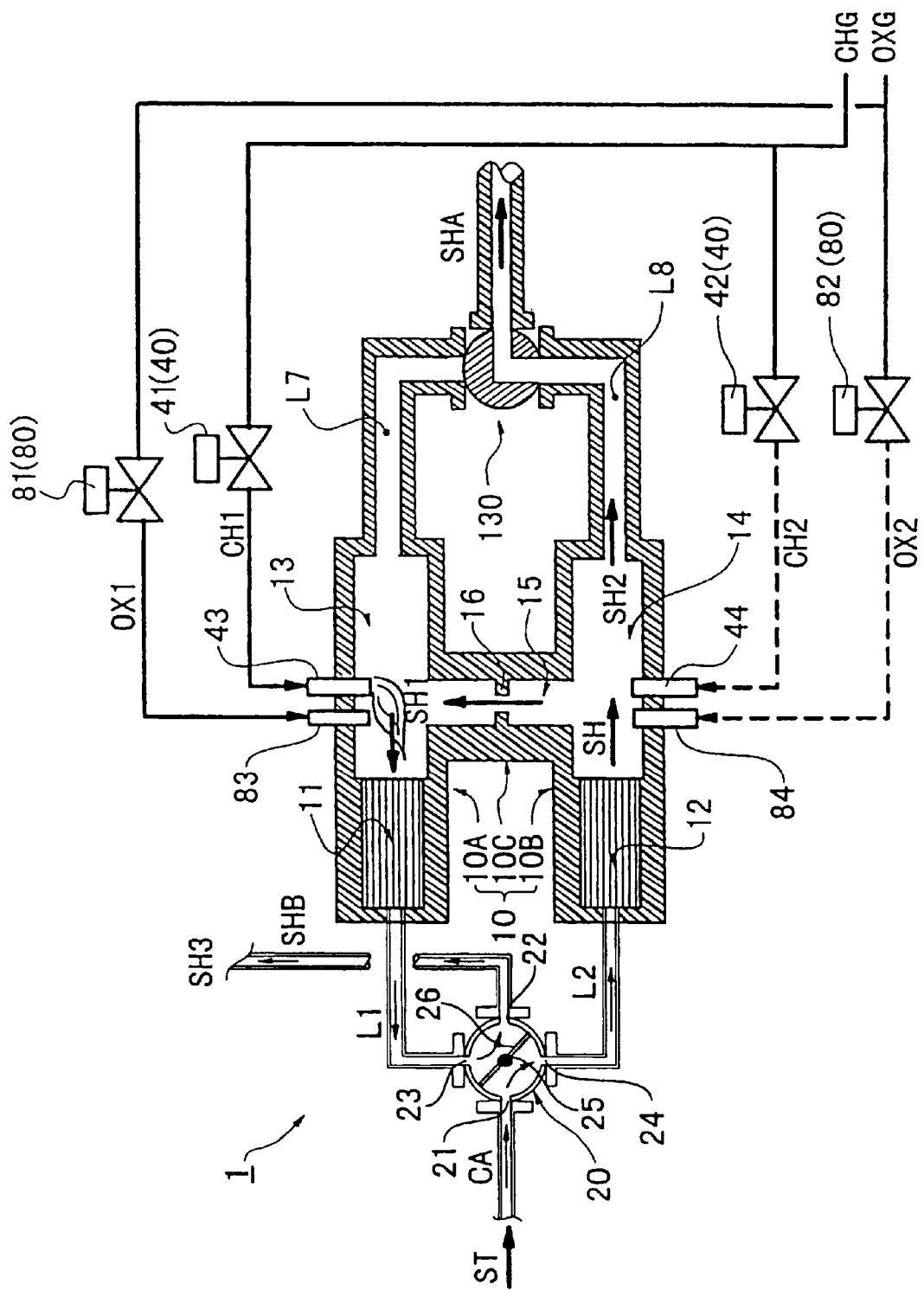

FIG. 30 is a block flow diagram illustrating another modification of the heating apparatus of the seventh embodiment, and FIGS. 31 and 32 are schematic cross-sectional views of the apparatus as shown in FIG. 30, wherein the first position of the apparatus is illustrated in FIGS. 30(A) and 31, and the second position thereof is illustrated in FIGS. 30(B) and 32.

As shown in FIGS. 31, 32, the apparatus 1 has a communication unit 10C interconnecting the first and second combustion areas 13, 14, and the passages L7, L8 interconnecting the combustion areas 13, 14 and the water gas passage SHA. The combustion areas 13, 14 are in communication with each other through a communication passage 15 of the unit 10C. The water gas produced in the heat exchangers 11, 12 and the combustion areas 13, 14 by the gasification reaction is split by the communication passage 15. A restriction 16 protrudes inward of the passage 15 to form a locally reduced fluid passage which functions as an orifice or fluid flow resistance of passage 15.

The apparatus 1 is provided with a splitting control means 130 with a three-way valve construction which can be alternately switched to the first position (FIGS. 30A: 31) and the second position (FIGS. 30B: 32). The control means 130 is interposed between the passage L7, L8 and the passage SHA, and selectively switched under control of an electronic controller 200 (FIG. 30), which synchronously controls the control means 130 and the changeover means 20 so that they are simultaneously switched to either of the first and second positions in a predetermined time interval no greater than 60 seconds. The changeover means 20 is exemplified as a four-way valve assembly with a high speed switching type. However, it may be arranged to be a set of valves as shown in FIG. 27.

The high temperature steam flow SH introduced into the first or second combustion area 13, 14 though the first or second heat exchanger 11, 12 is split into the water gas streams SH1, SH2, and the stream SH1 generates and maintains a combustion reaction of the water gas in the combustion area 13, 14 in the existence of a relatively small quantity of fuel or oxidizing agent fed to the area 13, 14.

In the first heating process (first position) as shown in FIGS. 30(A) and 31, the high temperature steam flow (water gas flow) SH introduced into the first combustion area 13 though the first heat exchanger 11 is split into the first and second water gas streams SH1,SH2, and the first stream SH1 is introduced into the second combustion area 14 through the passage 15 to take a combustion reaction with the small quantity of fuel or oxidizing agent in the area 14 as set forth above. In the second heating process (second position) as shown in FIGS. 30(B) and 32, the high temperature steam flow (water gas flow) SH introduced into the second combustion area 14 though the second heat exchanger 12 is split into the first and second streams SH1,SH2, and the first stream SH1 is introduced into the first combustion area 14 through the passage 15 to take a combustion reaction with the small quantity of fuel or oxidizing agent in the area 15 as set forth above. The second stream SH2 of the water gas produced in the first or second combustion area 13, 14 is delivered to the water gas delivery passage SHA through the control means 130.

Figure 33:
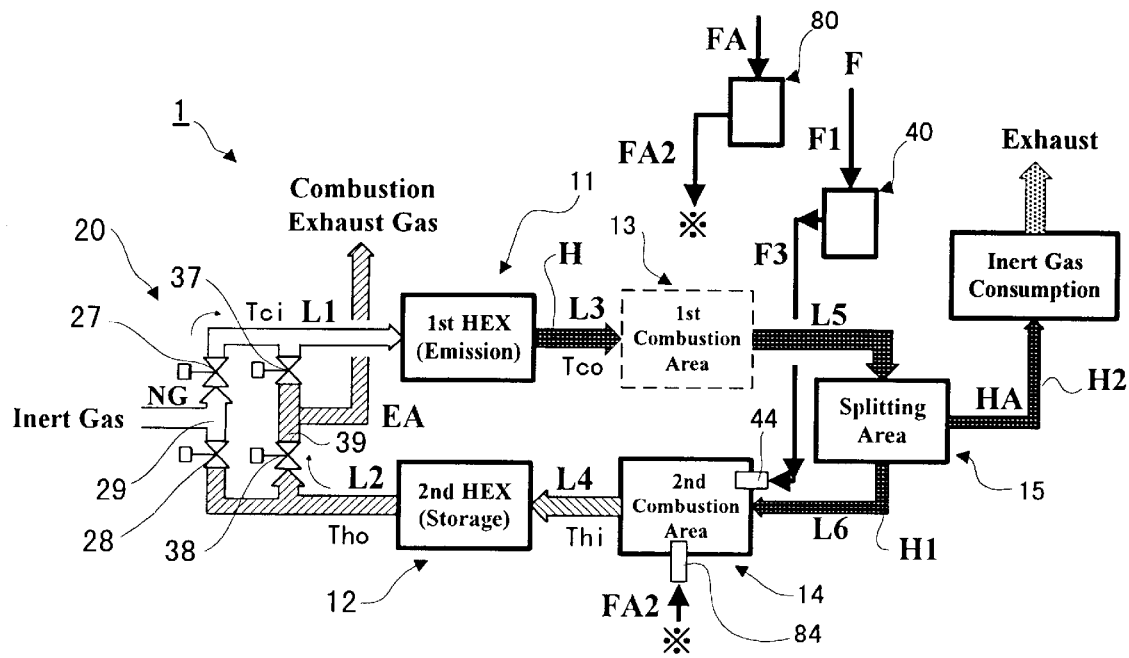
FIGS. 33 is a block flow diagram showing an arrangement and operation of the apparatus according to an eighth embodiment of the present invention, which constitutes an inert gas heating system.
Figure 33:
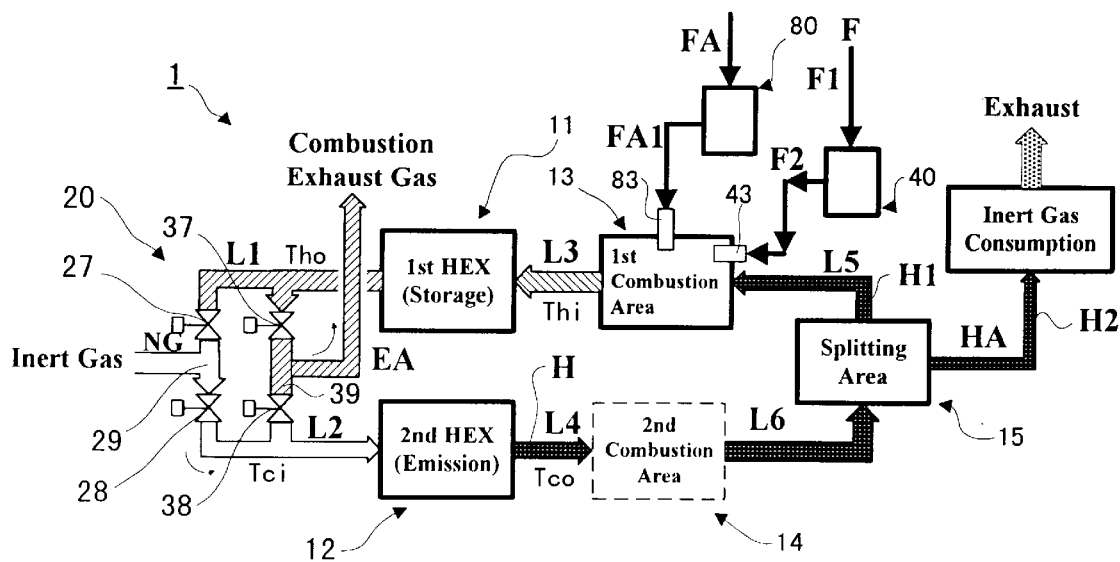
Figure 34:
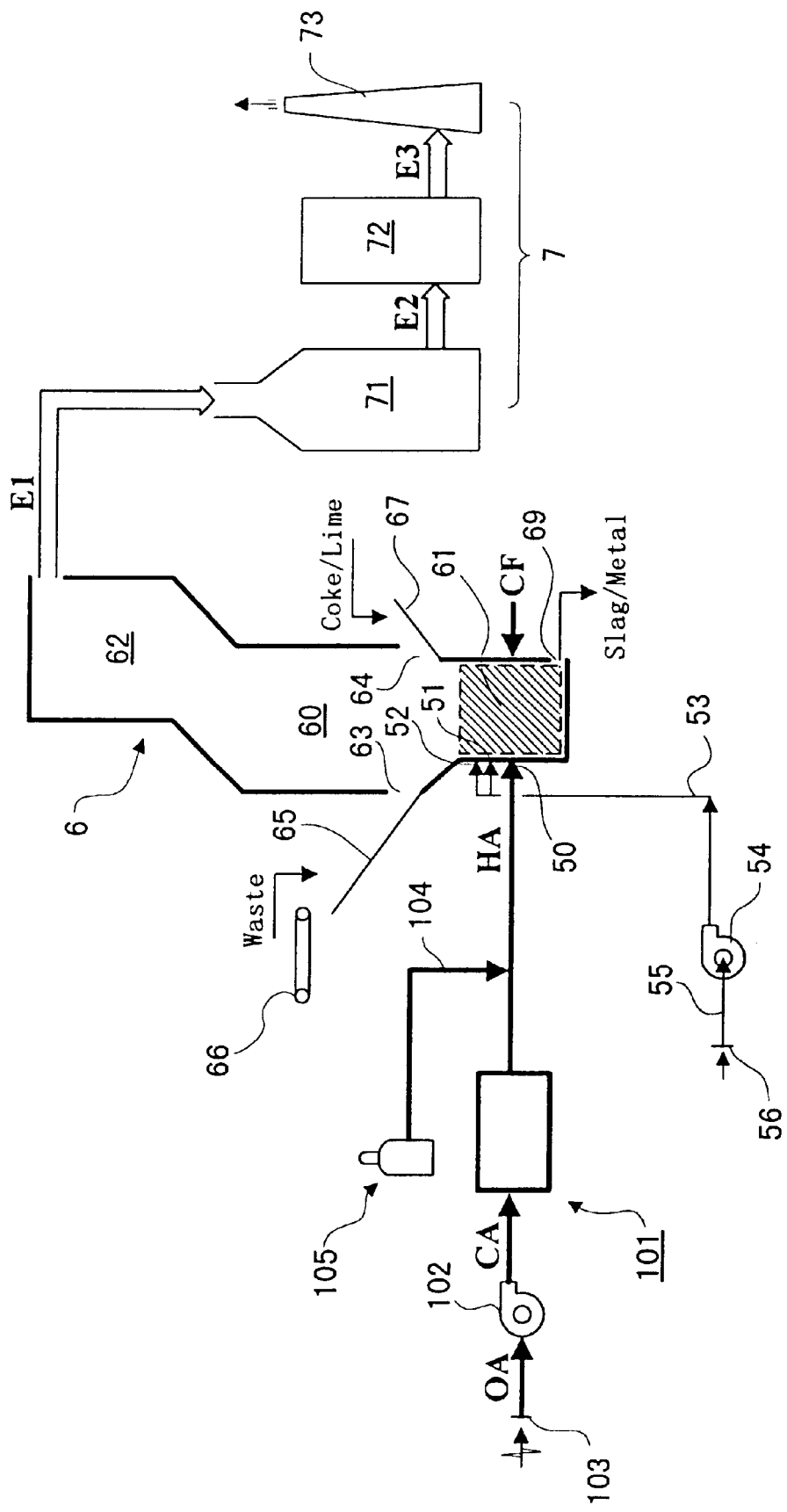
FIG. 34 is a schematic process flow diagram generally showing an arrangement of a whole system of a conventional waste treatment plant.
Figure 35:
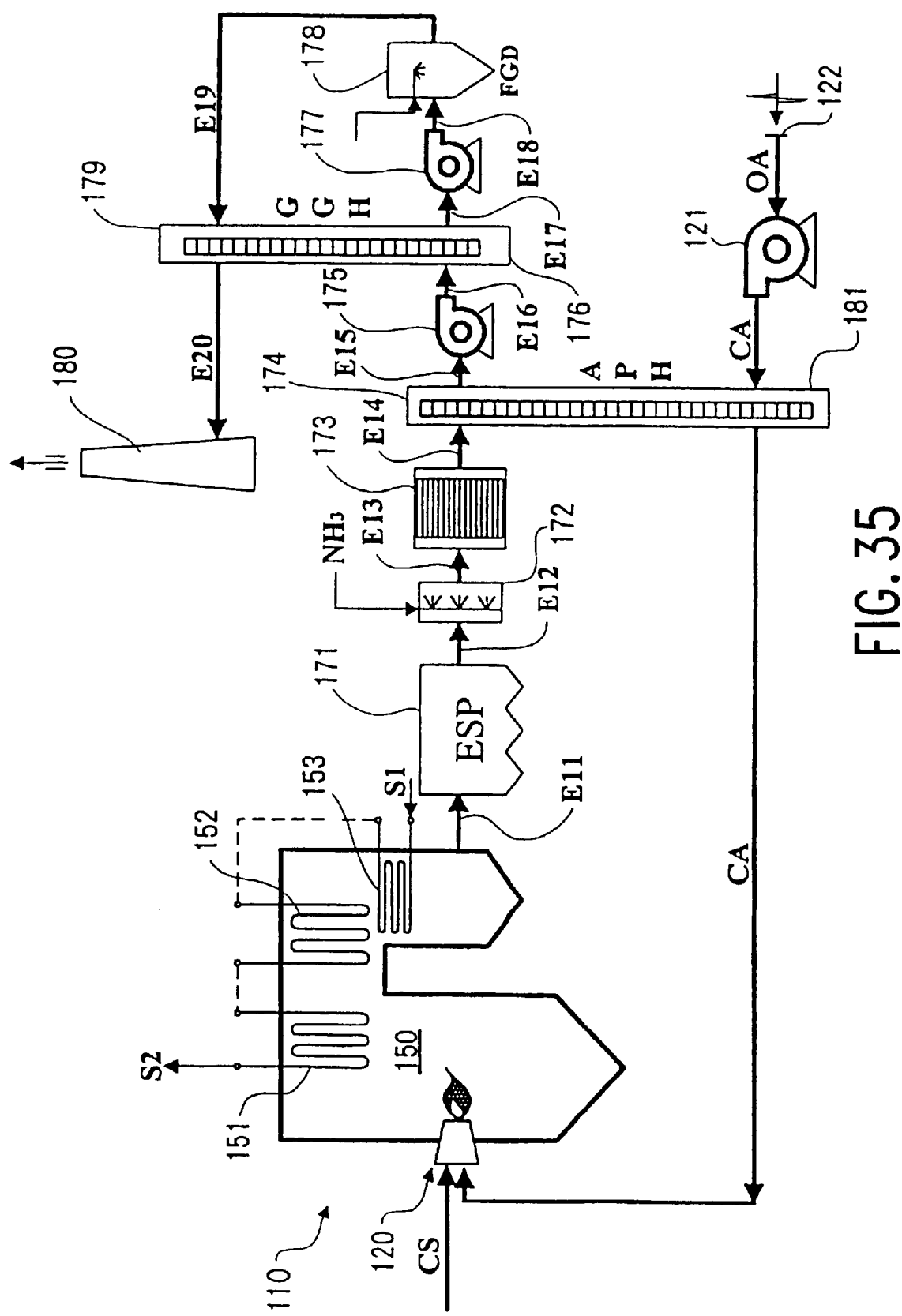
FIG. 35 is a schematic process flow diagram generally showing an arrangement of a whole system of a conventional coal fired power generation boiler.

FIGS. 33 is a block flow diagram of an inert gas heating system which is an eighth embodiment of the present invention. In FIG. 33, the elements or means substantially same as those in the aforementioned embodiments are indicated by the same reference numerals. In this application, the construction of the heating apparatus 1 is substantially the same as that of the aforementioned fifth embodiment, and therefore, its illustration is omitted with reference to FIGS. 14 to 18.

The heating apparatus 1 is used as an inert gas heating means for feeding a flow of inert gas at a high temperature to an equipment consuming the inert gas. As an kind of inert gas, nitrogen gas, argon gas or helium gas may be applicable. As the equipment consuming inert gas, any thermal treatment equipment such as an annealing furnace of a steal heating furnace may be exemplified.

The inert gas such as nitrogen gas is fed from an inert gas source (not shown) to the changeover means 20 of the heating apparatus by means of an inert to gas feed line NG. As is similar to the aforementioned fifth embodiment, the changeover means 20 in its first position feeds the inert gas into the first heat exchanger 11. The inert gas exchanges heat with the heat exchanger 11 to be heated tip to a high temperature range above 800° C.~1,100° C., and flows through the combustion area 13 into the splitting area 15. The second stream H2 divided therefrom is delivered to the inert gas consuming equipment by means of the delivery passage HA, and the first stream H1 divided therefrom is directed into the second combustion area 14. The assist air inlet port 84 supply combustion air or oxidizing agent into the combustion area 14 and the second burner 44 feeds a quantity of hydrocarbon fuel thereinto, whereby the stream H1 undergoes a combustion reaction and flows through the heat exchanger 12 as being a high temperature combustion exhaust gas to heat the heat exchanger 12. This exhaust gas is discharged through the changeover means 20 to the exhaust passage EA.

The changeover means 20 in its second position (FIG. 33B) feeds the inert gas into the second heat exchanger 12, and the inert gas heated therein is split into the first and second streams SH1, SH2 in the splitting area 15. The second stream H2 is fed to the inert gas consuming equipment, whereas the first stream H1 takes a combustion reaction in the first combustion area 13 and heat up the first heat exchanger 11 as being the high temperature combustion exhaust gas, and then, the exhaust gas is discharged to the exhaust passage EA.

According to this arrangement of the present apparatus, the inert gas is heated up to a high temperature range above 800° C. by the heat exchange action with the combustion exhaust gas of the combustion areas 13, 14, the heat exchange action therebetween being substantially directly effected through the heat exchanger 11,12. Therefore, the high temperature inert gas can be supplied to the inert gas consuming equipment. Further, the inert gas to be supplied to the equipment is merely heated by the exchange action of the sensible heat between the inert gas and the heat exchangers 11, 12, and therefore, the inert gas can be heated up to the high temperature range by the heating apparatus 1 without a substantial change of the property of the inert gas controlled or regulated by the inert gas source. Thus, the heating apparatus 1 is capable of continuously feeding the high temperature inert gas of a desired property to the equipment.

Although some preferred embodiment have been described with reference to the drawings, the present invention is not limited to such embodiments, but may be modified and changed without departing from the scope of the invention as claimed in the attached claims.

For instance, the above described embodiment employs the four-way valve as the changeover means for switching the fluid flow passages, other type of changeover means, such as case-switching type high-speed switching system (Cross Exchange Mechanism (CEM)) may be used.

Further, flue gas desulfurizing means or denitrifying means may be additionally provided in the exhaust gas treatment system of the pulverized coal boiler of the above embodiment in accordance with an environmental regulation as to exhaust gas emission.

Still further, the aforementioned embodiment regarding production of the water gas, it is possible to add a quantity of hydrocarbon fuel or oxidizing agent to the heated steam effluent from the heat exchanger so as to cause and. maintain a gasification reaction of water gas in the existence of the fuel or oxidizer. The exhaust gas effluent from the heat exchanger may be used in the same or other system as combustible gas.

INDUSTRIAL APPLICABILITY

According to the present invention, an apparatus and an method for heating supply of gaseous fluid can be provided, which heats a relatively low temperature gaseous fluid and feeds a heated supply flow to a high temperature gaseous fluid introduction equipment, wherein the supply flow can be heated to a high temperature without substantially changing the property of the supply flow, such as its oxygen density.

Further, an apparatus and a method can be provided, which enable the supply flow for combustion to be continuously heated to a high temperature range above 800° C., preferably, above 1,000° C.

Still further, an apparatus and an method can be provided in accordance with the present invention, wherein the supply flow to be fed to a coal fired combustion equipment can be continuously preheated to a high temperature with a heat exchange action substantially directly effected between a combustion exhaust gas and a low temperature combustion air by means of a high cycle switching type of regenerator.

Further, an apparatus and method can be provided, which is capable of producing water gas and continuously feeding the water gas flow to an equipment using the water gas, such as a coal gasification system or a gas turbine plant.

What is claimed is:

1. A heating apparatus for supply of heated gaseous fluid to high temperature gaseous fluid introduction equipment, comprising:

a first regenerative heat exchanger;

a first combustion area connected to the first regenerative heat exchanger;

a splitting area connected to the first combustion area;

a second regenerative heat exchanger;

a second combustion area connected to the second regenerative heat exchanger and connected to the splitting area;

wherein the apparatus has a first position in which low temperature gaseous fluid is introduced to the first regenerative heat exchanger to form a heated fluid supply, wherein the heated fluid supply passes through the first combustion area, enters the splitting area where the heated fluid supply is split into first and second streams, wherein the second stream is conducted away from the apparatus to the gaseous fluid introduction equipment and the first stream is conducted to the second combustion area where a combustion reaction takes place to form combusted exhaust gas, wherein the combusted exhaust gas is conducted to the second heat exchanger to regenerate the second heat exchanger, and hot gas effluent is exhausted from the second heat exchanger, wherein no combustion is conducted in the first combustion area when the apparatus is in the first position;

wherein the apparatus has a second position in which low temperature gaseous fluid is introduced to the second regenerative heat exchanger to form a heated fluid supply, wherein the heated fluid supply passes through the second combustion area, enters the splitting area where the heated fluid is split into first and second streams, wherein the second stream is conducted away from the apparatus to said gaseous fluid introduction equipment and the first stream is conducted to the first combustion area where a combustion reaction takes place to form combusted exhaust gas, wherein the combusted exhaust gas is conducted to the first heat exchanger to regenerate the first heat exchanger, and hot gas effluent is exhausted from the first heat exchanger, wherein no combustion is conducted in the second combustion area when the apparatus is in the second position.

2. An apparatus according to claim 1, further comprising:

a fluid flow introduction passage connected to receive said low temperature gaseous fluid;

a combustion exhaust passage connected to exhaust said hot gas effluent;

a heated fluid supply delivery passage connected to deliver the second stream to said gaseous fluid introduction equipment;

changeover means connected to said fluid flow introduction passage and said combustion exhaust gas passage;

first and second fluid flow passages connected to the changeover means;

first and second heating devices connected to the first and second fluid flow passages wherein said splitting area is in communication with the first and second heating devices and in communication with the heated supply flow delivery passage;

wherein said first heating device comprises the first regenerative heat exchanger and the first combustion area arranged in series, the first fluid flow passage, the first heat exchanger and the first combustion area being in communication with each other so as to deliver said heated fluid supply flow;

wherein said second heating device comprises the second regenerative heat exchanger and the second combustion area arranged in series, the second fluid flow passage, the second heat exchanger and the second combustion area being in communication with each other so as to deliver said heated fluid supply to said splitting area;

said splitting area being provided with splitting means for splitting said heated fluid supply into said first and second streams and directing the first stream to said first combustion area when the apparatus is in the second position and to the second combustion area when the apparatus is in the first position; and each of said first and second combustion areas being provided with combustion means for generating a combustion reaction of combustible matter and maintaining the combustion reaction for a predetermined period of time.

3. An apparatus according to claim 2, wherein said changeover means has a first position, corresponding to the first position of the apparatus, in which said introduction passage is in communication with said first fluid flow passage and said combustion exhaust gas passage is in communication with said second fluid flow passage, and a second position, corresponding to the second position of the apparatus, in which said introduction passage is in communication with said second fluid flow passage and said combustion exhaust gas passage is in communication with said first fluid flow passage, the changeover means being controlled to be selectively switched from one of the first and second positions to the other at a predetermined time interval;

wherein said first and second regenerative heat exchangers each have a regenerator, and wherein said second stream passes through the regenerator of the first regenerative heat exchanger to the first fluid flow passage and said combustion means of the first combustion area maintains a combustion reaction when the changeover means is in the second position; and wherein said second stream passes through a regenerator of the second heat exchanger to the second fluid flow passage and the combustion means of the second combustion area maintains a combustion reaction when the changeover means is in the first position.

4. An apparatus according to claim 1, further comprising a fuel feed line connected to introduce a fuel into said combustion area, and fuel control means for controlling a fuel feed of the fuel feed line.

5. An apparatus according to claim 1, further comprising odorous gas introduction means for introducing odorous gas into said combustion area.

6. An apparatus according to claim 1, further comprising an exhaust gas introduction passage for introducing into one of said first and second combustion areas, combustible exhaust gas produced in a combustion area of a combustion furnace or combustion equipment.

7. An apparatus according to claim 1, further comprising exhaust gas introduction means for introducing relatively low temperature exhaust gas on of said first and second combustion areas.

8. An apparatus according to claim 1, further comprising assist air introduction means for introducing a quantity of combustion assist air into one of said first and second combustion areas.

9. An apparatus according to claim 1, wherein said first and second heating devices are arranged in parallel, said first and second combustion areas are in communication with each other through a communication passage defining said splitting area, and said splitting means has an inlet opening of said heated supply flow delivery passage and constriction means opposing against the inlet opening, the constriction means functioning as an orifice for regulating a fluid pressure of said heated supply flow.

10. An apparatus according to claim 1, further comprising:
   a superheated steam introduction passage connected to feed superheated steam as said low temperature gaseous fluid;
   an exhaust gas passage connected to exhaust combusted exhaust gas produced in one of said first and second combustion areas; and
   changeover means connected to said introduction passage and said exhaust gas passages, first and second fluid flow passages connected to said changeover means, first and second heating devices connected to said first and second fluid flow passages, and a water gas delivery passage in communication with the first and second heating devices;
   wherein the first heating device comprises the first regenerative heat exchanger and the first combustion area arranged in series; and
   wherein the second heating device comprises the second heat exchanger connected and the second combustion area arranged in series.

11. An apparatus according to claim 1, further comprising:
   an inert gas introduction passage for feeding inert gas as said low temperature gaseous fluid;
   changeover means connected to said introduction passage and a combustion exhaust gas passage,
   first and second fluid flow passages connected to said changeover means;
   first and second heating devices connected to said first and second fluid flow passages; and
   a high temperature inert gas delivery passage in communication with the first and second heating devices;
   wherein the first heating device comprises the first heat exchanger, the first fluid flow passage and the first combustion area arranged in series; and
   wherein the second heating device comprises the second heat exchanger, the second fluid flow passage, and the second combustion area arranged in series.

12. An apparatus according to claim 2,
   wherein said regenerator comprises a honeycomb structure having a number of fluid passages through which said low temperature gaseous fluid and said exhaust gas alternately pass; and
   wherein said changeover means are alternately switched to one of the first and second positions at a predetermined time interval no greater than 60 seconds.

13. A pre-heater for preheating combustion air to a combustion furnace, comprising the apparatus according to claim 1.

14. A heating method for heating a low temperature gaseous fluid and supplying a heated fluid supply flow to a high temperature fluid introduction equipment, comprising:
   (1) a first heating process including the steps of
      introducing the low temperature gaseous fluid through a first heat exchanger so as to heat the low temperature gaseous fluid to produce a heated fluid supply,
      splitting said heated fluid supply into first and second streams, feeding the second stream to said high temperature fluid introduction equipment,
      generating a combustion reaction including said first stream in a combustion area to produce combusted exhaust gas,
      introducing the combusted exhaust gas into a second heat exchanger, wherein heat from the combusted exhaust gas is accumulated in a regenerator of a second heat exchanger; and
   (2) a second heating process including steps of
      introducing the low temperature gaseous fluid through the second heat exchanger so as to heat the low temperature gaseous fluid to produce la heated fluid supply,
      splitting said heated supply flow into first and second streams,
      feeding the second stream to said high temperature fluid introduction equipment,
      generating a combustion reaction including said heated fluid supply to produce a combusted exhaust gas,
      introducing combusted exhaust gas produced by said combustion reaction into said first heat exchanger, wherein heat from the exhaust gas is accumulated in a regenerator of the first heat exchanger; and
      wherein said first and second heating processes are alternately changed over at a predetermined time interval so that said low temperature gaseous fluid is continuously heated.

15. A method according to claim 14, wherein a first combustion area is defined adjacent to said first heat exchanger, and a second combustion area is defined adjacent to said second heat exchanger; and
   wherein said first stream is introduced into the first combustion area for the generating step of process (2) and said first stream is introduced into the second combustion area for the generating step of process (1).

16. A method according to claim 14, wherein said time interval is set to be no greater than 60 seconds and each of the first and second heat exchangers comprises a regenerator accumulating and emitting heat within said time interval so that the low temperature gaseous fluid is heated and the combustion exhaust gas is cooled.

17. A method according to claim 14, wherein said processes (1) and (2) further comprise feeding hydrocarbon fuel to first and second combustion areas to generate said combustion reaction.

18. A method according to claim 14, wherein said low temperature fluid is ambient air and said second steam is delivered to combustion means of said high temperature fluid introduction equipment at a temperature of at least 800°.

* * * * *